(12) United States Patent
May

(10) Patent No.: US 8,106,652 B2
(45) Date of Patent: Jan. 31, 2012

(54) APPARATUS FOR MAGNETIZING A MAGNETIZABLE ELEMENT

(75) Inventor: Lutz May, Berg (DE)

(73) Assignee: NCTEngineering GmbH, Unterhaching (DE)

( * ) Notice: Subject to any disclaimer, the term of this patent is extended or adjusted under 35 U.S.C. 154(b) by 805 days.

(21) Appl. No.: 11/993,924

(22) PCT Filed: Jul. 11, 2006

(86) PCT No.: PCT/EP2006/006783
§ 371 (c)(1),
(2), (4) Date: Aug. 18, 2008

(87) PCT Pub. No.: WO2007/006553
PCT Pub. Date: Jan. 18, 2007

(65) Prior Publication Data
US 2009/0219122 A1 Sep. 3, 2009

(30) Foreign Application Priority Data
Jul. 11, 2005 (EP) .................................... 05015024

(51) Int. Cl.
*G01R 33/02* (2006.01)
*H01F 13/00* (2006.01)
(52) U.S. Cl. ........................................ 324/244; 335/284
(58) Field of Classification Search ........................ None
See application file for complete search history.

(56) References Cited

U.S. PATENT DOCUMENTS

| | | | |
|---|---|---|---|
| 4,761,613 A * | 8/1988 | Hinks | 324/309 |
| 4,803,885 A | 2/1989 | Nonomura et al. | |
| 5,341,099 A * | 8/1994 | Suzuki | 324/309 |
| 6,253,460 B1 | 7/2001 | Schmitz | |
| 6,448,761 B1 | 9/2002 | Stumpe et al. | |
| 6,452,394 B1 * | 9/2002 | Lappalainen | 324/318 |
| 6,581,480 B1 | 6/2003 | May et al. | |
| 7,631,564 B1 * | 12/2009 | Sihler et al. | 73/862.333 |
| 2003/0150282 A1 | 8/2003 | May | |
| 2004/0025600 A1 | 2/2004 | Viola et al. | |
| 2004/0104720 A1 | 6/2004 | Ramirez | |
| 2007/0229080 A1 * | 10/2007 | Weiss et al. | 324/322 |

FOREIGN PATENT DOCUMENTS
WO 02/063262 8/2002
* cited by examiner

*Primary Examiner* — Vinh Nguyen
(74) *Attorney, Agent, or Firm* — IP Strategies

(57) ABSTRACT

An apparatus is for magnetizing a magnetizable element to generate magnetically encoded regions. The apparatus includes electric connection elements for electrically contacting at least two different portions of the magnetizable element. The apparatus also includes an electric signal supply unit connected to the electric connection elements and adapted for applying at least two different electric signals to the at least two different portions so as to generate at least two different magnetically encoded regions in the at least two different portions of the magnetizable element.

19 Claims, 40 Drawing Sheets

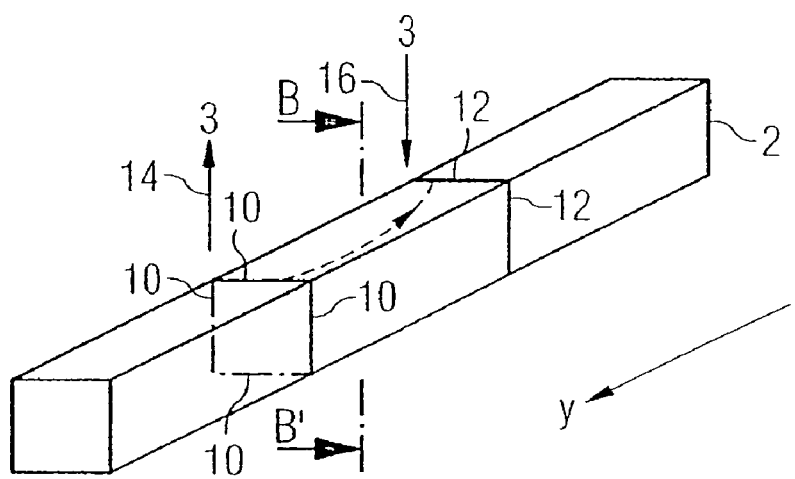
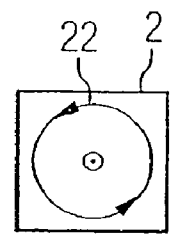
FIG 3A    FIG 3B
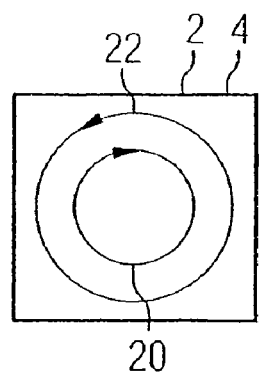
FIG 4

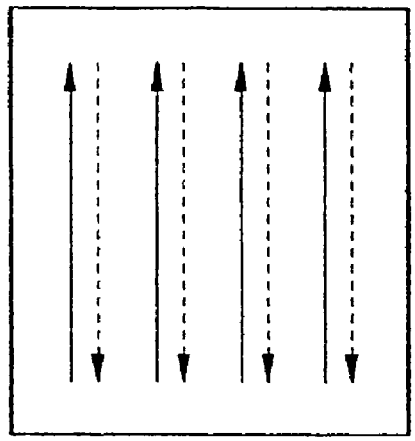
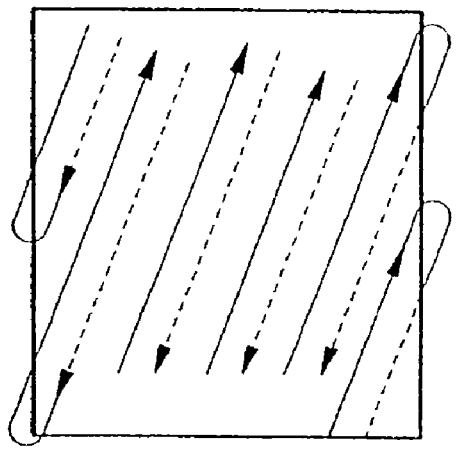
FIG 14
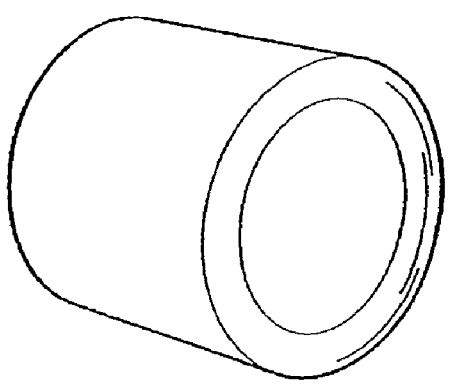
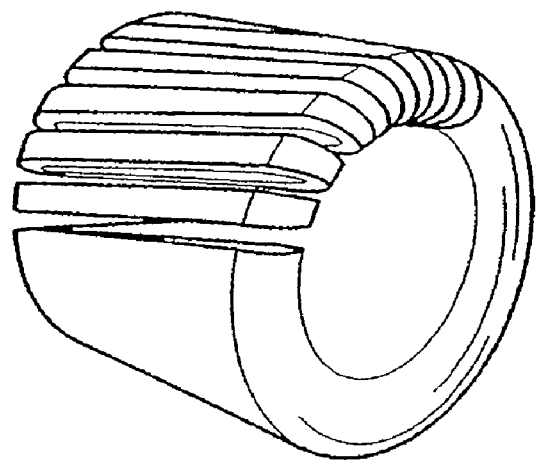
FIG 15          FIG 16

A  B  C  D  E

Pinning Region — Dual Field Sensing Region — Pinning Region

PCM Encoding Segment

PCM Encoding Segment

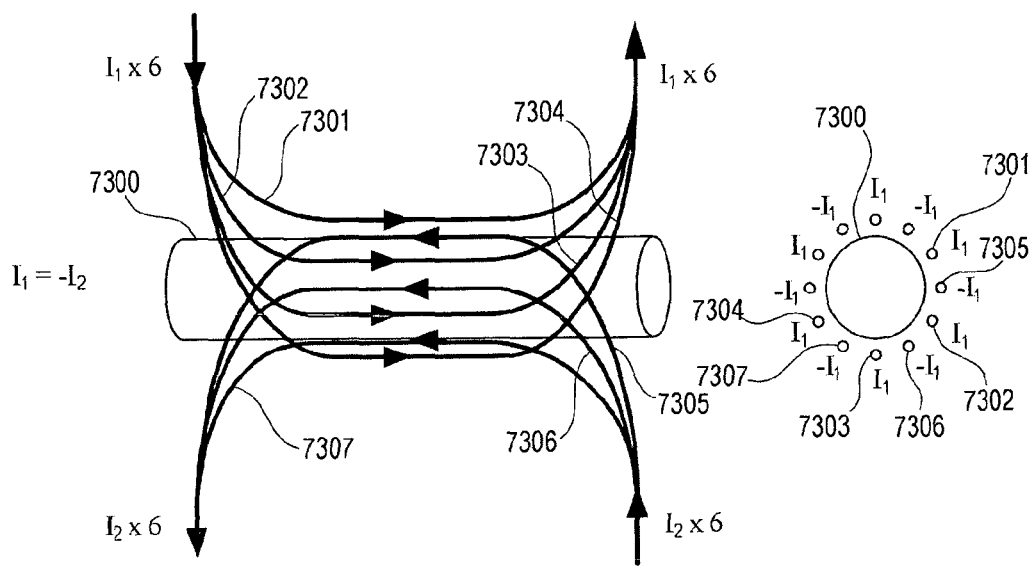
Fig. 73A    Fig. 73B
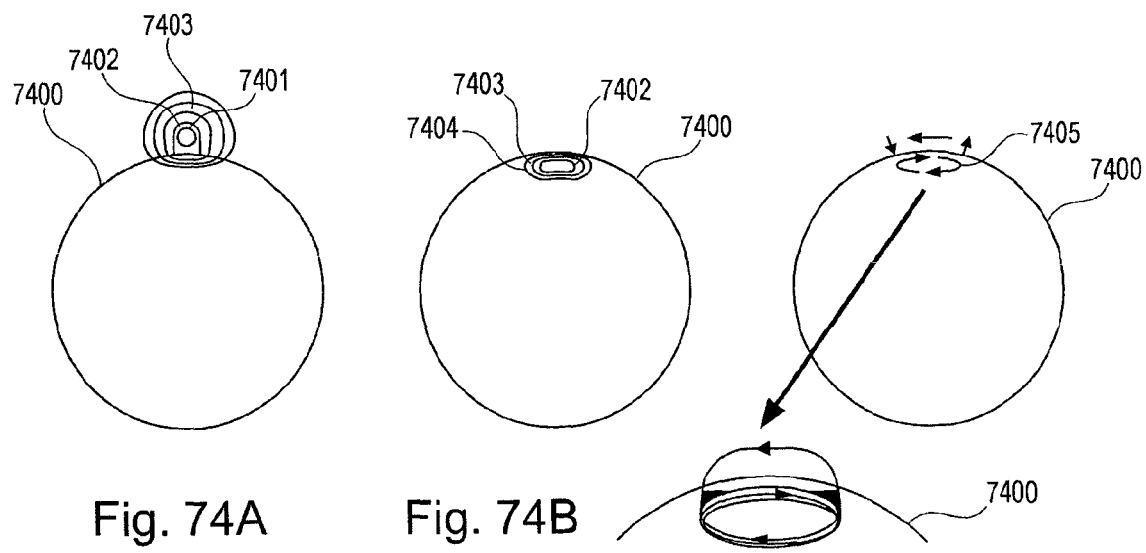
Fig. 74A    Fig. 74B
Fig. 74C

Tangential        Radial        Axial

APPARATUS FOR MAGNETIZING A MAGNETIZABLE ELEMENT

FIELD OF THE INVENTION

The present invention relates to an apparatus for magnetizing a magnetizable element, a sensor device, a method of magnetizing a magnetizable element, and a method of determining a physical parameter information of a movable object. In particular the present invention relates to a chess-board encoding for measuring angular and axial position ant to measure mechanical forces.

DESCRIPTION OF THE RELATED ART

Magnetic transducer technology finds application in the measurement of torque and position. It has been especially developed for the non-contacting measurement of torque in a shaft or any other part being subject to torque or linear motion. A rotating or reciprocating element can be provided with a magnetized region, i.e. a magnetic encoded region, and when the shaft is rotated or reciprocated, such a magnetic encoded region generates a characteristic signal in a magnetic field detector (like a magnetic coil) enabling to determine torque or position of the shaft.

Such kind of sensors are disclosed, for instance, in WO 02/063262.

SUMMARY OF THE INVENTION

It may be an object of the present invention to provide an efficient apparatus for magnetizing a magnetizable element, an efficient sensor device, an efficient method of magnetizing a magnetizable element, and an efficient method of determining a physical parameter information of a movable object.

This object may be achieved by providing an apparatus for magnetizing a magnetizable element, a sensor device, a method of magnetizing a magnetizable element, and a method of determining a physical parameter information of a movable object according to the independent claims.

According to an exemplary embodiment of the invention, an apparatus for magnetizing a magnetizable element to generate magnetically encoded regions is provided, the apparatus comprising electric coupling elements for electrically coupling at least two different portions of the magnetizable element, and an electric signal supply unit connected to the electric coupling elements and adapted for coupling at least two different electric signals into the at least two different portions so as to generate at least two different magnetically encoded regions in the at least two different portions of the magnetizable element.

According to an exemplary embodiment of the invention, a sensor device for determining at least one physical parameter information of a movable object is provided, the sensor device comprising at least two magnetically encoded regions arranged on the movable object, at least two magnetic field detectors, and a physical parameter information determining unit, wherein the at least two magnetic field detectors are adapted to detect a signal generated by the at least two magnetically encoded regions when the at least two magnetically encoded regions moving with the movable object pass a surrounding area of the at least two magnetic field detectors. Furthermore, the physical parameter information determining unit is adapted to determine the at least one physical parameter information of the movable object based on the detected signal.

According to another exemplary embodiment of the invention, a method for magnetizing a magnetizable element to generate magnetically encoded regions is provided, the method comprising the steps of electrically coupling at least two different portions of the magnetizable element to an electric signal supply unit, and coupling, by means of the electric signal supply unit, at least two different electric signals into the at least two different portions so as to generate at least two different magnetically encoded regions in the at least two different portions of the magnetizable element.

According to another exemplary embodiment of the invention, a method of determining a physical parameter information of a movable object is provided, the method comprises the detecting, by means of at least two magnetic field detectors, of a signal generated by at least two magnetically encoded regions when the at least two magnetically encoded regions moving with the movable object passes a surrounding area of the at least two magnetic field detectors. Further, the method comprises determining a physical parameter information of the movable object based on the detected signal.

According to one aspect of the invention, a scheme for magnetizing a magnetizable element to generate magnetically encoded regions may be provided, wherein a plurality of different electrically coupling elements are coupled to different portions on the surface of an object to be magnetized. Then, for each of the portions, an individual magnetizing scheme may be applied separately, for instance an electric current or an electric voltage. Consequently, different surface regions of the object to be magnetized may be provided with magnetically encoded regions which differ concerning magnetic field strength, polarity, and so on. It is believed that this will allow to create a user-defined magnetized surface structure of the magnetized object so that desired magnetic field signal patterns can be flexibly generated.

One characteristic feature of the present invention may be that the structure defined by the magnetically encoded regions can exhibit substantially every desired form. In particular, the structures of the magnetic field generated in the magnetizable element can be uneven, i.e. the structures are not necessary uniformly in respect to the magnetizable element. Furthermore, the structures can be radial, axial or tangential arranged in respect to the magnetizable element.

In the following, further exemplary embodiments of the apparatus for magnetizing a magnetizable element will be described. However, these embodiments also apply for the sensor device, for the method of magnetizing the magnetizable object, and the method of determining a physical parameter information of a movable object.

According to an exemplary embodiment, the coupling elements may be designed as contacting elements, i.e. elements which are adapted to be connected to the magnetizable element an to form of an ohmic contact. According to this exemplary embodiment of the invention, an apparatus for magnetizing a magnetizable element to generate magnetically encoded regions is provided, the apparatus comprising electric connection elements for electrically contacting at least two different portions of the magnetizable element, and an electric signal supply unit connected to the electric connection elements and adapted for applying at least two different electric signals to the at least two different portions so as to generate at least two different magnetically encoded regions in the at least two different portions of the magnetizable element.

According to still another exemplary embodiment the coupling elements are designed as non-ohmic elements, i.e. elements which are adapted to inductively or capacitively induce a signal into the magnetizable element without direct ohmic contact, for example in the form of wires arranged close to the magnetizable element. According to this embodiment the electric coupling elements are electric non-ohmic elements adapted to be coupled non-ohmic to the at least two different portions, and the electric signal supply unit is adapted to induce non-ohmic the at least two different signals into the at least two different portions. The non-ohmic coupling may be an inductively coupling and/or a capacitively coupling. When using capacitive coupling it might be advantageous to apply a plurality of electric signals so that a usable magnetizing of the magnetically encoded region may be increased.

According to yet another exemplary embodiment of the apparatus the electric coupling elements are wires placed parallel to an axis of the magnetizable element.

According to still yet another exemplary embodiment of the apparatus wherein the electric coupling elements are wires placed tangential to an axis of the magnetizable element.

The use of wires as the electric coupling elements provides for an efficient way to inductively encoding the magnetizable element. The wires can be placed parallel, tangential or axial with respect to a longitudinal axis of the magnetizable element. Thus, a radial, an axial or tangential orientation of the magnetically encoded regions can be generated.

According to a further exemplary embodiment of the apparatus a strength of the at least two different electrical signals is substantially equal, i.e. electrical signals having the substantial same current value are used. In this case it is preferred that the two different signals are different in the direction of the current which is applied to the electric coupling element.

According to still a further exemplary embodiment of the apparatus the electric coupling elements are arranged in a first group of electric coupling elements and in a second group of electric coupling elements, wherein an electric signal of a predetermined strength is applied to the electric coupling elements of the first group and an electric signal of the predetermined strength is applied to the electric coupling elements of the second group wherein the signal applied to the first group have an opposite direction than the signal applied to the second group.

According to yet still a further exemplary embodiment of the apparatus between each two electric coupling elements of the first group a single electric coupling element of the second group is arranged, i.e. electric coupling elements of the first group and of the second group are arranged in an alternating sequence along the circumference of the magnetizable element or along a longitudinal axis of the magnetizable element.

According to yet a further exemplary embodiment of the apparatus the coupling elements are arranged evenly spaced, or unevenly spaced, or logarithmically spaced around the magnetizable element. This are some examples of the uneven structures which can be introduced into the magnetizable element, i.e. of uneven fieldcoding.

The electric connection elements may be connected to form groups of electric connection elements, wherein each group of electric connection elements may be assigned to a respective one of the at least two different portions, wherein at least one of the electric connection elements of a group of electric connection elements may be adapted to guide a respective electric signal from the electric signal supply unit to the respective portion, and at least one of the electric connection elements of a group of electric connection elements may be adapted to guide a respective electric signal from the respective portion to the electric signal supply unit.

By taking this measure, different portions of the magnetizable element may be individually magnetized substantially free from an interference with the magnetizing properties of adjacent portions. The magnetization of different portions may be performed simultaneously or subsequently. Thus, even complicated patterns of magnetic field properties may be generated on the surface of the object to be magnetized.

Particularly, the magnetically encoded regions may be generated with a varying magnetic strength in the at least two portions of the movable object and/or with a varying magnetic polarity in the at least two portions of the movable object.

The apparatus may be adapted for magnetizing a tube-like magnetizable element in such a manner that, in a planar projection of the surface of the magnetizable element, the magnetic strength and/or the polarity of the magnetically encoded regions may form a chessboard-like structure. A chessboard-like structure is an example for an uneven structure of the magnetic field introduced into the magnetizable element, but substantially every desired pattern can be generated.

Thus, different regions with different polarities and different strengths may be provided adjacent to another. For instance, the "black" fields of the chessboard may be formed by portions having a positive polarity, and "white" fields of the chessboard may be formed by portions having a negative polarity.

In an exemplary embodiment the apparatus according to the invention is adapted such that the at least two magnetically encoded region may be manufactured in accordance with the manufacturing steps of applying a first current pulse to a magnetizable element, wherein the first current pulse is applied such that there is a first current flow in a first direction along a longitudinal axis of the magnetizable element, wherein the first current pulse is such that the application of the current pulse generates one of the at least two magnetically encoded region in the magnetizable element.

According to yet a further exemplary embodiment the apparatus may be further adapted to apply a second current pulse to the respective portion, and to apply the second current pulse such that there is a second current flow in a second direction along the longitudinal axis of the respective portion.

According to still a further exemplary embodiment the apparatus may be adapted such that each of the first and second current pulses has a raising edge and a falling edge, wherein the raising edge is steeper than the falling edge (see FIG. 30, 35).

According to still a further exemplary embodiment of the apparatus the first direction is opposite to the second direction.

According to still another exemplary embodiment the apparatus further comprising a plurality of electric signal supply units, wherein each of the electric signal supply units is adapted to apply electric signals to an assigned one of the portions.

According to yet another exemplary embodiment the apparatus further comprising a single electric supply unit which is adapted to apply electric signals to all of the portions.

According to yet still another exemplary embodiment the apparatus further comprising electric connection elements for contacting a number of $\alpha$ different portions of the magnetizable element with $\alpha=2 \cdot n$, $n \in \mathbb{N}$, i.e. n is a whole positive number.

In the following, further exemplary embodiments of the sensor device will be described. However, these embodiments also apply for the apparatus for magnetizing a magnetizable element, for the method of magnetizing the magnetizable object, and the method of determining a physical parameter information of a movable object.

According to an exemplary embodiment the sensor device comprising a number of α magnetically encoded regions arranged on the movable object with α=2·n, n∈N and further comprising a number of β magnetic field detectors with β={n∈N|γ>0}, wherein $$\gamma = \left(\frac{\alpha}{n}\right) - \text{int}\left(\frac{\alpha}{n}\right),$$

n∈N. That is, the sensor device comprises an even number of magnetically encoded regions. Furthermore, the sensor device comprises a plurality of magnetic field detectors, wherein the number of magnetic field detectors depends on the number of magnetically encoded regions.

For each number of magnetically encoded regions several numbers of magnetic field detectors are selectable, wherein the number of magnetic field sensors has to be different from one and the number of magnetically encoded regions. Furthermore, numbers are excluded which are a so-called "unbroken factor" of the number of magnetically encoded regions. For example, for eight magnetically encoded regions, the possible number of magnetic field detectors is three, five, six, seven, nine, ten eleven and so on. The numbers of two and four are excluded, because these numbers are unbroken factors of eight. By choosing such a relation between the number of magnetically encoded regions and the number of magnetic field detectors it might be possible to prevent ambiguous measurements which may be hard or even impossible to interpret. This might be since each of the magnetic field detectors may measure a different signal or at least may measure a different behaviour of the signal in time, since each magnetic field detector may be placed in a different part of the magnetically encoded region. Thus, each magnetic field detector may see a change of a signal which might be induced to the magnetic field detector by the magnetically encoded region at a different point in time, while the moveable object is rotating.

According to another exemplary embodiment of the sensor device the at least one physical parameter is selected from the group consisting of a position of the movable object, a torque applied to the movable object, a pulling force applied to the movable object, a bending force applied to the movable object, a shear force applied to the movable object, a dynamic force applied to the movable object, a velocity of the movable object, an angular position of the moveable object, a speed information of the moveable object, and a power of the movable object.

According to still another exemplary embodiment of the sensor device the physical parameter information determining unit comprising a signal conditioning signal processing unit coupled with the at least three magnetic field detector and adapted to process the detected signal and to generate a processed detected signal.

According to an exemplary embodiment of the sensor device the physical parameter information determining unit further comprising a first determining element and a filter element, wherein the first determining element is adapted to provide an indication signal based on the processed detected signal, which indication signal represents a first physical parameter information, and which is transmitted to the filter element as a filter signal. Furthermore, the filter element is adapted to provide an output signal representing a second physical parameter information based on the processed detected signal and the filter signal.

By using a first physical parameter determined out of the signals of magnetic field detectors as a filter for the detection of a second physical parameter an efficient way for determining this second physical parameter might be provided. In particular, the value of the second physical parameter might be determined with a good reliability.

According to still another exemplary embodiment of the sensor device the first physical parameter is a speed information of the moveable object and/or the second physical parameter is a dynamic force.

The use of speed information about the moveable object might be a suitable information which can be used as an input for the filter element when a dynamic force applied to the moveable object shall be determined.

According to yet another exemplary embodiment of the sensor device the physical parameter information determining unit further comprises a rectifier adapted to rectify the output signal of the filter element.

The above and other aspects, objects, features and advantages of the present invention will become apparent from the following description and the appended claim, taken in conjunction with the accompanying drawings in which like parts or elements are denoted by like reference numbers.

BRIEF DESCRIPTION OF THE DRAWINGS

The accompanying drawings which are included to provide a further understanding of the invention in constitute a part of the specification illustrate exemplary embodiments of the present invention. However, those drawings are not provided for restricting a scope of the invention to the explicit embodiments depicted in the figures. In particular, features described in connection with one exemplary embodiments may also be employed in connection with another exemplary embodiment.

FIG. 2b shows a cross-sectional view along AA' of FIG. 2a.

FIG. 3a shows another exemplary embodiment of a sensor element of a torque sensor according to the present invention for further explaining a principle of the present invention and an exemplary embodiment of a method of manufacturing a torque sensor according to the present invention.

FIG. 3b shows a cross-sectional representation along BB' of FIG. 3a.

FIG. 4 shows a cross-sectional representation of the sensor element of the torque sensor of FIGS. 2a and 3a manufactured in accordance with a method according to an exemplary embodiment of the present invention.

FIG. 10b shows the sensor element of FIG. 10a after the application of current surges by means of the electrode system of FIG. 10a.

FIG. 14 shows another schematic diagram for illustrating that when no mechanical stress is applied to the sensor element according to an exemplary embodiment of the present invention, magnetic flux lines are running in its original paths.

FIG. 15 is another schematic diagram for further explaining a principle of an exemplary embodiment of the present invention.

FIG. 16 is another schematic diagram for further explaining the principle of an exemplary embodiment of the present invention.

FIG. 73 schematically shows an exemplary embodiment of an encoding technique.

FIG. 74 schematically shows a magnetization achieved using one wire for encoding.

Figure 1:
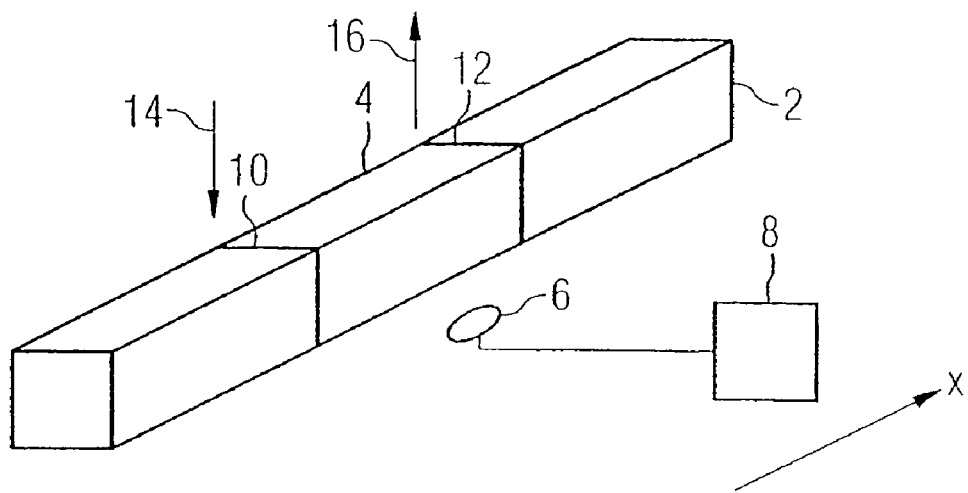
FIG. 1 shows a torque sensor with a sensor element according to an exemplary embodiment of the present invention for explaining a method of manufacturing a torque sensor according to an exemplary embodiment of the present invention.

In the following several exemplary embodiments of the present invention are elucidated in detail, wherein the features which are elucidated in connection with one embodiment may also be applied to the other embodiments.

In one aspect the present invention relates to a sensor having a sensor element, or moveable object, such as a shaft wherein the sensor element is manufactured in accordance with the following manufacturing steps applying a first current pulse to the sensor element;
wherein the first current pulse is applied such that there is a first current flow in a first direction along a longitudinal axis of the sensor element;
wherein the first current pulse is such that the application of the current pulse generates a magnetically encoded region in the sensor element.

According to another exemplary embodiment of the present invention, a further second current pulse is applied to the sensor element. The second current pulse is applied such that there is a second current flow in a direction along the longitudinal axis of the sensor element.

According to another exemplary embodiment of the present invention, the directions of the first and second current pulses are opposite to each other. Also, according to further exemplary embodiments of the present invention, each of the first and second current pulses has a raising edge and a falling edge. Preferably, the raising edge is steeper than the falling edge.

It is believed that the application of a current pulse according to an exemplary embodiment of the present invention may cause a magnetic field structure in the sensor element such that in a cross-sectional view of the sensor element, there is a first circular magnetic flow having a first direction and a second magnetic flow having a second direction. The radius of the first magnetic flow is larger than the radius of the second magnetic flow. In shafts having a non-circular cross-section, the magnetic flow is not necessarily circular but may have a form essentially corresponding to and being adapted to the cross-section of the respective sensor element.

It is believed that if no torque is applied to a sensor element encoded in accordance with the exemplary embodiment of the present invention, there is no magnetic field or essentially no magnetic field detectable at the outside. When a torque or force is applied to the sensor element, there is a magnetic field emanated from the sensor element which can be detected by means of suitable coils. This will be described in further detail in the following.

A torque sensor according to an exemplary embodiment of the present invention has a circumferential surface surrounding a core region of the sensor element. The first current pulse is introduced into the sensor element at a first location at the circumferential surface such that there is a first current flow in the first direction in the core region of the sensor element. The first current pulse is discharged from the sensor element at a second location at the circumferential surface. The second location is at a distance in the first direction from the first location. The second current pulse, according to an exemplary embodiment of the present invention may be introduced into the sensor element at the second location or adjacent to the second location at the circumferential surface such that there is the second current flow in the second direction in the core region or adjacent to the core region in the sensor element. The second current pulse may be discharged from the sensor element at the first location or adjacent to the first location at the circumferential surface.

As already indicated above, according to an exemplary embodiment of the present invention, the sensor element may be a shaft. The core region of such shaft may extend inside the shaft along its longitudinal extension such that the core region surrounds a center of the shaft. The circumferential surface of the shaft is the outside surface of the shaft. The first and second locations are respective circumferential regions at the outside of the shaft. There may be a limited number of contact portions which constitute such regions. Preferably, real contact regions may be provided, for example, by providing electrode regions made of brass rings as electrodes. Also, a core of a conductor may be looped around the shaft to provide for a good electric contact between a conductor such as a cable without isolation and the shaft.

According to an exemplary embodiment of the present invention, the first current pulse and preferably also the second current pulse are not applied to the sensor element at an end face of the sensor element. The first current pulse may have a maximum between 40 and 1400 Ampere or between 60 and 800 Ampere or between 75 and 600 Ampere or between 80 and 500 Ampere. The current pulse may have a maximum such that an appropriate encoding is caused to the sensor element. However, due to different materials which may be used and different forms of the sensor element and different dimensions of the sensor element, a maximum of the current pulse may be adjusted in accordance with these parameters. The second pulse may have a similar maximum or may have a maximum approximately 10, 20, 30, 40 or 50% smaller than the first maximum. However, the second pulse may also have a higher maximum such as 10, 20, 40, 50, 60 or 80% higher than the first maximum.

A duration of those pulses may be the same. However, it is possible that the first pulse has a significant longer duration than the second pulse. However, it is also possible that the second pulse has a longer duration than the first pulse.

The first and/or second current pulses have a first duration from the start of the pulse to the maximum and have a second duration from the maximum to essentially the end of the pulse. According to an exemplary embodiment of the present invention, the first duration is significantly longer than the second duration. For example, the first duration may be smaller than 300 ms wherein the second duration is larger than 300 ms. However, it is also possible that the first duration is smaller than 200 ms whereas the second duration is larger than 400 ms. Also, the first duration according to another exemplary embodiment of the present invention may be between 20 to 150 ms wherein the second duration may be between 180 to 700 ms.

As already indicated above, it is possible to apply a plurality of first current pulses but also a plurality of second current pulses. The sensor element may be made of steel whereas the steel may comprise nickel. The sensor material used for the primary sensor or for the sensor element may be 50NiCr13 or X4CrNi13-4 or X5CrNiCuNb16-4 or X20CrNi17-4 or X46Cr13 or X20Cr13 or 14NiCr14 or S155 as set forth in DIN 1.2721 or 1.4313 or 1.4542 or 1.2787 or 1.4034 or 1.4021 or 1.5752 or 1.6928.

The first current pulse may be applied by means of an electrode system having at least a first electrode and a second electrode. The first electrode is located at the first location or adjacent to the first location and the second electrode is located at the second location or adjacent to the second location.

According to an exemplary embodiment of the present invention, each of the first and second electrodes has a plurality of electrode pins. The plurality of electrode pins of each of the first and second electrodes may be arranged circumferentially around the sensor element such that the sensor element is contacted by the electrode pins of the first and second electrodes at a plurality of contact points at an outer circumferential surface of the shaft at the first and second locations.

As indicated above, instead of electrode pins laminar or two-dimensional electrode surfaces may be applied. Preferably, electrode surfaces are adapted to surfaces of the shaft such that a good contact between the electrodes and the shaft material may be ensured.

According to another exemplary embodiment of the present invention, at least one of the first current pulse and at least one of the second current pulse are applied to the sensor element such that the sensor element has a magnetically encoded region such that in a direction essentially perpendicular to a surface of the sensor element, the magnetically encoded region of the sensor element has a magnetic field structure such that there is a first magnetic flow in a first direction and a second magnetic flow in a second direction. According to another exemplary embodiment of the present invention, the first direction is opposite to the second direction.

According to a further exemplary embodiment of the present invention, in a cross-sectional view of the sensor element, there is a first circular magnetic flow having the first direction and a first radius and a second circular magnetic flow having the second direction and a second radius. The first radius may be larger than the second radius.

Furthermore, according to another exemplary embodiment of the present invention, the sensor elements may have a first pinning zone adjacent to the first location and a second pinning zone adjacent to the second location.

The pinning zones may be manufactured in accordance with the following manufacturing method according to an exemplary embodiment of the present invention. According to this method, for forming the first pinning zone, at the first location or adjacent to the first location, a third current pulse is applied on the circumferential surface of the sensor element such that there is a third current flow in the second direction. The third current flow is discharged from the sensor element at a third location which is displaced from the first location in the second direction.

According to another exemplary embodiment of the present invention, for forming the second pinning zone, at the second location or adjacent to the second location, a forth current pulse is applied on the circumferential surface to the sensor element such that there is a forth current flow in the first direction. The forth current flow is discharged at a forth location which is displaced from the second location in the first direction.

According to another exemplary embodiment of the present invention, a torque sensor is provided comprising a first sensor element with a magnetically encoded region wherein the first sensor element has a surface. According to the present invention, in a direction essentially perpendicular to the surface of the first sensor element, the magnetically encoded region of the first sensor element has a magnetic field structure such that there is a first magnetic flow in a first direction and a second magnetic flow in a second direction. The first and second directions may be opposite to each other.

According to another exemplary embodiment of the present invention, the torque sensor may further comprise a second sensor element with at least one magnetic field detector. The second sensor element is adapted for detecting variations in the magnetically encoded region. More precisely, the second sensor element is adapted for detecting variations in a magnetic field emitted from the magnetically encoded region of the first sensor element.

According to another exemplary embodiment of the present invention, the magnetically encoded region extends longitudinally along a section of the first sensor element, but does not extend from one end face of the first sensor element to the other end face of the first sensor element. In other words, the magnetically encoded region does not extend along all of the first sensor element but only along a section thereof.

According to another exemplary embodiment of the present invention, the first sensor element has variations in the material of the first sensor element caused by at least one current pulse or surge applied to the first sensor element for altering the magnetically encoded region or for generating the magnetically encoded region. Such variations in the material may be caused, for example, by differing contact resistances between electrode systems for applying the current pulses and the surface of the respective sensor element. Such variations may, for example, be burn marks or color variations or signs of an annealing.

According to another exemplary embodiment of the present invention, the variations are at an outer surface of the sensor element and not at the end faces of the first sensor element since the current pulses are applied to outer surface of the sensor element but not to the end faces thereof.

According to another exemplary embodiment of the present invention, a shaft for a magnetic sensor is provided having, in a cross-section thereof, at least two circular magnetic loops running in opposite direction. According to another exemplary embodiment of the present invention, such shaft is believed to be manufactured in accordance with the above-described manufacturing method.

Furthermore, a shaft may be provided having at least two circular magnetic loops which are arranged concentrically.

According to another exemplary embodiment of the present invention, a shaft for a torque sensor may be provided which is manufactured in accordance with the following manufacturing steps where firstly a first current pulse is applied to the shaft. The first current pulse is applied to the shaft such that there is a first current flow in a first direction along a longitudinal axis of the shaft. The first current pulse is such that the application of the current pulse generates a magnetically encoded region in the shaft. This may be made by using an electrode system as described above and by applying current pulses as described above.

According to another exemplary embodiment of the present invention, an electrode system may be provided for applying current surges to a sensor element for a torque sensor, the electrode system having at least a first electrode and a second electrode wherein the first electrode is adapted for location at a first location on an outer surface of the sensor element. A second electrode is adapted for location at a second location on the outer surface of the sensor element. The first and second electrodes are adapted for applying and discharging at least one current pulse at the first and second locations such that current flows within a core region of the sensor element are caused. The at least one current pulse is such that a magnetically encoded region is generated at a section of the sensor element.

According to an exemplary embodiment of the present invention, the electrode system comprises at least two groups of electrodes, each comprising a plurality of electrode pins. The electrode pins of each electrode are arranged in a circle such that the sensor element is contacted by the electrode pins of the electrode at a plurality of contact points at an outer surface of the sensor element.

The outer surface of the sensor element does not include the end faces of the sensor element.

FIG. 1 shows an exemplary embodiment of a torque sensor according to the present invention. The torque sensor comprises a first sensor element or shaft 2 having a rectangular cross-section. The first sensor element 2 extends essentially along the direction indicated with X. In a middle portion of the first sensor element 2, there is the encoded region 4. The first location is indicated by reference numeral 10 and indicates one end of the encoded region and the second location is indicated by reference numeral 12 which indicates another end of the encoded region or the region to be magnetically encoded 4. Arrows 14 and 16 indicate the application of a current pulse. As indicated in FIG. 1, a first current pulse is applied to the first sensor element 2 at an outer region adjacent or close to the first location 10. Preferably, as will be described in further detail later on, the current is introduced into the first sensor element 2 at a plurality of points or regions close to the first location and preferably surrounding the outer surface of the first sensor element 2 along the first location 10. As indicated with arrow 16, the current pulse is discharged from the first sensor element 2 close or adjacent or at the second location 12 preferably at a plurality or locations along the end of the region 4 to be encoded. As already indicated before, a plurality of current pulses may be applied in succession they may have alternating directions from location 10 to location 12 or from location 12 to location 10.

Reference numeral 6 indicates a second sensor element which is preferably a coil connected to a controller electronic 8. The controller electronic 8 may be adapted to further process a signal output by the second sensor element 6 such that an output signal may output from the control circuit corresponding to a torque applied to the first sensor element 2. The control circuit 8 may be an analog or digital circuit. The second sensor element 6 is adapted to detect a magnetic Field emitted by the encoded region 4 of the first sensor element.

It is believed that, as already indicated above, if there is no stress or force applied to the first sensor element 2, there is essentially no field detected by the second sensor element 6. However, in case a stress or a force is applied to the secondary sensor element 2, there is a variation in the magnetic field emitted by the encoded region such that an increase of a magnetic field from the presence of almost no field is detected by the second sensor element 6.

It has to be noted that according to other exemplary embodiments of the present invention, even if there is no stress applied to the first sensor element, it may be possible that there is a magnetic field detectable outside or adjacent to the encoded region 4 of the first sensor element 2.

However, it is to be noted that a stress applied to the first sensor element 2 causes a variation of the magnetic field emitted by the encoded region 4.

In the following, with reference to FIGS. 2a, 2b, 3a, 3b and 4, a method of manufacturing a torque sensor according to an exemplary embodiment of the present invention will be described. In particular, the method relates to the magnetization of the magnetically encoded region 4 of the first sensor element 2.

Figure 2A:
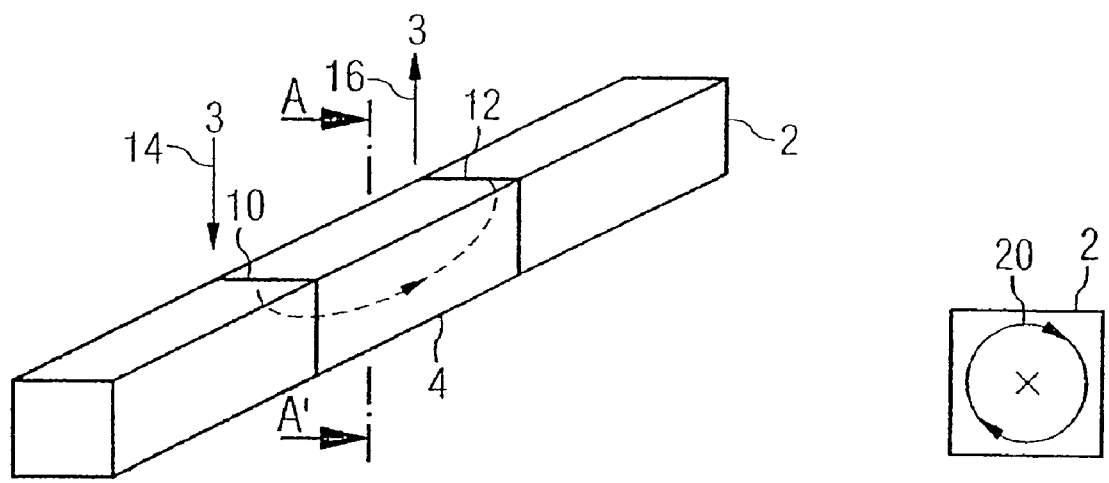
FIG. 2a shows an exemplary embodiment of a sensor element of a torque sensor according to the present invention for further explaining a principle of the present invention and an aspect of an exemplary embodiment of a manufacturing method of the present invention.

As may be taken from FIG. 2a, a current I is applied to an end region of a region 4 to be magnetically encoded. This end region as already indicated above is indicated with reference numeral 10 and may be a circumferential region on the outer surface of the first sensor element 2. The current I is discharged from the first sensor element 2 at another end area of the magnetically encoded region (or of the region to be magnetically encoded) which is indicated by reference numeral 12 and also referred to a second location. The current is taken from the first sensor element at an outer surface thereof, preferably circumferentially in regions close or adjacent to location 12. As indicated by the dashed line between locations 10 and 12, the current I introduced at or along location 10 into the first sensor element flows through a core region or parallel to a core region to location 12. In other words, the current I flows through the region 4 to be encoded in the first sensor element 2.

Figure 2B:
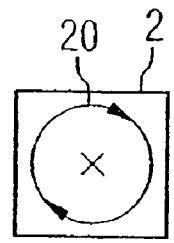

FIG. 2b shows a cross-sectional view along AA'. In the schematic representation of FIG. 2b, the current flow is indicated into the plane of the FIG. 2b as a cross. Here, the current flow is indicated in a center portion of the cross-section of the first sensor element 2. It is believed that this introduction of a current pulse having a form as described above or in the following and having a maximum as described above or in the following causes a magnetic flow structure 20 in the cross-sectional view with a magnetic flow direction into one direction here into the clockwise direction. The magnetic flow structure 20 depicted in FIG. 2b is depicted essentially circular. However, the magnetic flow structure 20 may be adapted to the actual cross-section of the first sensor element 2 and may be, for example, more elliptical.

FIGS. 3a and 3b show a step of the method according to an exemplary embodiment of the present invention which may be applied after the step depicted in FIGS. 2a and 2b. FIG. 3a shows a first sensor element according to an exemplary embodiment of the present invention with the application of a second current pulse and FIG. 3b shows a cross-sectional view along BB' of the first sensor element 2.

As may be taken from FIG. 3a, in comparison to FIG. 2a, in FIG. 3a, the current I indicated by arrow 16 is introduced into the sensor element 2 at or adjacent to location 12 and is discharged or taken from the sensor element 2 at or adjacent to the location 10. In other words, the current is discharged in FIG. 3a at a location where it was introduced in FIG. 2a and vice versa. Thus, the introduction and discharging of the current I into the first sensor element 2 in FIG. 3a may cause a current through the region 4 to be magnetically encoded opposite to the respective current flow in FIG. 2a.

The current is indicated in FIG. 3b in a core region of the sensor element 2. As may be taken from a comparison of FIGS. 2b and 3b, the magnetic flow structure 22 has a direction opposite to the current flow structure 20 in FIG. 2b.

As indicated before, the steps depicted in FIGS. 2a, 2b and 3a and 3b may be applied individually or may be applied in succession of each other. When firstly, the step depicted in FIGS. 2a and 2b is performed and then the step depicted in FIGS. 3a and 3b, a magnetic flow structure as depicted in the cross-sectional view through the encoded region 4 depicted in FIG. 4 may be caused. As may be taken from FIG. 4, the two current flow structures 20 and 22 are encoded into the encoded region together. Thus, in a direction essentially perpendicular to a surface of the first sensor element 2, in a direction to the core of the sensor element 2, there is a first magnetic flow having a first direction and then underlying there is a second magnetic flow having a second direction. As indicated in FIG. 4, the flow directions may be opposite to each other.

Thus, if there is no torque applied to the first torque sensor element 2, the two magnetic flow structures 20 and 22 may cancel each other such that there is essentially no magnetic field at the outside of the encoded region. However, in case a stress or force is applied to the first sensor element 2, the magnetic field structures 20 and 22 cease to cancel each other such that there is a magnetic field occurring at the outside of the encoded region which may then be detected by means of the secondary sensor element 6. This will be described in further detail in the following.

Figure 5:
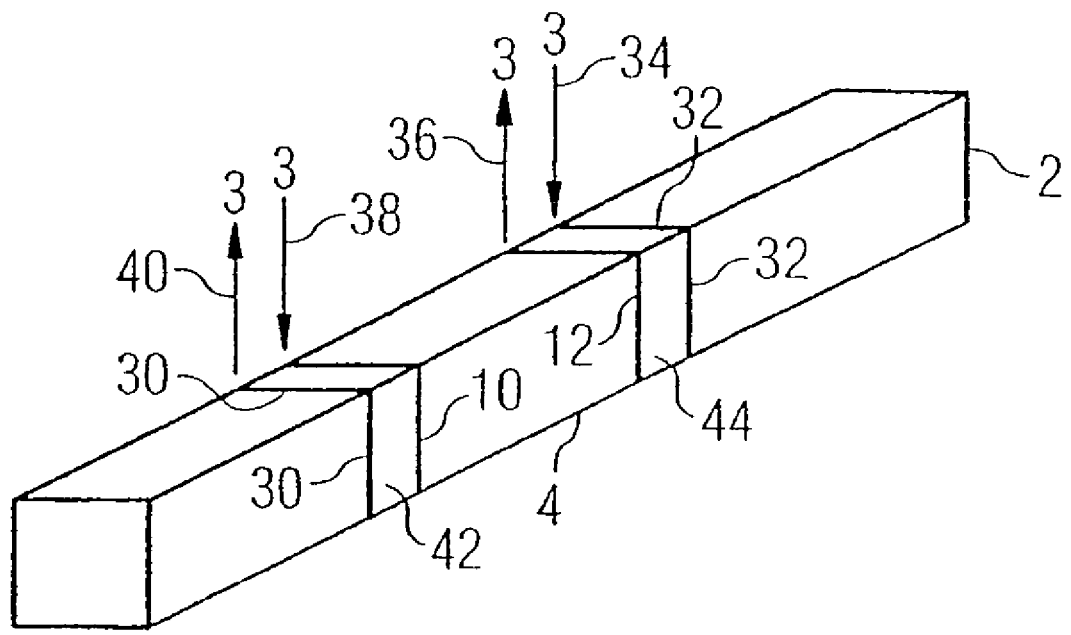
FIG. 5 shows another exemplary embodiment of a sensor element of a torque sensor according to the present invention for further explaining an exemplary embodiment of a manufacturing method of manufacturing a torque sensor according to the present invention.

FIG. 5 shows another exemplary of a first sensor element 2 according to an exemplary embodiment of the present invention as may be used in a torque sensor according to an exemplary embodiment which is manufactured according to a manufacturing method according to an exemplary embodiment of the present invention. As may be taken from FIG. 5, the first sensor element 2 has an encoded region 4 which is preferably encoded in accordance with the steps and arrangements depicted in FIGS. 2a, 2b, 3a, 3b and 4.

Adjacent to locations 10 and 12, there are provided pinning regions 42 and 44. These regions 42 and 44 are provided for avoiding a fraying of the encoded region 4. In other words, the pinning regions 42 and 44 may allow for a more definite beginning and end of the encoded region 4.

In short, the first pinning region 42 may be adapted by introducing a current 38 close or adjacent to the first location 10 into the first sensor element 2 in the same manner as described, for example, with reference to FIG. 2a. However, the current I is discharged from the first sensor element 2 at a first location 30 which is at a distance from the end of the encoded region close or at location 10. This further location is indicated by reference numeral 30. The introduction of this further current pulse I is indicated by arrow 38 and the discharging thereof is indicated by arrow 40. The current pulses may have the same form shaping maximum as described above.

For generating the second pinning region 44, a current is introduced into the first sensor element 2 at a location 32 which is at a distance from the end of the encoded region 4 close or adjacent to location 12. The current is then discharged from the first sensor element 2 at or close to the location 12. The introduction of the current pulse I is indicated by arrows 34 and 36.

The pinning regions 42 and 44 preferably are such that the magnetic flow structures of these pinning regions 42 and 44 are opposite to the respective adjacent magnetic flow structures in the adjacent encoded region 4. As may be taken from FIG. 5, the pinning regions can be coded to the first sensor element 2 after the coding or the complete coding of the encoded region 4.

Figure 6:
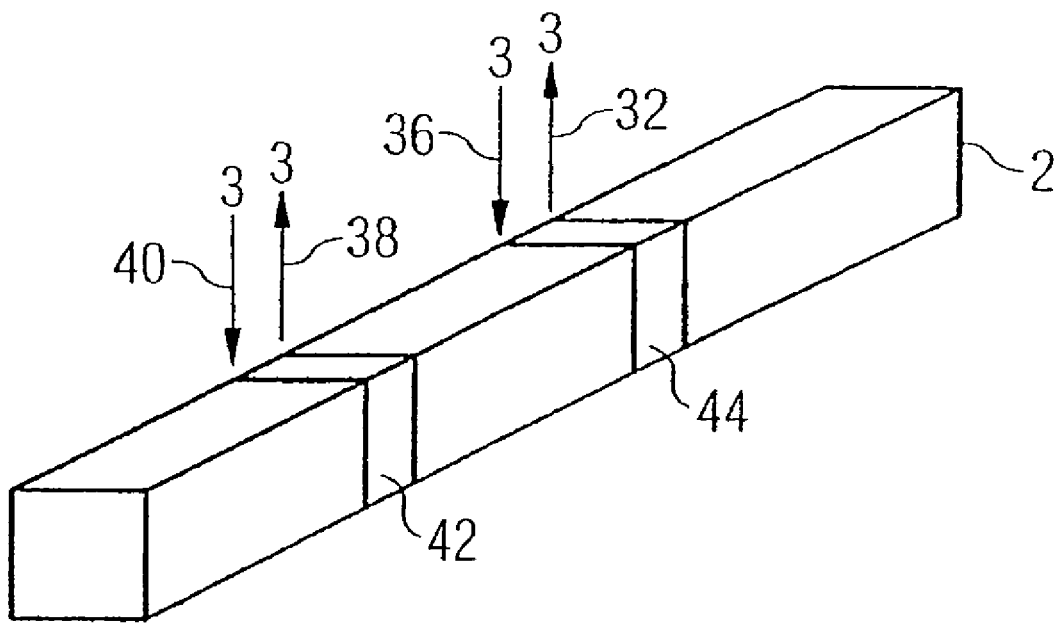
FIG. 6 shows another exemplary embodiment of a sensor element of a torque sensor according to the present invention for further explaining an exemplary embodiment of a manufacturing method for a torque sensor according to the present invention.

FIG. 6 shows another exemplary embodiment of the present invention where there is no encoding region 4. In other words, according to an exemplary embodiment of the present invention, the pinning regions may be coded into the first sensor element 2 before the actual coding of the magnetically encoded region 4.

Figure 7:
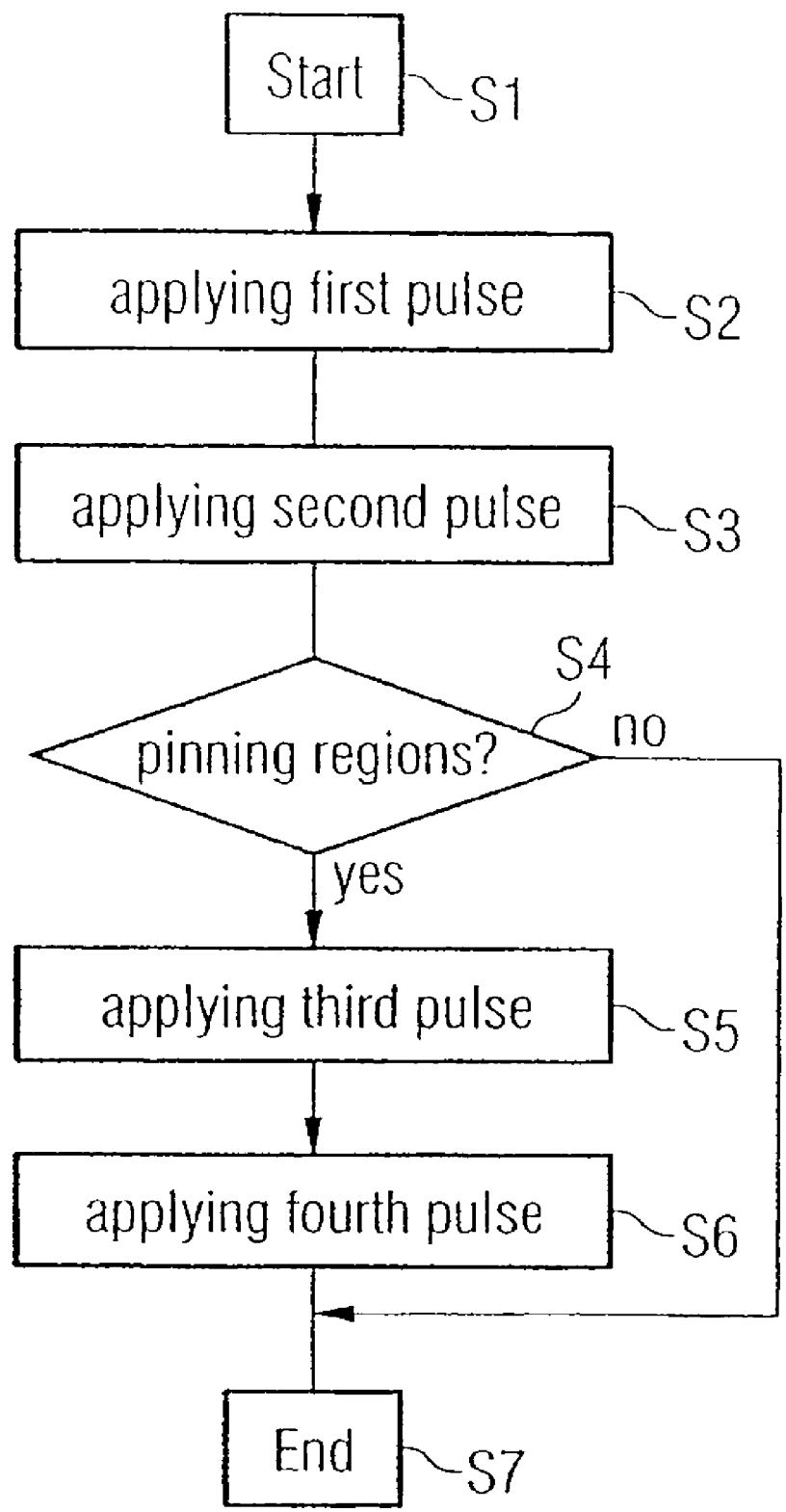
FIG. 7 shows a flow-chart for further explaining an exemplary embodiment of a method of manufacturing a torque sensor according to the present invention.

FIG. 7 shows a simplified flow-chart of a method of manufacturing a first sensor element 2 for a torque sensor according to an exemplary embodiment of the present invention.

After the start in step S1, the method continues to step S2 where a first pulse is applied as described as reference to FIGS. 2a and 2b. Then, after step S2, the method continues to step S3 where a second pulse is applied as described with reference to FIGS. 3a and 3b.

Then, the method continues to step S4 where it is decided whether the pinning regions are to be coded to the first sensor element 2 or not. If it is decided in step S4 that there will be no pinning regions, the method continues directly to step S7 where it ends.

If it is decided in step S4 that the pinning regions are to be coded to the first sensor element 2, the method continues to step S5 where a third pulse is applied to the pinning region 42 in the direction indicated by arrows 38 and 40 and to pinning region 44 indicated by the arrows 34 and 36. Then, the method continues to step S6 where force pulses applied to the respective pinning regions 42 and 44. To the pinning region 42, a force pulse is applied having a direction opposite to the direction indicated by arrows 38 and 40. Also, to the pinning region 44, a force pulse is applied to the pinning region having a direction opposite to the arrows 34 and 36. Then, the method continues to step S7 where it ends.

In other words, preferably two pulses are applied for encoding of the magnetically encoded region 4. Those current pulses preferably have an opposite direction. Furthermore, two pulses respectively having respective directions are applied to the pinning region 42 and to the pinning region 44.

Figure 8:
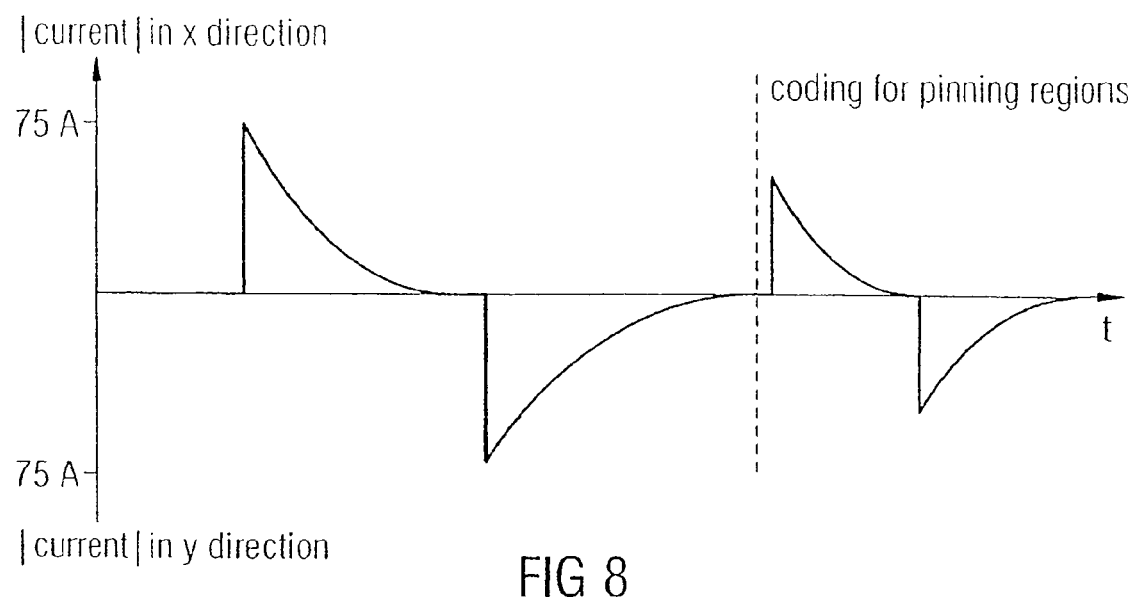
FIG. 8 shows a current versus time diagram for further explaining a method according to an exemplary embodiment of the present invention.

FIG. 8 shows a current versus time diagram of the pulses applied to the magnetically encoded region 4 and to the pinning regions. The positive direction of the y-axis of the diagram in FIG. 8 indicates a current flow into the x-direction and the negative direction of the y-axis of FIG. 8 indicates a current flow in the y-direction.

As may be taken from FIG. 8 for coding the magnetically encoded region 4, firstly a current pulse is applied having a direction into the x-direction. As may be taken from FIG. 8, the raising edge of the pulse is very sharp whereas the falling edge has a relatively long direction in comparison to the direction of the raising edge. As depicted in FIG. 8, the pulse may have a maximum of approximately 75 Ampere. In other applications, the pulse may be not as sharp as depicted in FIG. 8. However, the raising edge should be steeper or should have a shorter duration than the falling edge.

Then, a second pulse is applied to the encoded region 4 having an opposite direction. The pulse may have the same form as the first pulse. However, a maximum of the second pulse may also differ from the maximum of the first pulse. Although the immediate shape of the pulse may be different.

Then, for coding the pinning regions, pulses similar to the first and second pulse may be applied to the pinning regions as described with reference to FIGS. 5 and 6. Such pulses may be applied to the pinning regions simultaneously but also successfully for each pinning region. As depicted in FIG. 8, the pulses may have essentially the same form as the first and second pulses. However, a maximum may be smaller.

Figure 9:
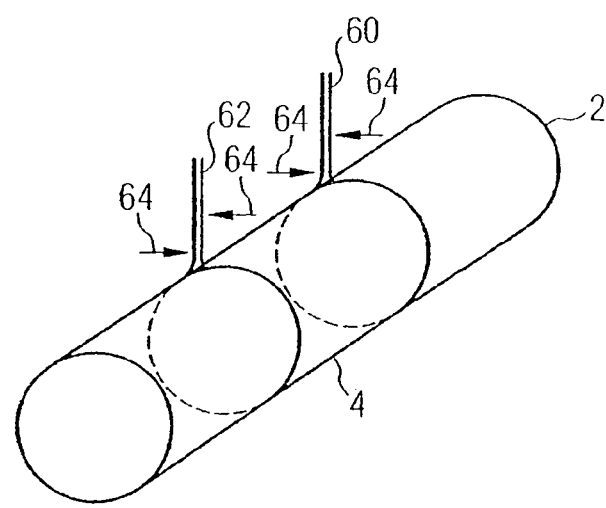
FIG. 9 shows another exemplary embodiment of a sensor element of a torque sensor according to the present invention with an electrode system according to an exemplary embodiment of the present invention.

FIG. 9 shows another exemplary embodiment of a first sensor element of a torque sensor according to an exemplary embodiment of the present invention showing an electrode arrangement for applying the current pulses for coding the magnetically encoded region 4. As may be taken from FIG. 9, a conductor without an isolation may be looped around the first sensor element 2 which is may be taken from FIG. 9 may be a circular shaft having a circular cross-section. For ensuring a close fit of the conductor on the outer surface of the first sensor element 2, the conductor may be clamped as shown by arrows 64.

Figure 10A:
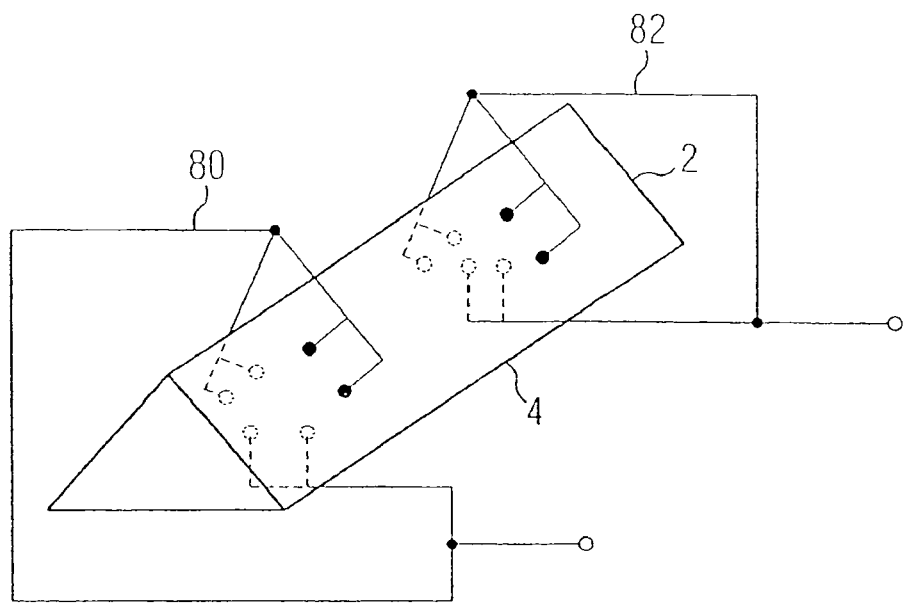
FIG. 10a shows another exemplary embodiment of a torque sensor according to the present invention with an electrode system according to an exemplary embodiment of the present invention.
Figure 10B:
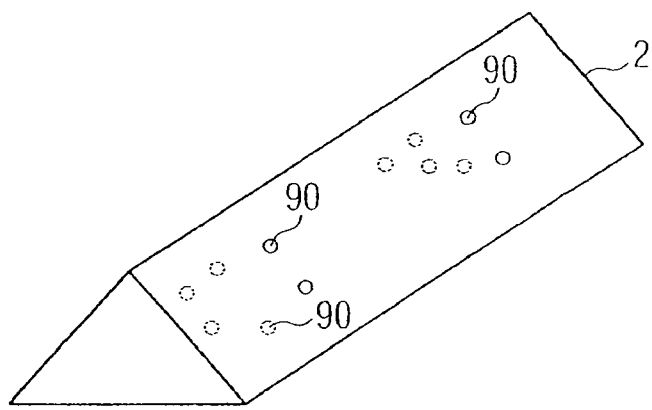

FIG. 10a shows another exemplary embodiment of a first sensor element according to an exemplary embodiment of the present invention. Furthermore, FIG. 10a shows another exemplary embodiment of an electrode system according to an exemplary embodiment of the present invention. The electrode system 80 and 82 depicted in FIG. 10a contacts the first sensor element 2 which has a triangular cross-section with two contact points at each phase of the triangular first sensor element at each side of the region 4 which is to be encoded as magnetically encoded region. Overall, there are six contact points at each side of the region 4. The individual contact points may be connected to each other and then connected to one individual contact points.

If there is only a limited number of contact points between the electrode system and the first sensor element 2 and if the current pulses applied are very high, differing contact resistances between the contacts of the electrode systems and the material of the first sensor element 2 may cause burn marks at the first sensor element 2 at contact point to the electrode systems. These burn marks 90 may be color changes, may be welding spots, may be annealed areas or may simply be burn marks. According to an exemplary embodiment of the present invention, the number of contact points is increased or even a contact surface is provided such that such burn marks 90 may be avoided.

Figure 11:
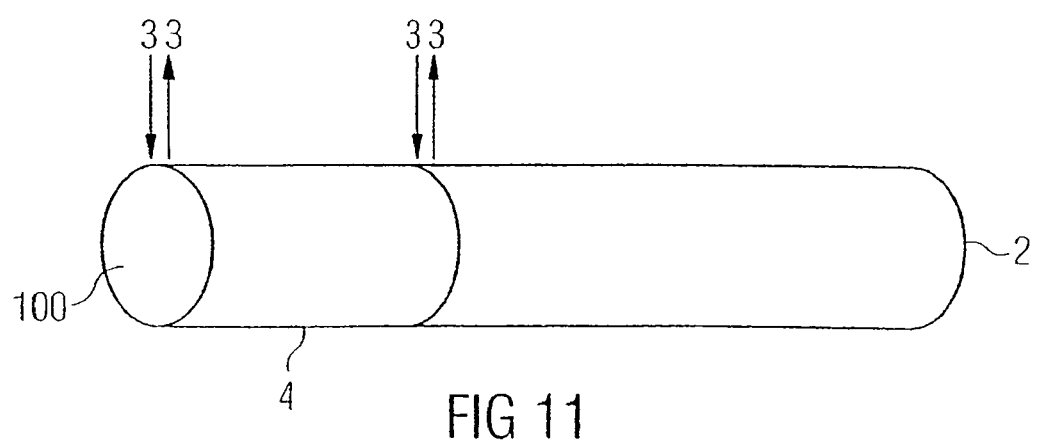
FIG. 11 shows another exemplary embodiment of a torque sensor element for a torque sensor according to the present invention.

FIG. 11 shows another exemplary embodiment of a first sensor element 2 which is a shaft having a circular cross-section according to an exemplary embodiment of the present invention. As may be taken from FIG. 11, the magnetically encoded region is at an end region of the first sensor element 2. According to an exemplary embodiment of the present invention, the magnetically encoded region 4 is not extend over the full length of the first sensor element 2. As may be taken from FIG. 11, it may be located at one end thereof. However, it has to be noted that according to an exemplary embodiment of the present invention, the current pulses are applied from an outer circumferential surface of the first sensor element 2 and not from the end face 100 of the first sensor element 2.

In the following, the so-called PCME ("Pulse-Current-Modulated Encoding") Sensing Technology will be described in detail, which can, according to a preferred embodiment of the invention, be implemented to magnetize a magnetizable object which is then partially demagnetized according to the invention. In the following, the PCME technology will partly described in the context of torque sensing. However, this concept may implemented in the context of position sensing as well.

In this description, there are a number of acronyms used as otherwise some explanations and descriptions may be difficult to read. While the acronyms "ASIC", "IC", and "PCB" are already market standard definitions, there are many terms that are particularly related to the magnetostriction based NCT sensing technology. It should be noted that in this description, when there is a reference to NCT technology or to PCME, it is referred to exemplary embodiments of the present invention.

Table 1 shows a list of abbreviations used in the following description of the PCME technology.

TABLE 1

List of abbreviations

| Acronym | Description | Category |
| --- | --- | --- |
| ASIC | Application Specific IC | Electronics |
| DF | Dual Field | Primary Sensor |
| EMF | Earth Magnetic Field | Test Criteria |
| FS | Full Scale | Test Criteria |
| Hot-Spotting | Sensitivity to nearby Ferro magnetic material | Specification |
| IC | Integrated Circuit | Electronics |
| MFS | Magnetic Field Sensor | Sensor Component |

TABLE 1-continued

List of abbreviations

| Acronym | Description | Category |
|---|---|---|
| NCT | Non Contact Torque | Technology |
| PCB | Printed Circuit Board | Electronics |
| PCME | Pulse Current Modulated Encoding | Technology |
| POC | Proof-of-Concept | |
| RSU | Rotational Signal Uniformity | Specification |
| SCSP | Signal Conditioning & Signal Processing | Electronics |
| SF | Single Field | Primary Sensor |
| SH | Sensor Host | Primary Sensor |
| SPHC | Shaft Processing Holding Clamp | Processing Tool |
| SSU | Secondary Sensor Unit | Sensor Component |

The magnetic principle based mechanical-stress sensing technology allows to design and to produce a wide range of "physical-parameter-sensors" (like Force Sensing, Torque Sensing, and Material Diagnostic Analysis) that can be applied where Ferro-Magnetic materials are used. The most common technologies used to build "magnetic-principle-based" sensors are: Inductive differential displacement measurement (requires torsion shaft), measuring the changes of the materials permeability, and measuring the magnetostriction effects.

Over the last 20 years a number of different companies have developed their own and very specific solution in how to design and how to produce a magnetic principle based torque sensor (i.e. ABB, FAST, Frauenhofer Institute, FT, Kubota, MDI, NCTE, RM, Siemens, and others). These technologies are at various development stages and differ in "how-it-works", the achievable performance, the systems reliability, and the manufacturing/system cost.

Some of these technologies require that mechanical changes are made to the shaft where torque should be measured (chevrons), or rely on the mechanical torsion effect (require a long shaft that twists under torque), or that something will be attached to the shaft itself (press-fitting a ring of certain properties to the shaft surface), or coating of the shaft surface with a special substance. No-one has yet mastered a high-volume manufacturing process that can be applied to (almost) any shaft size, achieving tight performance tolerances, and is not based on already existing technology patents.

In the following, a magnetostriction principle based Non-Contact-Torque (NCT) Sensing Technology is described that offers to the user a whole host of new features and improved performances, previously not available. This technology enables the realization of a fully-integrated (small in space), real-time (high signal bandwidth) torque measurement, which is reliable and can be produced at an affordable cost, at any desired quantities. This technology is called: PCME (for Pulse-Current-Modulated Encoding) or Magnetostriction Transversal Torque Sensor.

The PCME technology can be applied to the shaft without making any mechanical changes to the shaft, or without attaching anything to the shaft. Most important, the PCME technology can be applied to any shaft diameter (most other technologies have here a limitation) and does not need to rotate/spin the shaft during the encoding process (very simple and low-cost manufacturing process) which makes this technology very applicable for high-volume application.

In the following, a Magnetic Field Structure (Sensor Principle) will be described.

The sensor life-time depends on a "closed-loop" magnetic field design. The PCME technology is based on two magnetic field structures, stored above each other, and running in opposite directions. When no torque stress or motion stress is applied to the shaft (also called Sensor Host, or SH) then the SH will act magnetically neutral (no magnetic field can be sensed at the outside of the SH).

Figure 12:
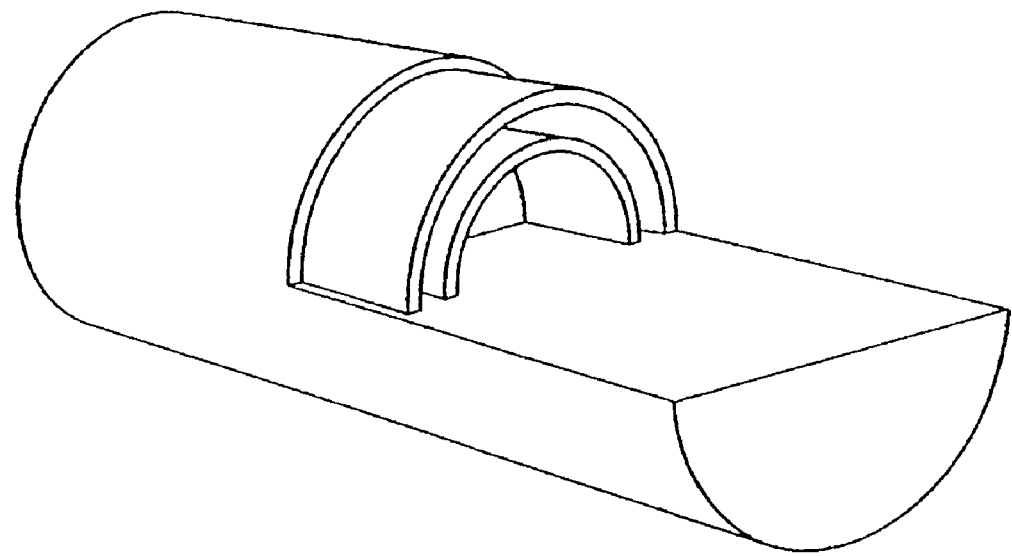
FIG. 12 shows a schematic diagram of a sensor element of a torque sensor according to another exemplary embodiment of the present invention showing that two magnetic fields may be stored in the shaft and running in endless circles.

FIG. 12 shows that two magnetic fields are stored in the shaft and running in endless circles. The outer field runs in one direction, while the inner field runs in the opposite direction.

Figure 13:
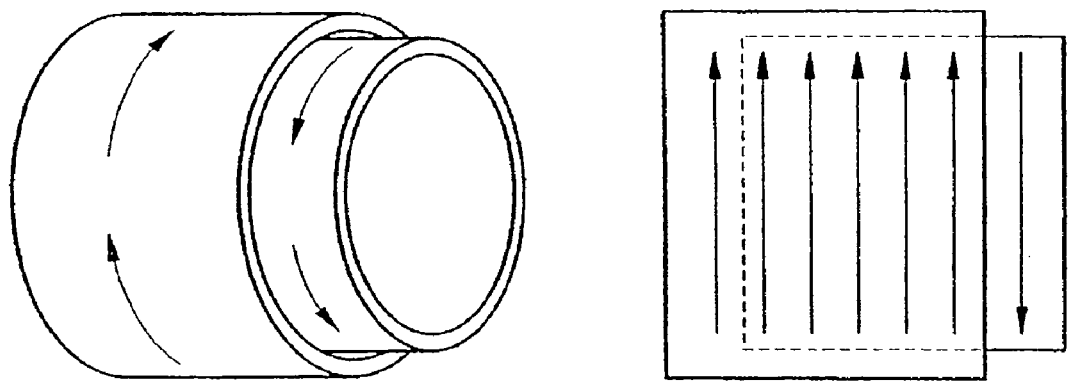
FIG. 13 is another schematic diagram for illustrating PCME sensing technology using two counter cycle or magnetic field loops which may be generated in accordance with a manufacturing method according to the present invention.

FIG. 13 illustrates that the PCME sensing technology uses two Counter-Circular magnetic field loops that are stored on top of each other (Picky-Back mode).

When mechanical stress (like reciprocation motion or torque) is applied at both ends of the PCME magnetized SH (Sensor Host, or Shaft) then the magnetic flux lines of both magnetic structures (or loops) will tilt in proportion to the applied torque.

As illustrated in FIG. 14, when no mechanical stresses are applied to the SH the magnetic flux lines are running in its original path. When mechanical stresses are applied the magnetic flux lines tilt in proportion to the applied stress (like linear motion or torque).

Depending on the applied torque direction (clockwise or anti-clockwise, in relation to the SH) the magnetic flux lines will either tilt to the right or tilt to the left. Where the magnetic flux lines reach the boundary of the magnetically encoded region, the magnetic flux lines from the upper layer will join-up with the magnetic flux lines from the lower layer and visa-versa. This will then form a perfectly controlled toroidal shape.

The benefits of such a magnetic structure are:
- Reduced (almost eliminated) parasitic magnetic field structures when mechanical stress is applied to the SH (this will result in better RSU performances).
- Higher Sensor-Output Signal-Slope as there are two "active" layers that compliment each other when generating a mechanical stress related signal. Explanation: When using a single-layer sensor design, the "tilted" magnetic flux lines that exit at the encoding region boundary have to create a "return passage" from one boundary side to the other. This effort effects how much signal is available to be sensed and measured outside of the SH with the secondary sensor unit.
- There are almost no limitations on the SH (shaft) dimensions where the PCME technology will be applied to. The dual layered magnetic field structure can be adapted to any solid or hollow shaft dimensions.
- The physical dimensions and sensor performances are in a very wide range programmable and therefore can be tailored to the targeted application.
- This sensor design allows to measure mechanical stresses coming from all three dimensions axis, including in-line forces applied to the shaft (applicable as a load-cell). Explanation: Earlier magnetostriction sensor designs (for example from FAST Technology) have been limited to be sensitive in 2 dimensional axis only, and could not measure in-line forces.

Referring to FIG. 15, when torque is applied to the SH, the magnetic flux lines from both Counter-Circular magnetic loops are connecting to each other at the sensor region boundaries.

When mechanical torque stress is applied to the SH then the magnetic field will no longer run around in circles but tilt slightly in proportion to the applied torque stress. This will cause the magnetic field lines from one layer to connect to the magnetic field lines in the other layer, and with this form a toroidal shape.

Referring to FIG. 16, an exaggerated presentation is shown of how the magnetic flux line will form an angled toroidal structure when high levels of torque are applied to the SH.

In the following, features and benefits of the PCM-Encoding (PCME) Process will be described.

The magnetostriction NCT sensing technology from NCTE according to the present invention offers high performance sensing features like:

- No mechanical changes required on the Sensor Host (already existing shafts can be used as they are)
- Nothing has to be attached to the Sensor Host (therefore nothing can fall off or change over the shaft-lifetime=high MTBF)
- During measurement the SH can rotate, reciprocate or move at any desired speed (no limitations on rpm)
- Very good RSU (Rotational Signal Uniformity) performances
- Excellent measurement linearity (up to 0.01% of FS)
- High measurement repeatability
- Very high signal resolution (better than 14 bit)
- Very high signal bandwidth (better than 10 kHz)

Depending on the chosen type of magnetostriction sensing technology, and the chosen physical sensor design, the mechanical power transmitting shaft (also called "Sensor Host" or in short "SH") can be used "as is" without making any mechanical changes to it or without attaching anything to the shaft. This is then called a "true" Non-Contact-Torque measurement principle allowing the shaft to rotate freely at any desired speed in both directions.

The here described PCM-Encoding (PCME) manufacturing process according to an exemplary embodiment of the present invention provides additional features no other magnetostriction technology can offer (Uniqueness of this technology):

- More then three times signal strength in comparison to alternative magnetostriction encoding processes (like the "RS" process from FAST).
- Easy and simple shaft loading process (high manufacturing through-putt).
- No moving components during magnetic encoding process (low complexity manufacturing equipment=high MTBF, and lower cost).
- Process allows NCT sensor to be "fine-tuning" to achieve target accuracy of a fraction of one percent.
- Manufacturing process allows shaft "pre-processing" and "post-processing" in the same process cycle (high manufacturing through-putt).
- Sensing technology and manufacturing process is ratiometric and therefore is applicable to all shaft or tube diameters.
- The PCM-Encoding process can be applied while the SH is already assembled (depending on accessibility) (maintenance friendly).
- Final sensor is insensitive to axial shaft movements (the actual allowable axial shaft movement depends on the physical "length" of the magnetically encoded region).
- Magnetically encoded SH remains neutral and has little to non magnetic field when no forces (like torque) are applied to the SH.
- Sensitive to mechanical forces in all three dimensional axis.

In the following, the Magnetic Flux Distribution in the SH will be described,

The PCME processing technology is based on using electrical currents, passing through the SH (Sensor Host or Shaft) to achieve the desired, permanent magnetic encoding of the Ferro-magnetic material. To achieve the desired sensor performance and features a very specific and well controlled electrical current is required. Early experiments that used DC currents failed because of luck of understanding how small amounts and large amounts of DC electric current are travelling through a conductor (in this case the "conductor" is the mechanical power transmitting shaft, also called Sensor Host or in short "SH").

Figure 17:
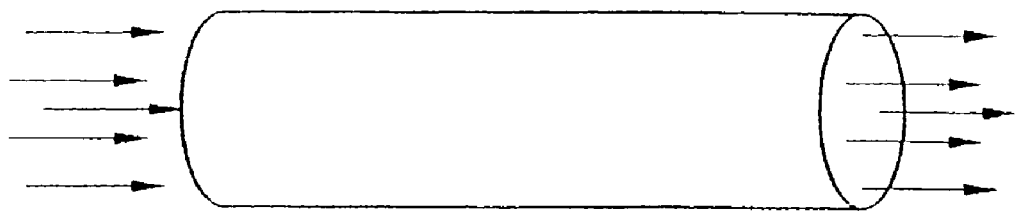
FIGS. 17-22 are schematic representations for further explaining a principle of an exemplary embodiment of the present invention.

Referring to FIG. 17, an assumed electrical current density in a conductor is illustrated.

It is widely assumed that the electric current density in a conductor is evenly distributed over the entire cross-section of the conductor when an electric current (DC) passes through the conductor.

Figure 18:
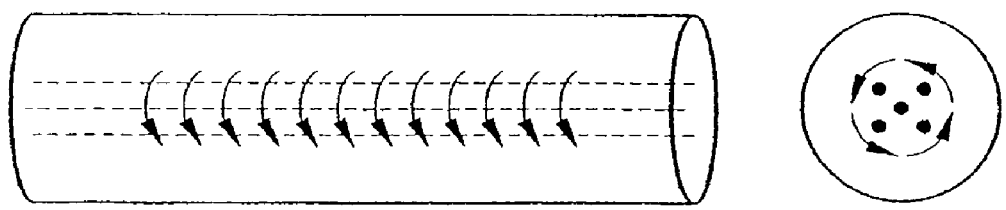

Referring to FIG. 18, a small electrical current forming magnetic field that ties current path in a conductor is shown.

It is our experience that when a small amount of electrical current (DC) is passing through the conductor that the current density is highest at the centre of the conductor. The two main reasons for this are: The electric current passing through a conductor generates a magnetic field that is tying together the current path in the centre of the conductor, and the impedance is the lowest in the centre of the conductor.

Figure 19:
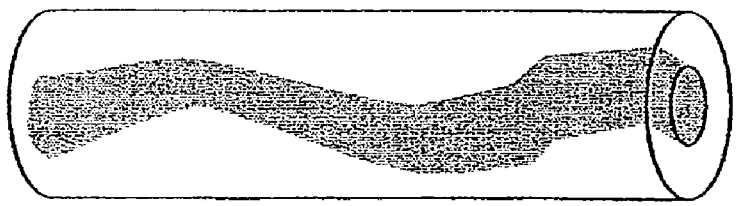

Referring to FIG. 19, a typical flow of small electrical currents in a conductor is illustrated.

In reality, however, the electric current may not flow in a "straight" line from one connection pole to the other (similar to the shape of electric lightening in the sky).

At a certain level of electric current the generated magnetic field is large enough to cause a permanent magnetization of the Ferro-magnetic shaft material. As the electric current is flowing near or at the centre of the SH, the permanently stored magnetic field will reside at the same location: near or at the centre of the SH. When now applying mechanical torque or linear force for oscillation/reciprocation to the shaft, then shaft internally stored magnetic field will respond by tilting its magnetic flux path in accordance to the applied mechanical force. As the permanently stored magnetic field lies deep below the shaft surface the measurable effects are very small, not uniform and therefore not sufficient to build a reliable NCT sensor system.

Figure 20:
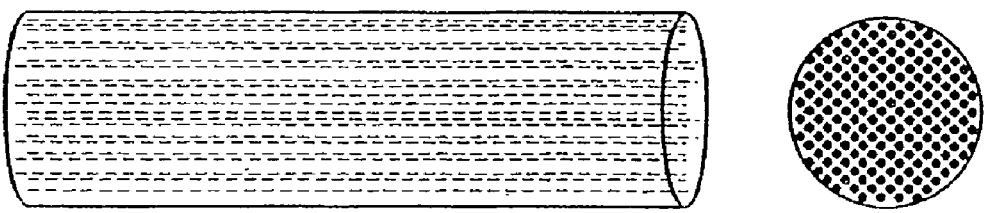

Referring to FIG. 20, a uniform current density in a conductor at saturation level is shown.

Only at the saturation level is the electric current density (when applying DC) evenly distributed at the entire cross section of the conductor. The amount of electrical current to achieve this saturation level is extremely high and is mainly influenced by the cross section and conductivity (impedance) of the used conductor.

Figure 21:
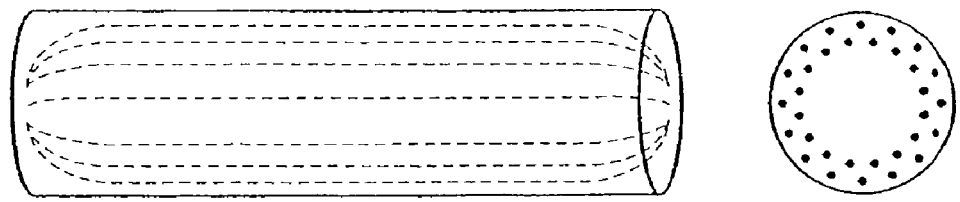

Referring to FIG. 21, electric current travelling beneath or at the surface of the conductor (Skin-Effect) is shown.

It is also widely assumed that when passing through alternating current (like a radio frequency signal) through a conductor that the signal is passing through the skin layers of the conductor, called the Skin Effect. The chosen frequency of the alternating current defines the "Location/position" and "depth" of the Skin Effect. At high frequencies the electrical current will travel right at or near the surface of the conductor (A) while at lower frequencies (in the 5 to 10 Hz regions for a 20 mm diameter SH) the electrical alternating current will penetrate more the cent-e of the shafts cross section (E). Also, the relative current density is higher in the current occupied regions at higher AC frequencies in comparison to the relative current density near the cent-e of the shaft at very low AC frequencies (as there is more space available for the current to flow through).

Figure 22:
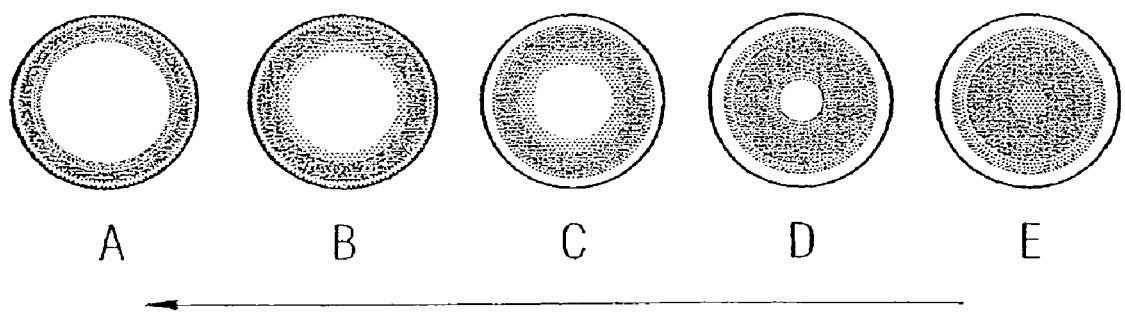

Referring to FIG. 22, the electrical current density of an electrical conductor (cross-section 90 deg to the current flow)

when passing through the conductor an alternating current at different frequencies is illustrated.

The desired magnetic field design of the PCME sensor technology are two circular magnetic field structures, stored in two layers on top of each other ("Picky-Back"), and running in opposite direction to each other (Counter-Circular).

Again referring to FIG. 13, a desired magnetic sensor structure is shown: two endless magnetic loops placed on top of each other, running in opposite directions to each other: Counter-Circular "Picky-Back" Field Design.

To male this magnetic field design highly sensitive to mechanical stresses that will be applied to the SH (shaft), and to generate the largest sensor signal possible, the desired magnetic field structure has to be placed nearest to the shaft surface. Placing the circular magnetic fields to close to the centre of the SH will cause damping of the user available sensor-output-signal slope (most of the sensor signal will travel through the Ferro-magnetic shaft material as it has a much higher permeability in comparison to air), and increases the non-uniformity of the sensor signal (in relation to shaft rotation and to axial movements of the shaft in relation to the secondary sensor.

Figure 23:
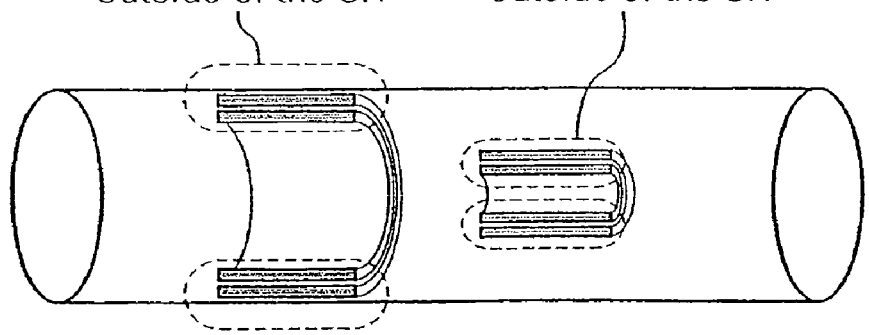
FIG. 23 is another schematic diagram for explaining a principle of an exemplary embodiment of the present invention.

Referring to FIG. 23, magnetic field structures stored near the shaft surface and stored near the centre of the shaft are illustrated.

It may be difficult to achieve the desired permanent magnetic encoding of the SH when using AC (alternating current) as the polarity of the created magnetic field is constantly changing and therefore may act more as a Degaussing system.

The PCME technology requires that a strong electrical current ("uni-polar" or DC, to prevent erasing of the desired magnetic field structure) is travelling right below the shaft surface (to ensure that the sensor signal will be uniform and measurable at the outside of the shaft). In addition a Counter-Circular, "picky back" magnetic field structure needs to be formed.

It is possible to place the two Counter-Circular magnetic field structures in the shaft by storing them into the shaft one after each other. First the inner layer will be stored in the SH, and then the outer layer by using a weaker magnetic force (preventing that the inner layer will be neutralized and deleted by accident. To achieve this, the known "permanent" magnet encoding techniques can be applied as described in patents from FAST technology, or by using a combination of electrical current encoding and the "permanent" magnet encoding.

A much simpler and faster encoding process uses "only" electric current to achieve the desired Counter-Circular "Picky-Back" magnetic field structure. The most challenging part here is to generate the Counter-Circular magnetic field.

A uniform electrical current will produce a uniform magnetic field, running around the electrical conductor in a 90 deg angle, in relation to the current direction (A). When placing two conductors side-by-side (B) then the magnetic field between the two conductors seems to cancel-out the effect of each other (C). Although still present, there is no detectable (or measurable) magnetic field between the closely placed two conductors. When placing a number of electrical conductors side-by-side (D) the "measurable" magnetic field seems to go around the outside the surface of the "flat" shaped conductor.

Figure 24:
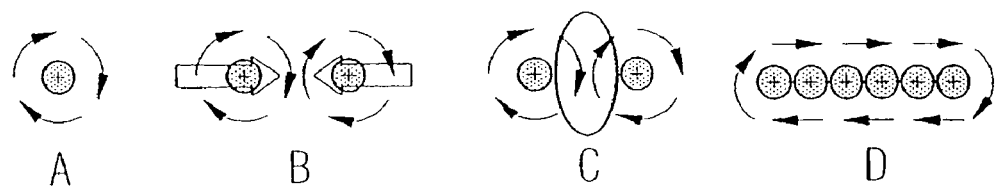
FIGS. 24, 25 and 26 are schematic diagrams for further explaining a principle of an exemplary embodiment of the present invention.

Referring to FIG. 24, the magnetic effects when looking at the cross-section of a conductor with a uniform current flowing through them are shown.

The "flat" or rectangle shaped conductor has now been bent into a "U"-shape. When passing an electrical current through the "U"-shaped conductor then the magnetic field following the outer dimensions of the "U"-shape is cancelling out the measurable effects in the inner halve of the "U".

Figure 25:
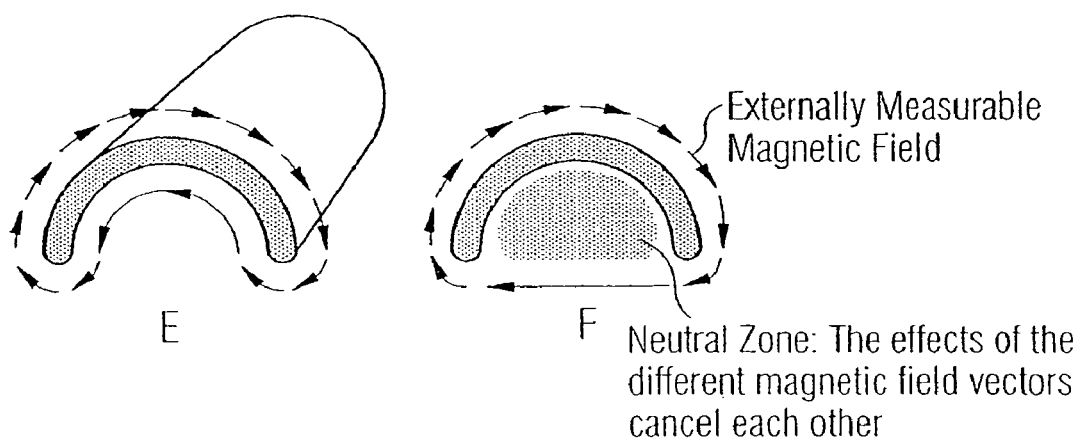

Referring to FIG. 25, the zone inside the "U"-shaped conductor seem to be magnetically "Neutral" when an electrical current is flowing through the conductor.

When no mechanical stress is applied to the cross-section of a "U"-shaped conductor it seems that there is no magnetic field present inside of the "U" (F). But when bending or twisting the "U"-shaped conductor the magnetic field will no longer follow its original path (90 deg angle to the current flow). Depending on the applied mechanical forces, the magnetic field begins to change slightly its path. At that time the magnetic-field-vector that is caused by the mechanical stress can be sensed and measured at the surface of the conductor, inside and outside of the "U"-shape. Note: This phenomena is applies only at very specific electrical current levels.

The same applies to the "O"-shaped conductor design. When passing a uniform electrical current through an "O"-shaped conductor (Tube) the measurable magnetic effects inside of the "O" (Tube) have cancelled-out each other (G).

Figure 26:
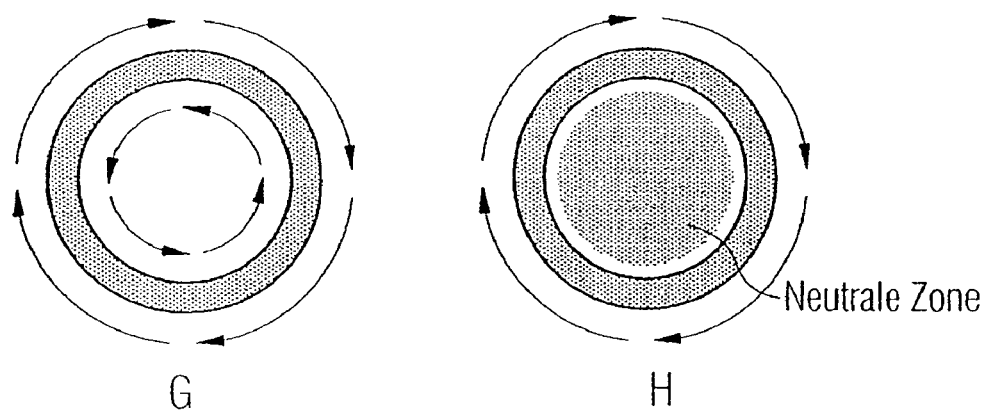

Referring to FIG. 26, the zone inside the "O"-shaped conductor seem to be magnetically "Neutral" when an electrical current is flowing through the conductor.

However, when mechanical stresses are applied to the "O"-shaped conductor (Tube) it becomes evident that there has been a magnetic field present at the inner side of the "O"-shaped conductor. The inner, counter directional magnetic field (as well as the outer magnetic field) begins to tilt in relation to the applied torque stresses. This tilting field can be clearly sensed and measured.

In the following, an Encoding Pulse Design will be described.

To achieve the desired magnetic field structure (Counter-Circular, Picky-Back, Fields Design) inside the SH, according to an exemplary embodiment of a method of the present invention, unipolar electrical current pulses are passed through the Shaft (or SH). By using "pulses" the desired "Skin-Effect" can be achieved. By using a "unipolar" current direction (not changing the direction of the electrical current) the generated magnetic effect will not be erased accidentally.

The used current pulse shape is most critical to achieve the desired PCME sensor design. Each parameter has to be accurately and repeatable controlled: Current raising time, Constant current on-time, Maximal current amplitude, and Current falling time. In addition it is very critical that the current enters and exits very uniformly around the entire shaft surface.

In the following, a Rectangle Current Pulse Shape will be described.

Figure 27:
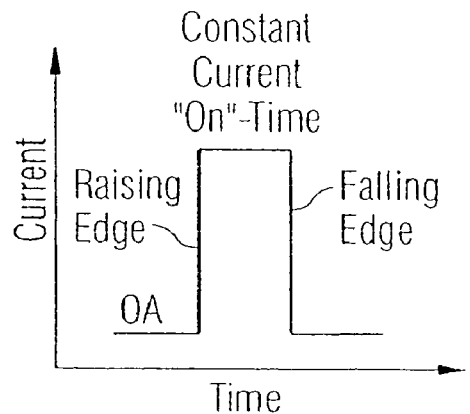
FIG. 27 is a current versus time diagram for illustrating a current pulse which may be applied to a sensor element according to a manufacturing method according to an exemplary embodiment of the present invention.

Referring to FIG. 27, a rectangle shaped electrical current pulse is illustrated.

A rectangle shaped current pulse has a fast raising positive edge and a fast falling current edge. When passing a rectangle shaped current pulse through the SH, the raising edge is responsible for forming the targeted magnetic structure of the PCME sensor while the flat "on" time and the falling edge of the rectangle shaped current pulse are counter productive.

Figure 28:
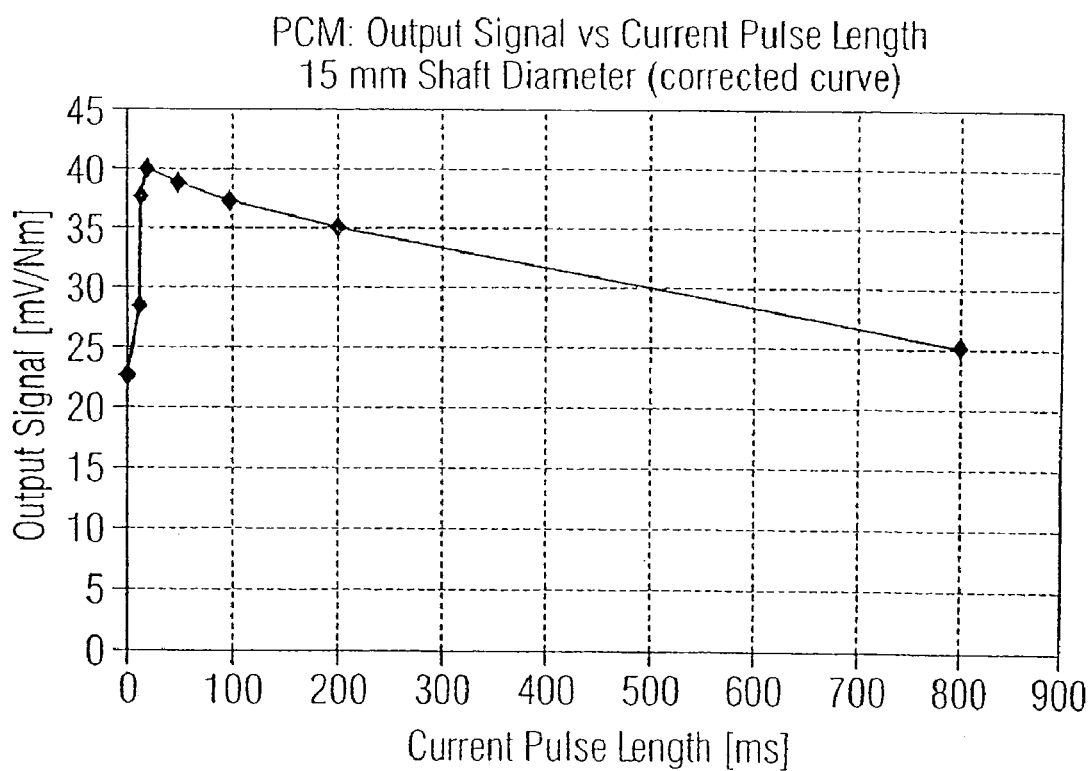
FIG. 28 shows an output signal versus current pulse length diagram according to an exemplary embodiment of the present invention.

Referring to FIG. 28, a relationship between rectangles shaped Current Encoding Pulse-Width (Constant Current On-Time) and Sensor Output Signal Slope is shown.

In the following example a rectangle shaped current pulse has been used to generate and store the Couter-Circlar "Picky-Back" field in a 15 mm diameter, 14CrNi14 shaft. The pulsed electric current had its maximum at around 270 Ampere. The pulse "on-time" has been electronically controlled. Because of the high frequency component in the rising and falling edge of the encoding pulse, this experiment can not truly represent the effects of a true DC encoding SH. Therefore the Sensor-Output-Signal Slope-curve eventually flattens-out at above 20 mV/Nm when passing the Constant-Current On-Time of 1000 ms.

Without using a fast raising current-pulse edge (like using a controlled ramping slope) the sensor output signal slope would have been very poor (below 10 mV/Nm). Note: In this experiment (using 14CrNi14) the signal hysteresis was around 0.95% of the FS signal (FS=75 Nm torque).

Figure 29:
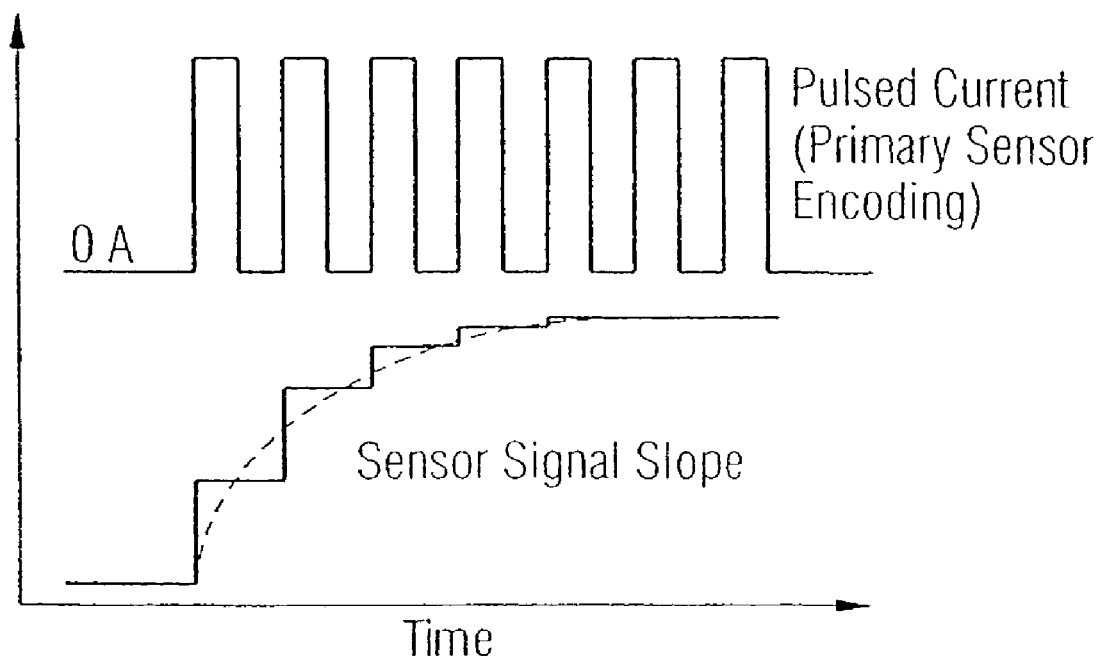
FIG. 29 shows a current versus time diagram with current pulses according to an exemplary embodiment of the present invention which may be applied to sensor elements according to a method of the present invention.

Referring to FIG. 29, increasing the Sensor-Output Signal-Slope by using several rectangle shaped current pulses in succession is shown.

The Sensor-Output-Signal slope can be improved when using several rectangle shaped current-encoding-pulses in successions. In comparisons to other encoding-pulse-shapes the fast falling current-pulse signal slope of the rectangle shaped current pulse will prevent that the Sensor-Output-Signal slope may ever reach an optimal performance level. Meaning that after only a few current pulses (2 to 10) have been applied to the SH (or Shaft) the Sensor-Output Signal-Slope will no longer rise.

In the following, a Discharge Current Pulse Shape is described.

The Discharge-Current-Pulse has no Constant-Current ON-Time and has no fast falling edge. Therefore the primary and most felt effect in the magnetic encoding of the SH is the fast raising edge of this current pulse type.

Figure 30:
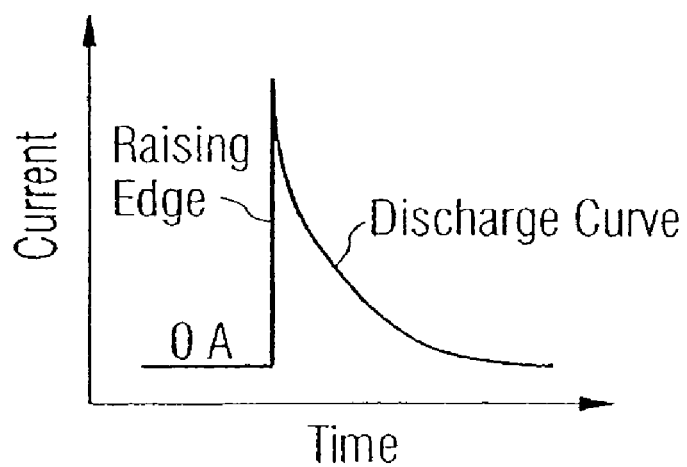
FIG. 30 shows another current versus time diagram showing a preferred embodiment of a current pulse applied to a sensor element such as a shaft according to a method of an exemplary embodiment of the present invention.

As shown in FIG. 30, a sharp raising current edge and a typical discharging curve provides best results when creating a PCME sensor.

Figure 31:
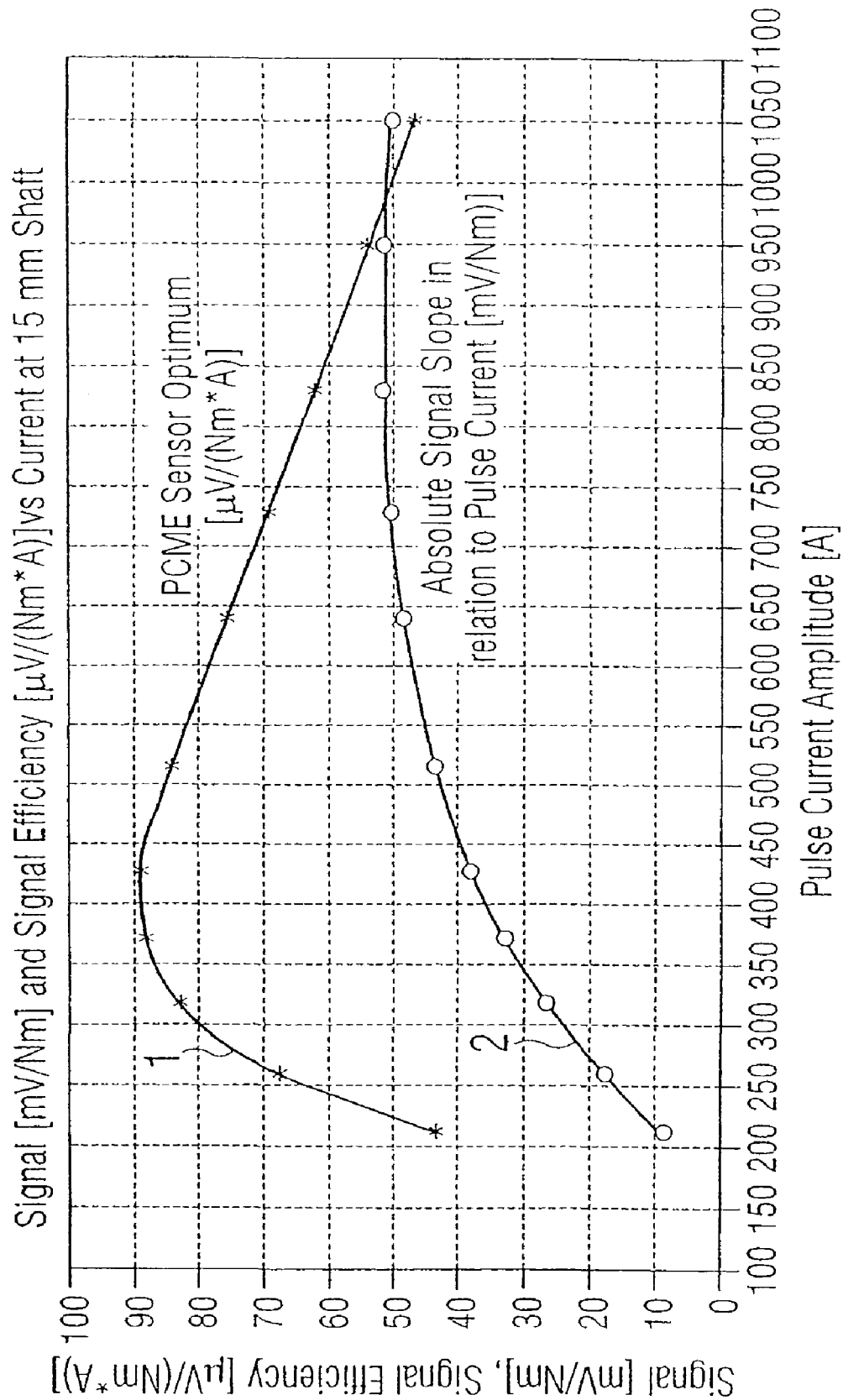
FIG. 31 shows a signal and signal efficiency versus current diagram in accordance with an exemplary embodiment of the present invention.

Referring to FIG. 31, a PCME Sensor-Output Signal-Slope optimization by identifying the right pulse current is illustrated.

At the very low end of the pulse current scale (0 to 75 A for a 15 mm diameter shaft, 14CrNi14 shaft material) the "Discharge-Current-Pulse type is not powerful enough to cross the magnetic threshold needed to create a lasting magnetic field inside the Ferro magnetic shaft. When increasing the pulse current amplitude the double circular magnetic field structure begins to form below the shaft surface. As the pulse current amplitude increases so does the achievable torque sensor-output signal-amplitude of the secondary sensor system. At around 400 A to 425 A the optimal PCME sensor design has been achieved (the two counter flowing magnetic regions have reached their most optimal distance to each other and the correct flux density for best sensor performances.

Figure 32:
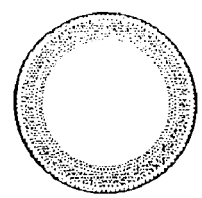
FIG. 32 is a cross-sectional view of a sensor element having a preferred PCME electrical current density according to an exemplary embodiment of the present invention.

Referring to FIG. 32, Sensor Host (SH) cross section with the optimal PCME electrical current density and location during the encoding pulse is illustrated.

When increasing further the pulse current amplitude the absolute, torque force related, sensor signal amplitude will further increase (curve 2) for some time while the overall PCME-typical sensor performances will decrease (curve 1). When passing 900 A Pulse Current Amplitude (for a 15 mm diameter shaft) the absolute, torque force related, sensor signal amplitude will begin to drop as well (curve 2) while the PCME sensor performances are now very poor (curve 1).

Figure 33:
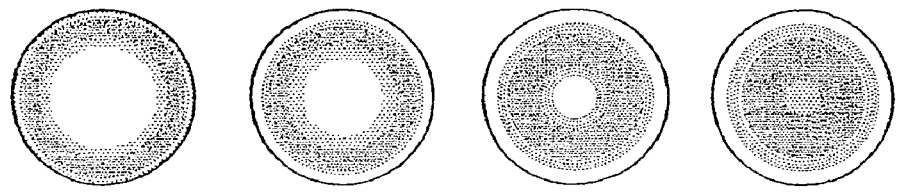
FIG. 33 shows a cross-sectional view of a sensor element and an electrical pulse current density at different and increasing pulse current levels according to an exemplary embodiment of the present invention.

Referring to FIG. 33, Sensor Host (SH) cross sections and the electrical pulse current density at different and increasing pulse current levels is shown.

As the electrical current occupies a larger cross section in the SH the spacing between the inner circular region and the outer (near the shaft surface) circular region becomes larger.

Figure 34:
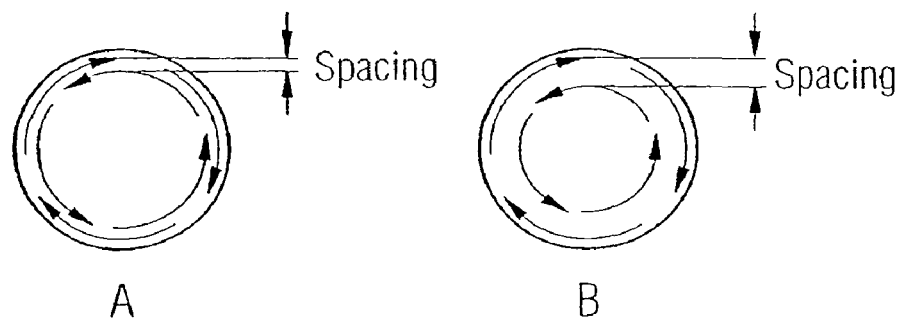
FIGS. 34a and 34b show a spacing achieved with different current pulses of magnetic flows in sensor elements according to the present invention.

Referring to FIG. 34, better PCME sensor performances will be achieved when the spacing between the Counter-Circular "Picky-Back" Field design is narrow (A).

The desired double, counter flow, circular magnetic field structure will be less able to create a close loop structure under torque forces which results in a decreasing secondary sensor signal amplitude.

Figure 35:
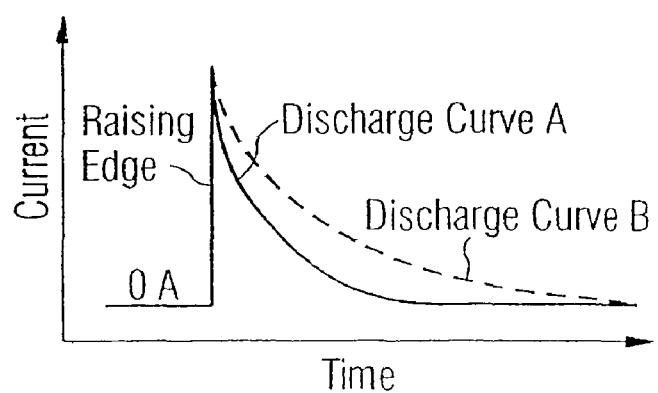
FIG. 35 shows a current versus time diagram of a current pulse as it may be applied to a sensor element according to an exemplary embodiment of the present invention.

Referring to FIG. 35, flattening-out the current-discharge curve will also increase the Sensor-Output Signal-Slope.

When increasing the Current-Pulse discharge time (making the current pulse wider) (B) the Sensor-Output Signal-Slope will increase. However the required amount of current is very high to reduce the slope of the falling edge of the current pulse. It might be more practical to use a combination of a high current amplitude (with the optimal value) and the slowest possible discharge time to achieve the highest possible Sensor-Output Signal Slope.

In the following, Electrical Connection Devices in the frame of Primary Sensor Processing will be described.

The PCME technology (it has to be noted that the term 'PCME' technology is used to refer to exemplary embodiments of the present invention) relies on passing through the shaft very high amounts of pulse-modulated electrical current at the location where the Primary Sensor should be produced. When the surface of the shaft is very clean and highly conductive a multi-point Cupper or Gold connection may be sufficient to achieve the desired sensor signal uniformity. Important is that the Impedance is identical of each connection point to the shaft surface. This can be best achieved when assuring the cable length (L) is identical before it joins the main current connection point (I).

Figure 36:
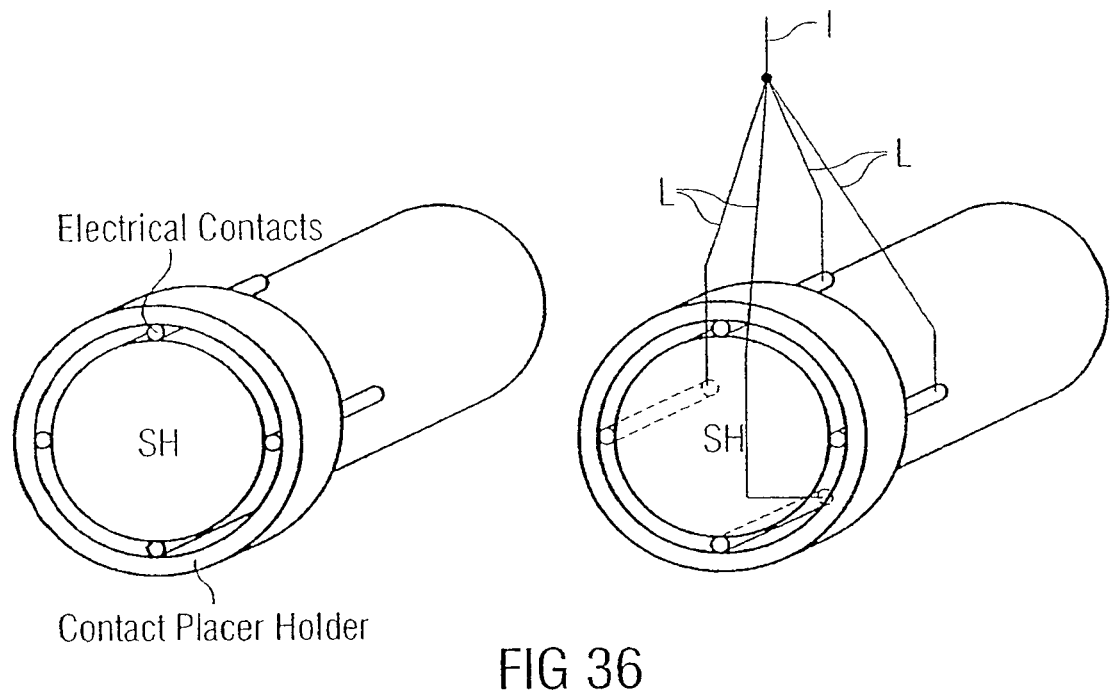
FIG. 36 shows an electrical multi-point connection to a sensor element according to an exemplary embodiment of the present invention.

Referring to FIG. 36, a simple electrical multi-point connection to the shaft surface is illustrated.

However, in most cases a reliable and repeatable multi-point electrical connection can be only achieved by ensuring that the impedance at each connection point is identical and constant. Using a spring pushed, sharpened connector will penetrate possible oxidation or isolation layers (maybe caused by finger prints) at the shaft surface.

Figure 37:
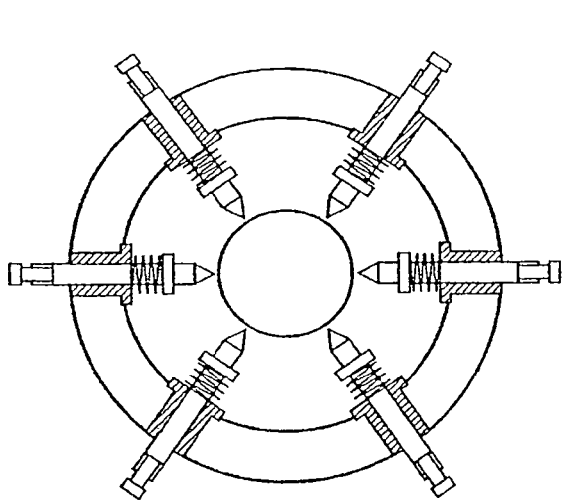
FIG. 37 shows a multi-channel electrical connection fixture with spring loaded contact points to apply a current pulse to the sensor element according to an exemplary embodiment of the present invention.

Referring to FIG. 37, a multi channel, electrical connecting fixture, with spring loaded contact points is illustrated.

When processing the shaft it is most important that the electrical current is injected and extracted from the shaft in the most uniform way possible. The above drawing shows several electrical, from each other insulated, connectors that are held by a fixture around the shaft. This device is called a Shaft-Processing-Holding-Clamp (or SPHC). The number of electrical connectors required in a SPHC depends on the shafts outer diameter. The larger the outer diameter, the more connectors are required. The spacing between the electrical conductors has to be identical from one connecting point to the next connecting point. This method is called Symmetrical-"Spot"-Contacts.

Figure 38:
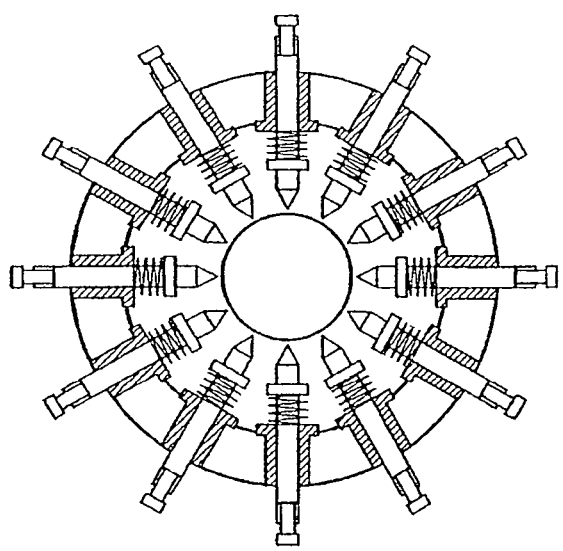
FIG. 38 shows an electrode system with an increased number of electrical connection points according to an exemplary embodiment of the present invention.

Referring to FIG. 38, it is illustrated that increasing the number of electrical connection points will assist the efforts of entering and exiting the Pulse-Modulated electrical current. It will also increase the complexity of the required electronic control system.

Figure 39:
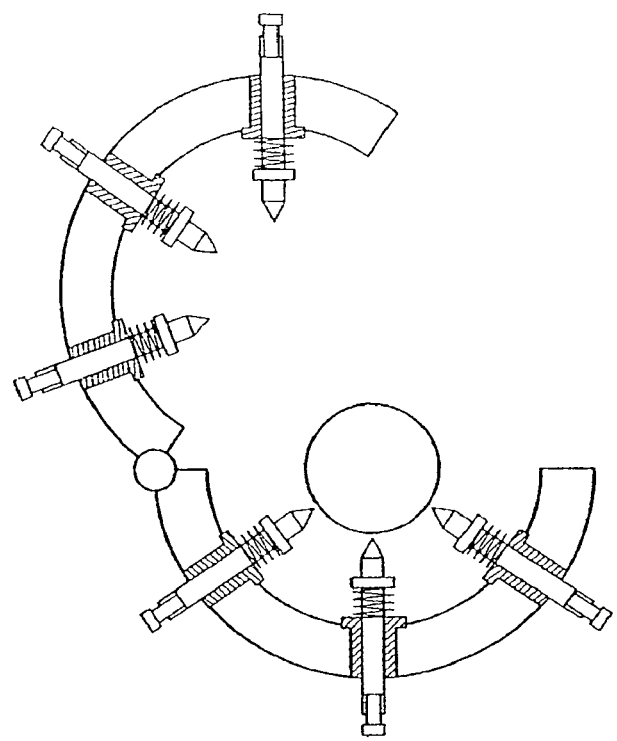
FIG. 39 shows an exemplary embodiment of the electrode system of FIG. 37.

Referring to FIG. 39, an example of how to open the SPHC for easy shaft loading is shown.

In the following, an encoding scheme in the frame of Primary Sensor Processing will be described.

The encoding of the primary shaft can be done by using permanent magnets applied at a rotating shaft or using electric currents passing through the desired section of the shaft. When using permanent magnets a very complex, sequential procedure is necessary to put the two layers of closed loop magnetic fields, on top of each other, in the shaft. When using the PCME procedure the electric current has to enter the shaft and exit the shaft in the most symmetrical way possible to achieve the desired performances.

Figure 40:
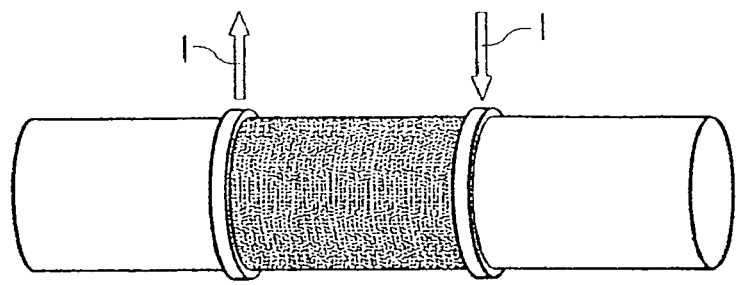
FIG. 40 shows shaft processing holding clamps used for a method according to an exemplary embodiment of the present invention.

Referring to FIG. 40, two SPHCs (Shaft Processing Holding Clamps) are placed at the borders of the planned sensing encoding region. Through one SPHC the pulsed electrical current (I) will enter the shaft, while at the second SPHC the pulsed electrical current (I) will exit the shaft. The region between the two SPHCs will then turn into the primary sensor.

This particular sensor process will produce a Single Field (SF) encoded region. One benefit of this design (in comparison to those that are described below) is that this design is insensitive to any axial shaft movements in relation to the location of the secondary sensor devices. The disadvantage of this design is that when using axial (or in-line) placed MFS coils the system will be sensitive to magnetic stray fields (like the earth magnetic field).

Figure 41:
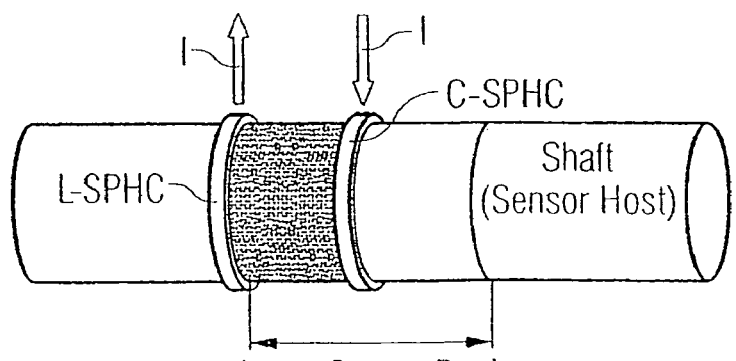
FIG. 41 shows a dual field encoding region of a sensor element according to the present invention.

Referring to FIG. 41, a Dual Field (DE) encoded region (meaning two independent functioning sensor regions with opposite polarity, side-by-side) allows cancelling the effects of uniform magnetic stray fields when using axial (or in-line) placed MFS coils. However, this primary sensor design also shortens the tolerable range of shaft movement in axial direction (in relation to the location of the MFS coils). There are two ways to produce a Dual Field (DF) encoded region with the PCME technology. The sequential process, where the magnetic encoded sections are produced one after each other, and the parallel process, where both magnetic encoded sections are produced at the same time.

The first process step of the sequential dual field design is to magnetically encode one sensor section (identically to the Single Field procedure), whereby the spacing between the two SPI IC has to be halve of the desired final length of the Primary Sensor region. To simplify the explanations of this process we call the SPHC that is placed in the centre of the final Primary Sensor Region the Centre SPHC (C-SPHC), and the SPHC that is located at the left side of the Centre SPHC: L-SPHC.

Figure 42:
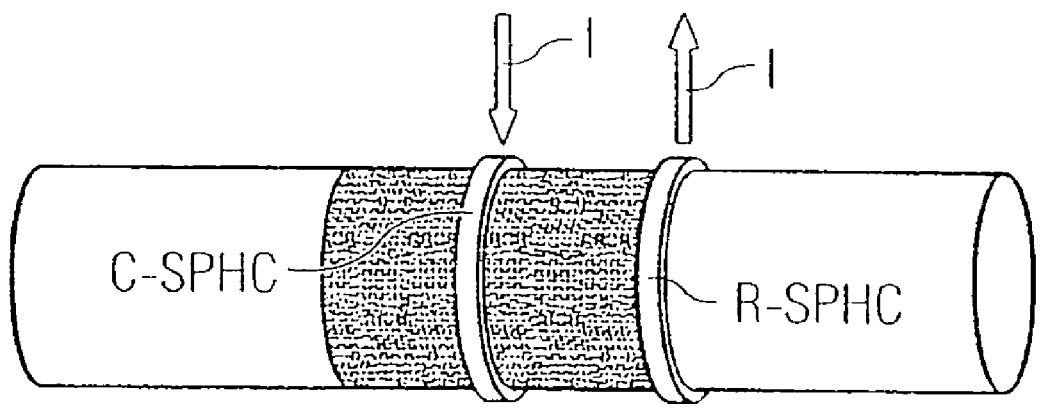
FIG. 42 shows a process step of a sequential dual field encoding according to an exemplary embodiment of the present invention.

Referring to FIG. 42, the second process step of the sequential Dual Field encoding will use the SPHC that is located in the centre of the Primary Sensor region (called C-SPHC) and a second SPHC that is placed at the other side (the right side) of the centre SPHC, called R-SPHC. Important is that the current flow direction in the centre SPHC (C-SPHC) is identical at both process steps.

Figure 43:
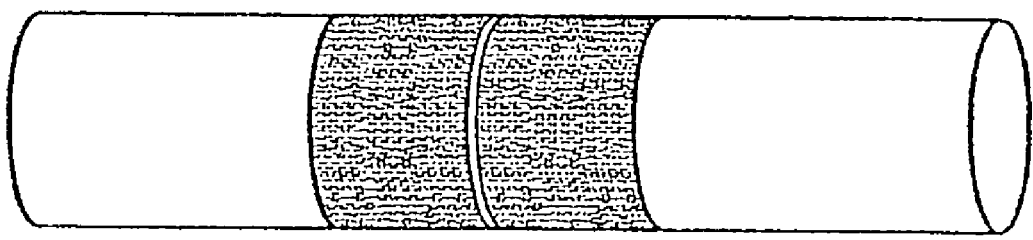
FIG. 43 shows another process step of the dual field encoding according to another exemplary embodiment of the present invention.

Referring to FIG. 43, the performance of the final Primary Sensor Region depends on how close the two encoded regions can be placed in relation to each other. And this is dependent on the design of the used centre SPHC. The narrower the in-line space contact dimensions are of the C-SPHC, the better are the performances of the Dual Field PCME sensor.

Figure 44:
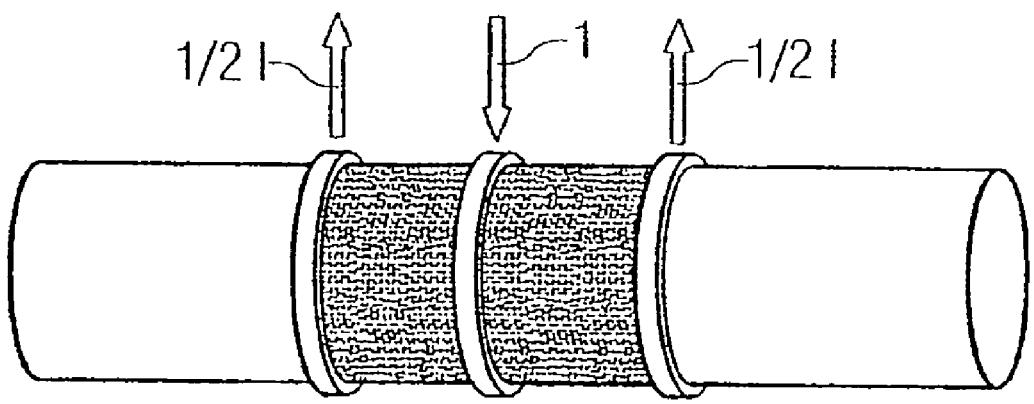
FIG. 44 shows another exemplary embodiment of a sensor element with an illustration of a current pulse application according to another exemplary embodiment of the present invention.

FIG. 44 shows the pulse application according to another exemplary embodiment of the present invention. As my be taken from the above drawing, the pulse is applied to three locations of the shaft. Due to the current distribution to both sides of the middle electrode where the current I is entered into the shaft, the current leaving the shaft at the lateral electrodes is only half the current entered at the middle electrode, namely ½I. The electrodes are depicted as rings which dimensions are adapted to the dimensions of the outer surface of the shaft. However, it has to be noted that other electrodes may be used, such as the electrodes comprising a plurality of pin electrodes described later in this text.

Figure 45:
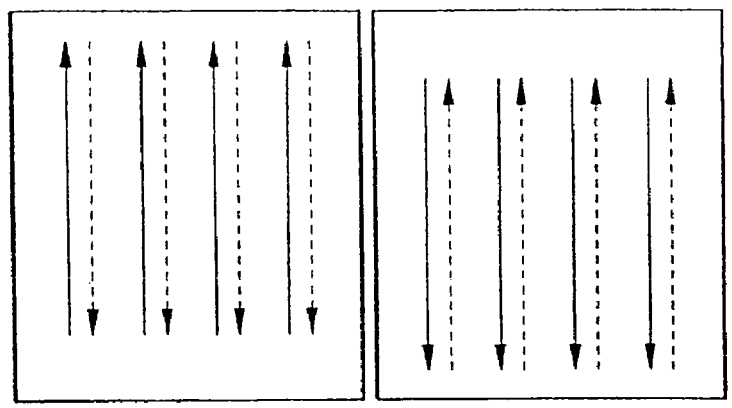
FIG. 45 shows schematic diagrams for describing magnetic flux directions in sensor elements according to the present invention when no stress is applied.

Referring to FIG. 45, magnetic flux directions of the two sensor sections of a Dual Field PCME sensor design are shown when no torque or linear motion stress is applied to the shaft. The counter flow magnetic flux loops do not interact with each other.

Figure 46:
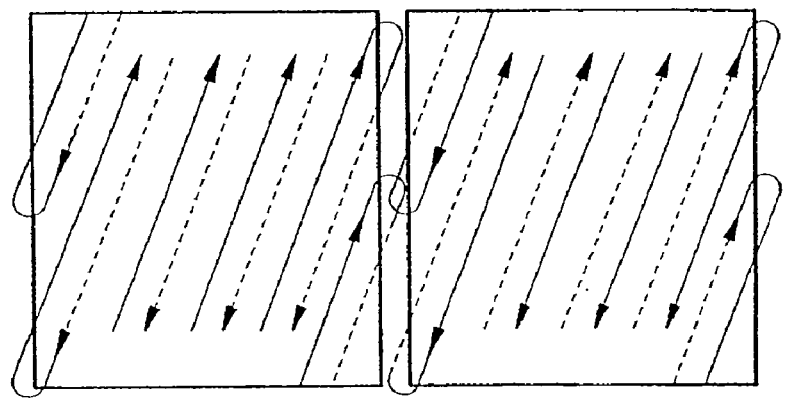
FIG. 46 shows magnetic flux directions of the sensor element of FIG. 45 when a force is applied.

Referring to FIG. 46, when torque forces or linear stress forces are applied in a particular direction then the magnetic flux loops begin to run with an increasing tilting angle inside the shaft. When the tilted magnetic flux reaches the PCME segment boundary then the flux line interacts with the counterflowing magnetic flux lines, as shown.

Figure 47:
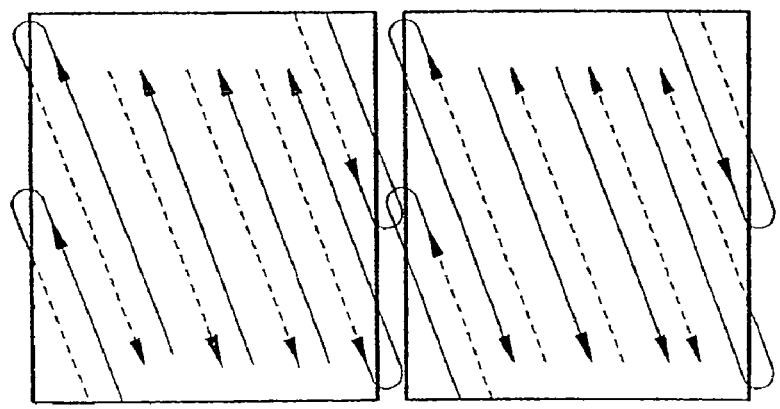
FIG. 47 shows the magnetic flux inside the PCM encoded shaft of FIG. 45 when the applied torque direction is changing.

Referring to FIG. 47, when the applied torque direction is changing (for example from clock-wise to counter-clockwise) so will change the tilting angle of the counterflow magnetic flux structures inside the PCM Encoded shaft.

In the following, a Multi Channel Current Driver for Shaft Processing will be described.

In cases where an absolute identical impedance of the current path to the shaft surface can not be guaranteed, then electric current controlled driver stages can be used to overcome this problem.

Figure 48:
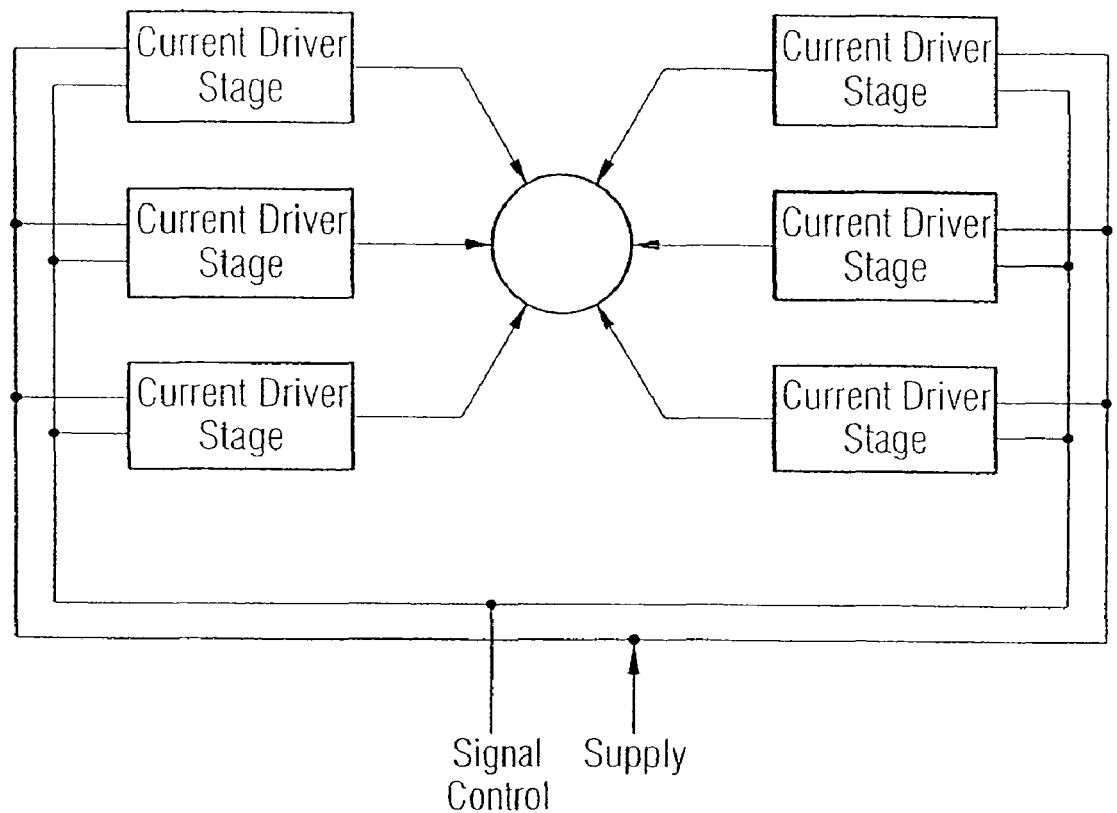
FIG. 48 shows a 6-channel synchronized pulse current driver system according to an exemplary embodiment of the present invention.

Referring to FIG. 48, a six-channel synchronized Pulse current driver system for small diameter Sensor Hosts (SH) is shown. As the shaft diameter increases so will the number of current driver channels.

In the following, Bras Ring Contacts and Symmetrical "Spot" Contacts will be described.

When the shaft diameter is relative small and the shaft surface is clean and free from any oxidations at the desired Sensing Region, then a simple "Bras"-ring (or Copper-ring) contact method can be chosen to process the Primary Sensor.

Figure 49:
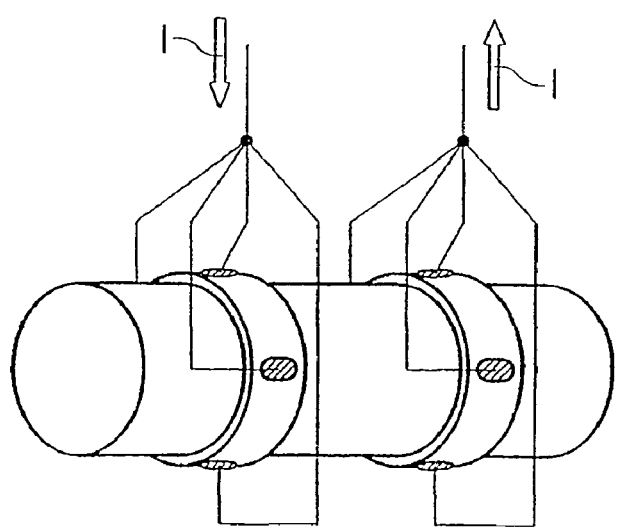
FIG. 49 shows a simplified representation of an electrode system according to another exemplary embodiment of the present invention.

Referring to FIG. 49, bras-rings (or Copper-rings) tightly fitted to the shaft surface may be used, with solder connections for the electrical wires. The area between the two Brasrings (Copper-rings) is the encoded region.

However, it is very likely that the achievable RSU performances are much lower then when using the Symmetrical "Spot" Contact method.

In the following, a Hot-Spotting concept will be described.

A standard single field (SF) PCME sensor has very poor Hot-Spotting performances. The external magnetic flux profile of the SF PCME sensor segment (when torque is applied) is very sensitive to possible changes (in relation to Ferro magnetic material) in the nearby environment. As the magnetic boundaries of the SF encoded sensor segment are not well defined (not "Pinned Down") they can "extend" towards the direction where Ferro magnet material is placed near the PCME sensing region.

Figure 50:
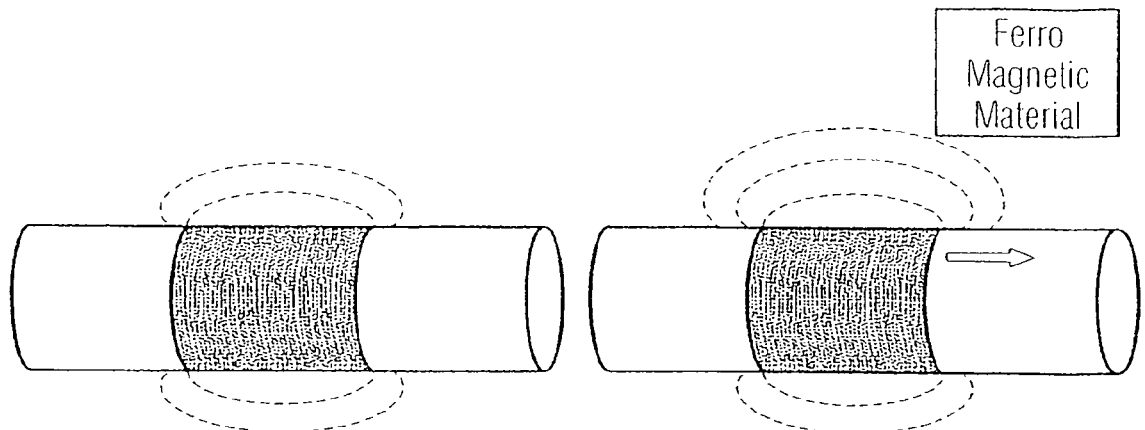
FIG. 50 is a representation of a sensor element according to an exemplary embodiment of the present invention.

Referring to FIG. 50, a PCME process magnetized sensing region is very sensitive to Ferro magnetic materials that may come close to the boundaries of the sensing regions.

To reduce the Hot-Spotting sensor sensitivity the PCME sensor segment boundaries have to be better defined by pinning them down (they can no longer move).

Figure 51:
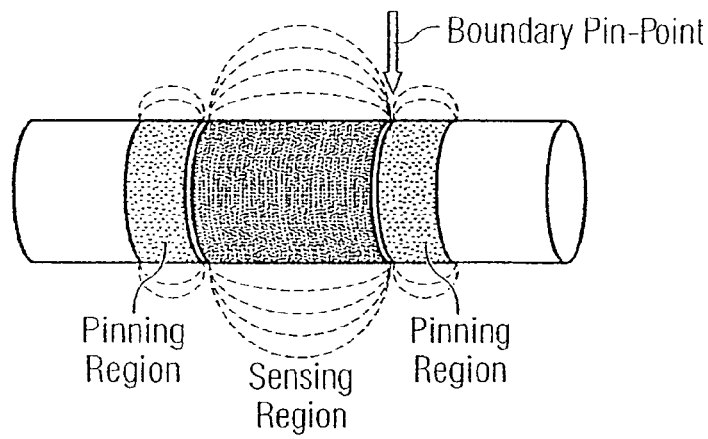
FIG. 51 is another exemplary embodiment of a sensor element according to the present invention having a PCME process sensing region with two pinning field regions.

Referring to FIG. 51, a PCME processed Sensing region with two "Pinning Field Regions" is shown, one on each side of the Sensing Region.

By placing Pinning Regions closely on either side the Sensing Region, the Sensing Region Boundary has been pinned down to a very specific location. When Ferro magnetic material is coming close to the Sensing Region, it may have an effect on the outer boundaries of the Pinning Regions, but it will have very limited effects on the Sensing Region Boundaries.

There are a number of different ways, according to exemplary embodiments of the present invention how the SH (Sensor Host) can be processed to get a Single Field (SF) Sensing Region and two Pinning Regions, one on each side of the Sensing Region. Either each region is processed after each other (Sequential Processing) or two or three regions are processed simultaneously (Parallel Processing). The Parallel Processing provides a more uniform sensor (reduced parasitic fields) but requires much higher levels of electrical current to get to the targeted sensor signal slope.

Figure 52:
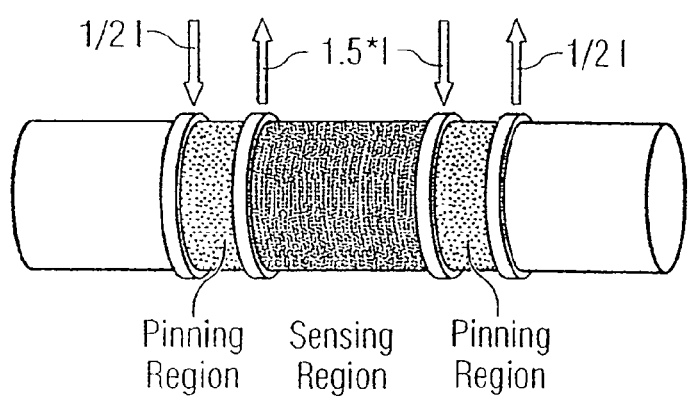
FIG. 52 is a schematic representation for explaining a manufacturing method according to an exemplary embodiment of the present invention for manufacturing a sensor element with an encoded region and pinning regions.

Referring to FIG. 52, a parallel processing example for a Single Field (SF) PCME sensor with Pinning Regions on either side of the main sensing region is illustrated, in order to reduce (or even eliminate) Hot-Spotting.

A Dual Field PCME Sensor is less sensitive to the effects of Hot-Spotting as the sensor centre region is already Pinned-Down. However, the remaining Hot-Spotting sensitivity can be further reduced by placing Pinning Regions on either side of the Dual-Field Sensor Region.

Figure 53:
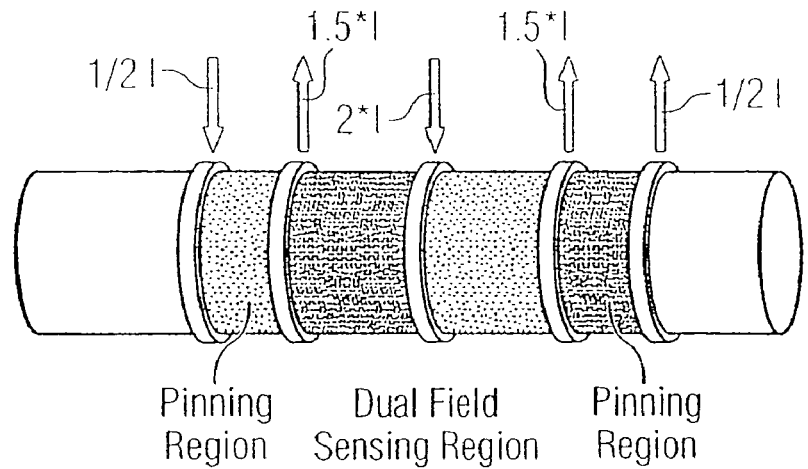
FIG. 53 is another schematic representation of a sensor element according to an exemplary embodiment of the present invention manufactured in accordance with a manufacturing method according to an exemplary embodiment of the present invention.

Referring to FIG. 53, a Dual Field (DF) PCME sensor with Pinning Regions either side is shown.

When Pinning Regions are not allowed or possible (example: limited axial spacing available) then the Sensing Region has to be magnetically shielded from the influences of external Ferro Magnetic Materials.

In the following, the Rotational Signal Uniformity (RSU) will be explained.

The RSU sensor performance are, according to current understanding, mainly depending on how circumferentially uniform the electrical current entered and exited the SH surface, and the physical space between the electrical current entry and exit points. The larger the spacing between the current entry and exit points, the better is the RSU performance.

Figure 54:
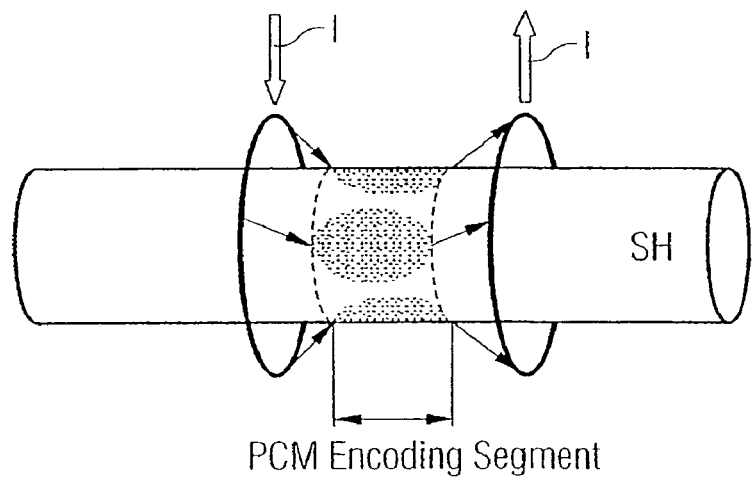
FIG. 54 is a simplified schematic representation for further explaining an exemplary embodiment of the present invention.

Referring to FIG. 54, when the spacings between the individual circumferential placed current entry points are relatively large in relation to the shaft diameter (and equally large are the spacings between the circumferentially placed current exit points) then this will result in very poor RSU performances. In such a case the length of the PCM Encoding Segment has to be as large as possible as otherwise the created magnetic field will be circumferentially non-uniform.

Figure 55:
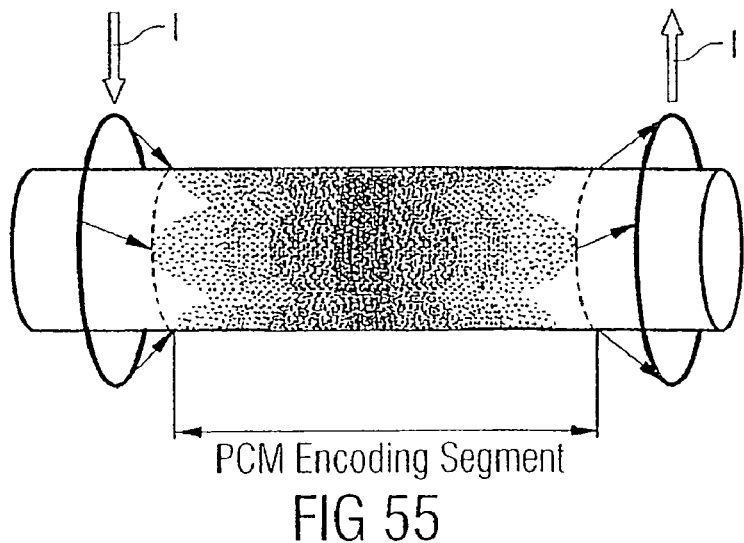
FIG. 55 is another simplified schematic representation for further explaining an exemplary embodiment of the present invention.

Referring to FIG. 55, by widening the PCM Encoding Segment the circumferentially magnetic field distribution will become more uniform (and eventually almost perfect) at the halve distance between the current entry and current exit points. Therefore the RSU performance of the PCME sensor is best at the halve way-point between of the current-entry/current-exit points.

Next, the basic design issues of a NCT sensor system will be described.

Without going into the specific details of the PCM-Encoding technology, the end-user of this sensing technology need to now some design details that will allow him to apply and to use this sensing concept in his application. The following pages describe the basic elements of a magnetostriction based NCT sensor (like the primary sensor, secondary sensor, and the SCSP electronics), what the individual components look like, and what choices need to be made when integrating this technology into an already existing product.

In principle the PCME sensing technology can be used to produce a stand-alone sensor product. However, in already existing industrial applications there is little to none space available for a "stand-alone" product. The PCME technology can be applied in an existing product without the need of redesigning the final product.

In case a stand-alone torque sensor device or position detecting sensor device will be applied to a motor-transmission system it may require that the entire system need to undergo a major design change.

In the following, referring to FIG. 56, a possible location of a PCME sensor at the shaft of an engine is illustrated.

Figure 56:
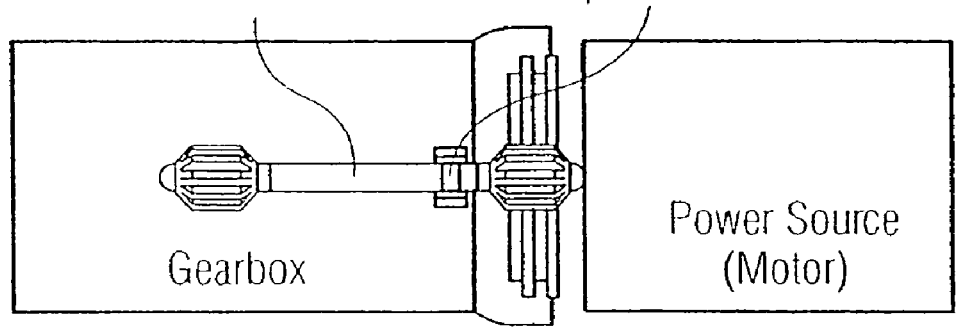
FIG. 56 shows an application of a torque sensor according to an exemplary embodiment of the present invention in a gear box of a motor.
Figure 56:
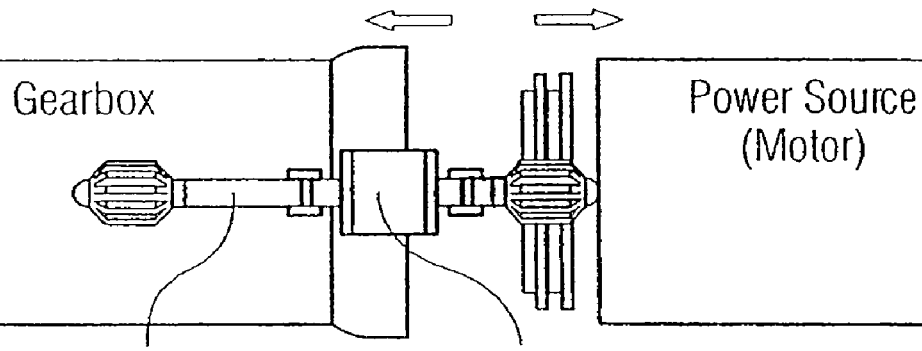

FIG. 56 shows possible arrangement locations for the torque sensor according to an exemplary embodiment of the present invention, for example, in a gear box of a motorcar. The upper portion of FIG. 56 shows the arrangement of the PCME torque sensor according to an exemplary embodiment of the present invention. The lower portion of the FIG. 56 shows the arrangement of a stand alone sensor device which is not integrated in the input shaft of the gear box as is in the exemplary embodiment of the present invention.

As may be taken from the upper portion of FIG. 56, the torque sensor according to an exemplary embodiment of the present invention may be integrated into the input shaft of the gear box. In other words, the primary sensor may be a portion of the input shaft. In other words, the input shaft may be magnetically encoded such that it becomes the primary sensor or sensor element itself. The secondary sensors, i.e. the coils, may, for example, be accommodated in a bearing portion close to the encoded region of the input shaft. Due to this, for providing the torque sensor between the power source and the gear box, it is not necessary to interrupt the input shaft and to provide a separate torque sensor in between a shaft going to the motor and another shaft going to the gear box as shown in the lower portion of FIG. 56.

Due to the integration of the encoded region in the input shaft it is possible to provide for a torque sensor without making any alterations to the input shaft, for example, for a car. This becomes very important, for example, in parts for an aircraft where each part has to undergo extensive tests before being allowed for use in the aircraft. Such torque sensor according to the present invention may be perhaps even without such extensive testing being corporated in shafts in aircraft or turbine since, the immediate shaft is not altered. Also, no material effects are caused to the material of the shaft.

Furthermore, as may be taken from FIG. 56, the torque sensor according to an exemplary embodiment of the present invention may allow to reduce a distance between a gear box and a power source since the provision of a separate stand alone torque sensor between the shaft exiting the power source and the input shaft to the gear box becomes obvious.

Next, Sensor Components will be explained.

Figure 57:
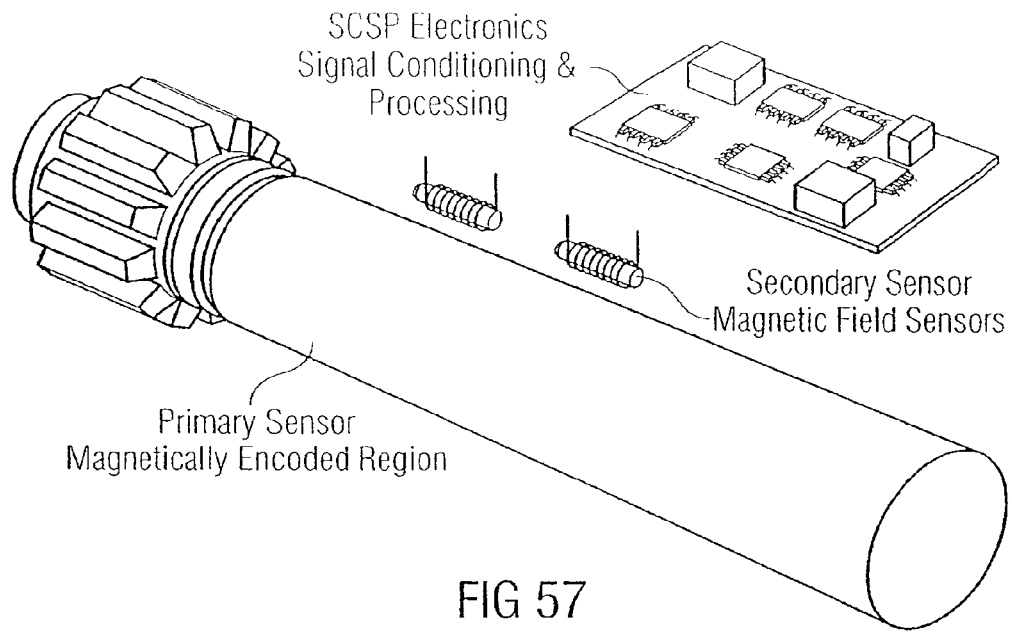
FIG. 57 shows a torque sensor according to an exemplary embodiment of the present invention.

A non-contact magnetostriction sensor (NCT-Sensor), as shown in FIG. 57, may consist, according to an exemplary embodiment of the present invention, of three main functional elements: The Primary Sensor, the Secondary Sensor, and the Signal Conditioning & Signal Processing (SCSP) electronics.

Depending on the application type (volume and quality demands, targeted manufacturing cost manufacturing process flow) the customer can chose to purchase either the individual components to build the sensor system under his own management, or can subcontract the production of the individual modules.

Figure 58:
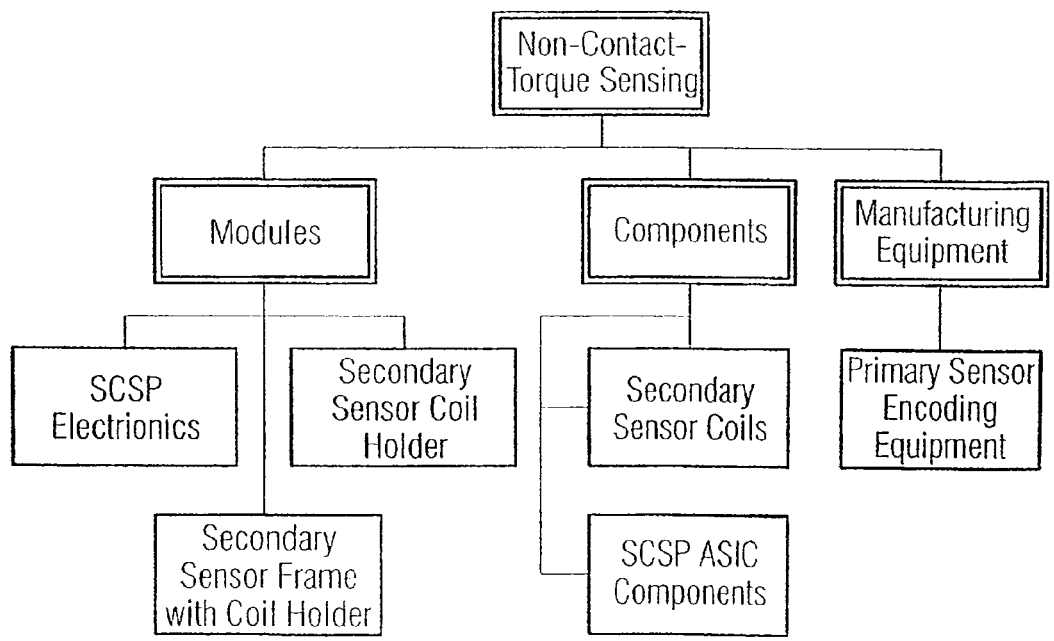
FIG. 58 shows a schematic illustration of components of a non-contact torque sensing device according to an exemplary embodiment of the present invention.

FIG. 58 shows a schematic illustration of components of a non-contact torque sensing device. However, these components can also be implemented in a non-contact position sensing device.

In cases where the annual production target is in the thousands of units it may be more efficient to integrate the "primary-sensor magnetic-encoding-process" into the customers manufacturing process. In such a case the customer needs to purchase application specific "magnetic encoding equipment".

In high volume applications, where cost and the integrity of the manufacturing process are critical, it is typical that NCTE supplies only the individual basic components and equipment necessary to build a non-contact sensor:

ICs (surface mount packaged, Application-Specific Electronic Circuits)

MFS-Coils (as part of the Secondary Sensor)

Sensor Host Encoding Equipment (to apply the magnetic encoding on the shaft=Primary Sensor)

Depending on the required volume, the MFS-Coils can be supplied already assembled on a frame, and if desired, electrically attached to a wire harness with connector. Equally the SCSP (Signal Conditioning & Signal Processing) electronics can be supplied fully functional in PCB format, with or without the MFS-Coils embedded in the PCB.

Figure 59:
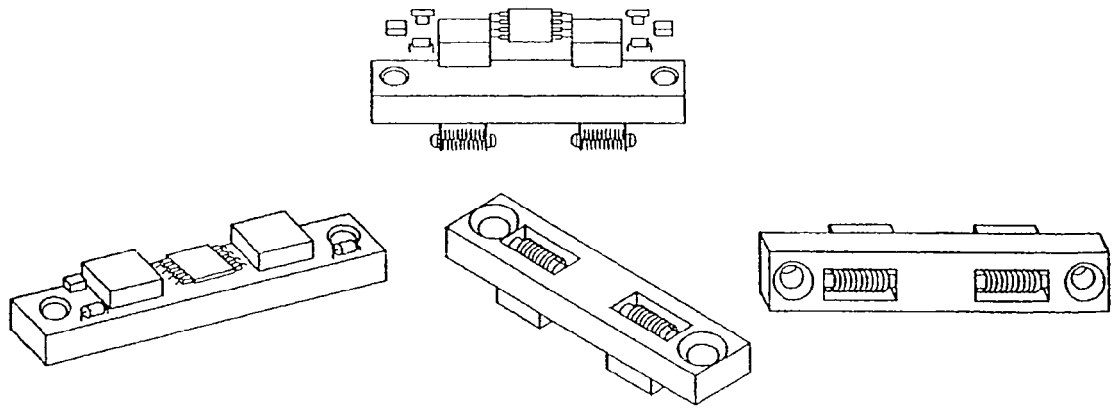
FIG. 59 shows components of a sensing device according to an exemplary embodiment of the present invention.

FIG. 59 shows components of a sensing device.

Figure 60:
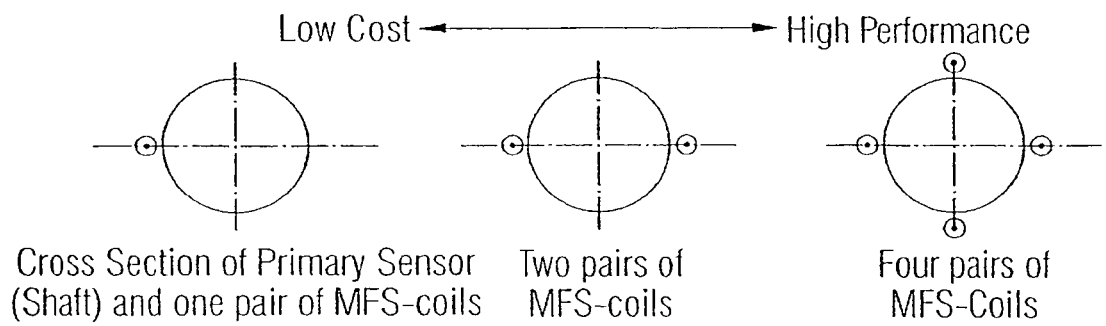
FIG. 60 shows arrangements of coils with a sensor element according to an exemplary embodiment of the present invention.

As can be seen from FIG. 60, the number of required MFS-coils is dependent on the expected sensor performance and the mechanical tolerances of the physical sensor design. In a well designed sensor system with perfect Sensor Host (SH or magnetically encoded shaft) and minimal interferences from unwanted magnetic stray fields, only 2 MFS-coils are needed. However, if the SH is moving radial or axial in relation to the secondary sensor position by more than a few tenths of a millimeter, then the number of MFS-coils need to be increased to achieve the desired sensor performance.

In the following, a control and/or evaluation circuitry will be explained.

The SCSP electronics, according to an exemplary embodiment of the present invention, consist of the NCTE specific ICs, a number of external passive and active electronic circuits, the printed circuit board (PCB), and the SCSP housing or casing. Depending on the environment where the SCSP unit will be used the casing has to be sealed appropriately.

Depending on the application specific requirements NCTE (according to an exemplary embodiment of the present invention) offers a number of different application specific circuits:

Basic Circuit

Basic Circuit with integrated Voltage Regulator

High Signal Bandwidth Circuit

Optional High Voltage and Short Circuit Protection Device

Optional Fault Detection Circuit

Figure 61:
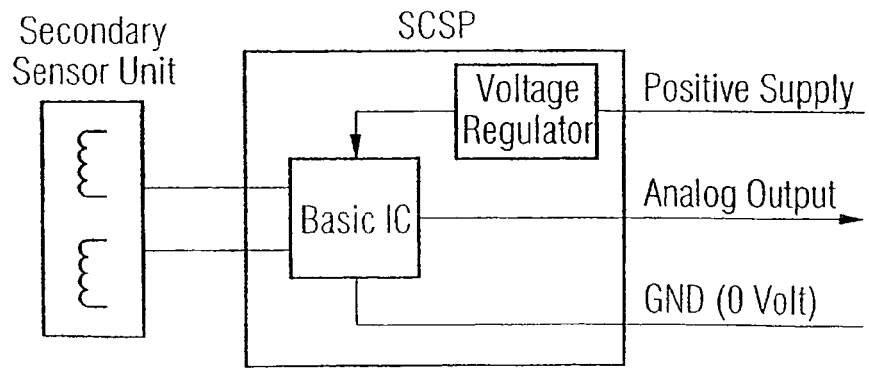
FIG. 61 shows a single channel sensor electronics according to an exemplary embodiment of the present invention.

FIG. 61 shows a single channel, low cost sensor electronics solution.

As may be taken from FIG. 61, there may be provided a secondary sensor unit which comprises, for example, coils. These coils are arranged as, for example, shown in FIG. 60 for sensing variations in a magnetic field emitted from the primary sensor unit, i.e. the sensor shaft or sensor element when torque is applied thereto. The secondary sensor unit is connected to a basis IC in a SCST. The basic IC is connected via a voltage regulator to a positive supply voltage. The basic IC is also connected to ground. The basic IC is adapted to provide an analog output to the outside of the SCST which output corresponds to the variation of the magnetic field caused by the stress applied to the sensor element.

Figure 62:
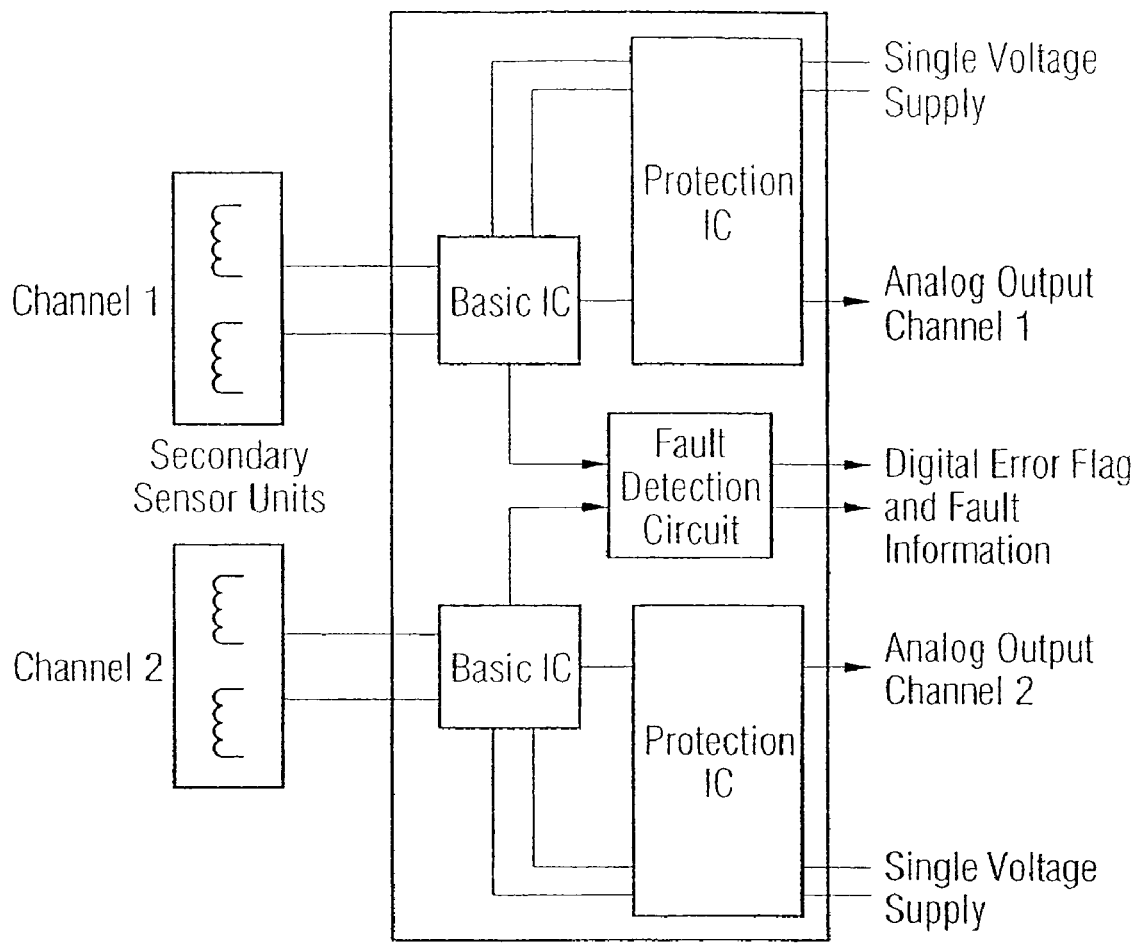
FIG. 62 shows a dual channel, short circuit protected system according to an exemplary embodiment of the present invention.

FIG. 62 shows a dual channel, short circuit protected system design with integrated fault detection. This design consists of 5 ASIC devices and provides a high degree of system safety. The Fault-Detection IC identifies when there is a wire breakage anywhere in the sensor system, a fault with the MFS coils, or a fault in the electronic driver stages of the "Basic IC".

Next, the Secondary Sensor Unit will be explained.

Figure 63:
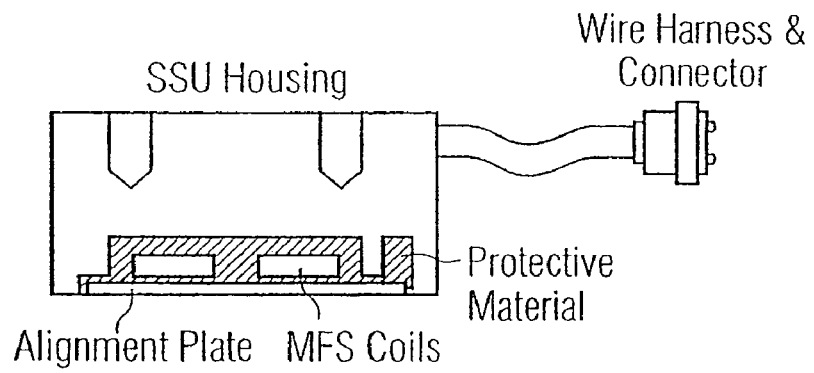
FIG. 63 shows a sensor according to another exemplary embodiment of the present invention.

The Secondary Sensor may, according to one embodiment shown in FIG. 63, consist of the elements: One to eight MFS (Magnetic Field Sensor) Coils, the Alignment- & Connection-Plate, the wire harness with connector, and the Secondary-Sensor-Housing.

The MFS-coils may be mounted onto the Alignment-Plate. Usually the Alignment-Plate allows that the two connection wires of each MFS-Coil are soldered/connected in the appropriate way. The wire harness is connected to the alignment plate. This, completely assembled with the MFS-Coils and wire harness, is then embedded or held by the Secondary-Sensor-Housing.

The main element of the MFS-Coil is the core wire, which has to be made out of an amorphous-like material.

Depending on the environment where the Secondary-Sensor-Unit will be used, the assembled Alignment Plate has to be covered by protective material. This material can not cause mechanical stress or pressure on the MFS-coils when the ambient temperature is changing.

In applications where the operating temperature will not exceed +110 deg C. the customer has the option to place the SCSP electronics (ASIC) inside the secondary sensor unit (SSU). While the ASIC devices can operated at temperatures above +125 deg C. it will become increasingly more difficult to compensate the temperature related signal-offset and signal-gain changes.

The recommended maximal cable length between the MFS-coils and the SCSP electronics is 2 meters. When using the appropriate connecting cable, distances of up to 10 meters are achievable. To avoid signal-cross-talk in multi-channel applications (two independent SSUs operating at the same Primary Sensor location=Redundant Sensor Function), specially shielded cable between the SSUs and the SCSP Electronics should be considered.

When planning to produce the Secondary-Sensor-Unit (SSU) the producer has to decide which part/parts of the SSU have to be purchased through subcontracting and which manufacturing steps will be made in-house.

In the following, Secondary Sensor Unit Manufacturing Options will be described.

When integrating the NCT-Sensor into a customized tool or standard transmission system then the systems manufacturer has several options to choose from:

custom made SSU (including the wire harness and connector)

selected modules or components; the final SSU assembly and system test may be done under the customer's management.

only the essential components (MFS-coils or MFS-core-wire, Application specific ICs) and will produce the SSU in-house.

Figure 64:
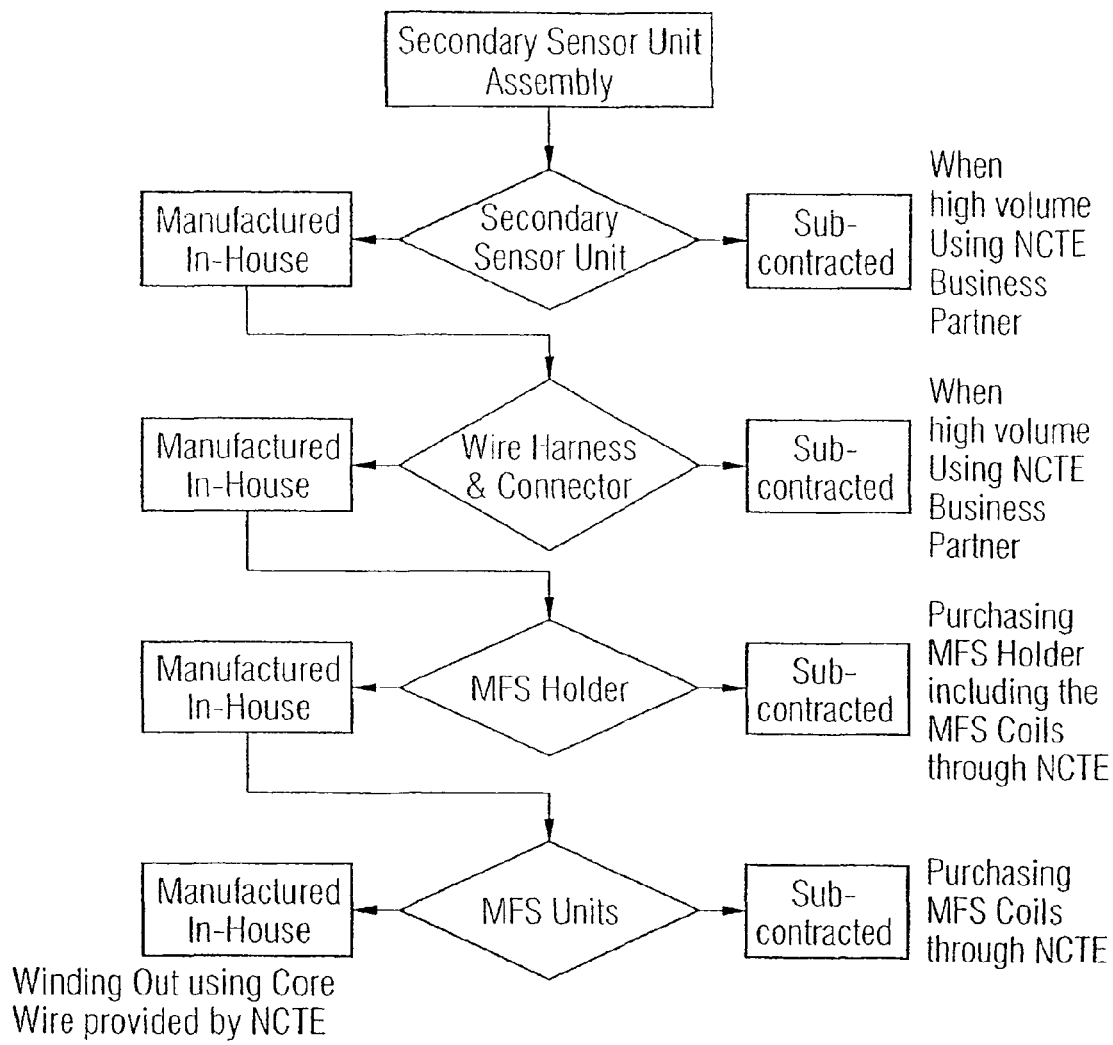
FIG. 64 illustrates an exemplary embodiment of a secondary sensor unit assembly according to an exemplary embodiment of the present invention.

FIG. 64 illustrates an exemplary embodiment of a Secondary Sensor Unit Assembly.

Next, a Primary Sensor Design is explained.

The SSU (Secondary Sensor Units) can be placed outside the magnetically encoded SH (Sensor Host) or, in case the SH is hollow, inside the SH. The achievable sensor signal amplitude is of equal strength but has a much better signal-to-noise performance when placed inside the hollow shaft.

Figure 65:
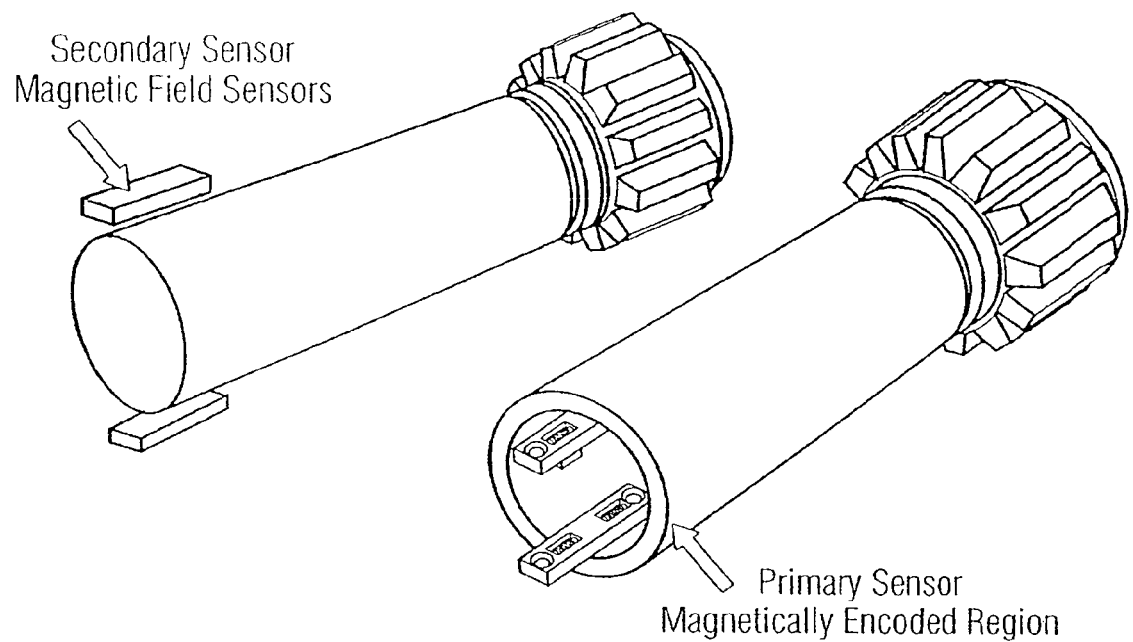
FIG. 65 illustrates two configurations of a geometrical arrangement of primary sensor and secondary sensor according to an exemplary embodiment of the present invention.

FIG. 65 illustrates two configurations of the geometrical arrangement of Primary Sensor and Secondary Sensor.

Improved sensor performances may be achieved when the magnetic encoding process is applied to a straight and parallel section of the SH (shaft). For a shaft with 15 mm to 25 mm diameter the optimal minimum length of the Magnetically Encoded Region is 25 mm. The sensor performances will further improve if the region can be made as long as 45 mm (adding Guard Regions). In complex and highly integrated transmission (gearbox) systems it will be difficult to find such space. Under more ideal circumstances, the Magnetically Encoded Region can be as short as 14 mm, but this bears the risk that not all of the desired sensor performances can be achieved.

Figure 66:
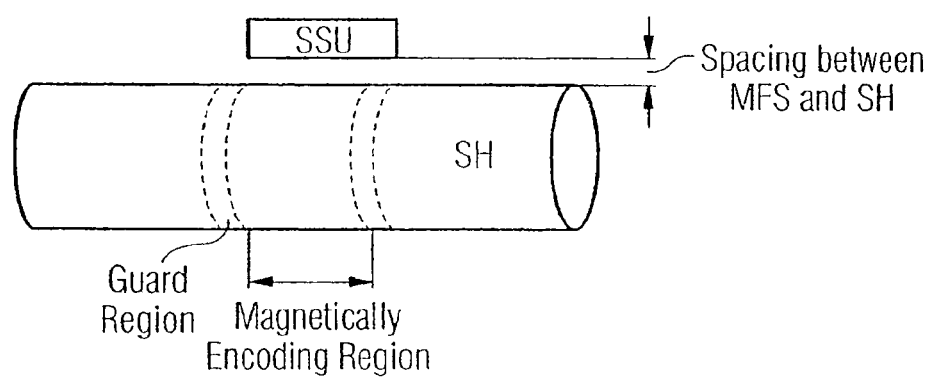
FIG. 66 is a schematic representation for explaining that a spacing between the secondary sensor unit and the sensor host is preferably as small as possible.

As illustrated in FIG. 66, the spacing between the SSU (Secondary Sensor Unit) and the Sensor Host surface, according to an exemplary embodiment of the present invention, should be held as small as possible to achieve the best possible signal quality.

Next, the Primary Sensor Encoding Equipment will be described.

Figure 67:
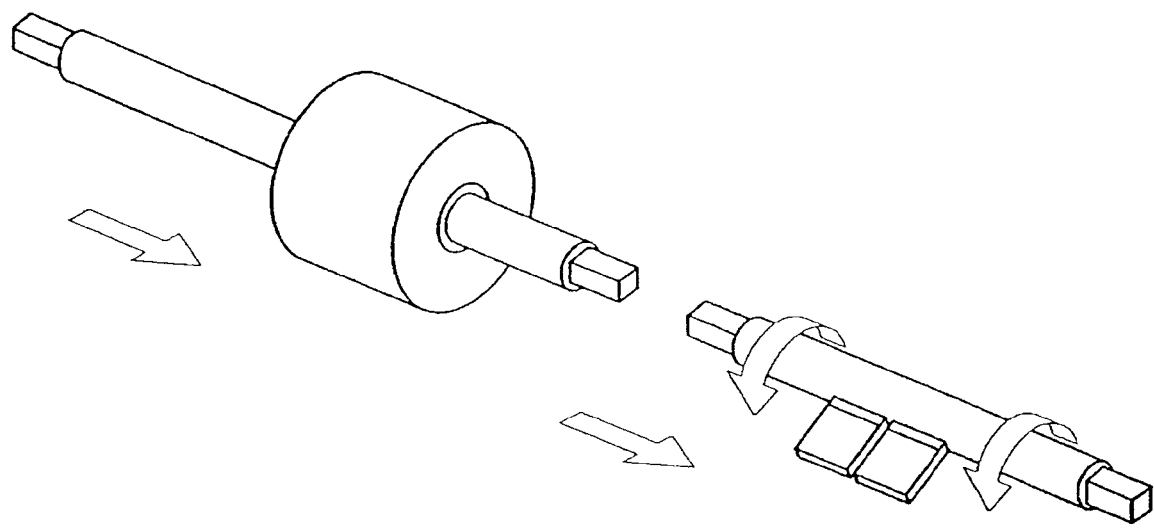
FIG. 67 is an embodiment showing a primary sensor encoding equipment.

An example is shown in FIG. 67.

Depending on which magnetostriction sensing technology will be chosen, the Sensor Host (SH) needs to be processed and treated accordingly. The technologies vary by a great deal from each other (ABB, FAST, FT, Kubota, MDI, NCTE, RM, Siemens, . . . ) and so does the processing equipment required. Some of the available magnetostriction sensing technologies do not need any physical changes to be made on the SH and rely only on magnetic processing (MDI, FAST, NCTE).

While the MDI technology is a two phase process, the FAST technology is a three phase process, and the NCTE technology a one phase process, called PCM Encoding.

One should be aware that after the magnetic processing, the Sensor Host (SH or Shaft), has become a "precision measurement" device and has to be treated accordingly. The magnetic processing should be the very last step before the treated SH is carefully placed in its final location.

The magnetic processing should be an integral part of the customer's production process (in-house magnetic processing) under the following circumstances:

High production quantities (like in the thousands)
Heavy or difficult to handle SH (e.g. high shipping costs)
Very specific quality and inspection demands (e.g. defense applications)

In all other cases it may be more cost effective to get the SH magnetically treated by a qualified and authorized subcontractor, such as NCTE. For the "in-house" magnetic processing dedicated manufacturing equipment is required. Such equipment can be operated fully manually, semi-automated, and fully automated. Depending on the complexity and automation level the equipment can cost anywhere from EUR 20k to above EUR 500k.

In the following, referring to FIG. 68A, FIG. 68B, an apparatus 6800 for magnetizing a magnetizable object 6803 to generate magnetically encoded regions will be described.

The apparatus 6800 comprises electrical connection elements 6801 for electrically contacting different portions of the magnetizable object 6803. Furthermore, an electric signal supply unit 6802 is provided which is connected to the electrical connection elements 6801 and is adapted for applying different electric signals to the different portions so as to generate different magnetically encoded regions in the different portions of the magnetizable object 6803.

In more detail, two electric connection elements 6801 are connected to a left portion of the circumference of the magnetizable object 6803, wherein a current I1 may be inserted in this portion. A right portion of the magnetizable object 6803 is connected by two other electric connection elements 6801 in order to insert the current I1 in this portion, however for instance with opposite direction. An upper part of the circumference of the magnetizable object 6803 is contacted by two other electric connection elements 6801 in order to insert a current I2 in the corresponding portion of the surface of the magnetizable object 6803. Furthermore, the current I2 is further inserted in a bottom part of the circumference of the magnetizable object 6803 by two further electric connection elements 6801 in order to generate another separately determinable and definable magnetization in this part of the surface.

The currents I1, I2 differing concerning direction, polarities and amplitudes may be adjusted separately and may be applied simultaneously or subsequently to the different portions of the surface of the magnetizable object 6803.

By taking this measure, different magnetic surface portions related to the contacts of the electrical connection element 6801 may be defined on the surface of the magnetizable object 6803. This may result in a magnetization pattern on the surface of the magnetizable object 6803 which is illustrated in FIG. 74B.

Figures 68A, 68B:
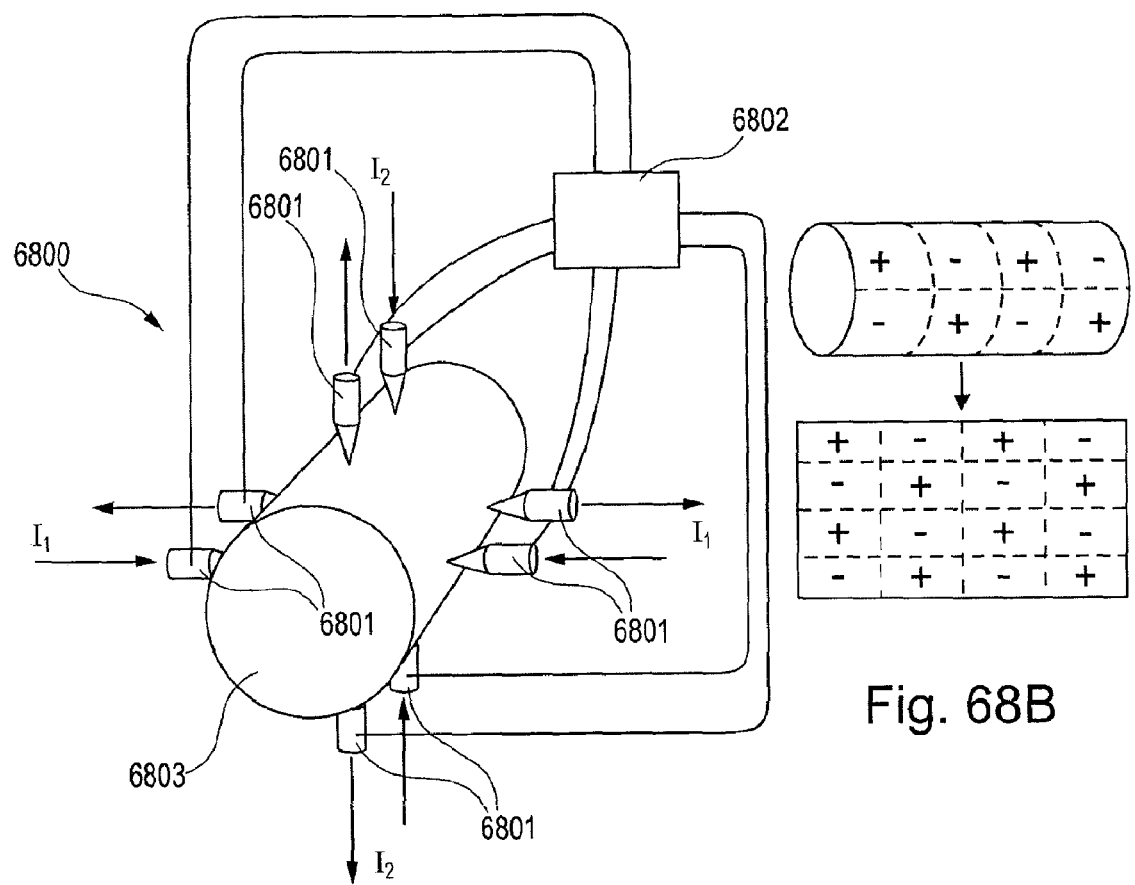
FIG. 68A illustrates an apparatus for magnetizing a magnetizable object according to an exemplary embodiment of the invention.
FIG. 68B illustrates a chessboard-like structure of a surface of the magnetizable object magnetized in accordance with FIG. 68A.

FIG. 68B shows the surface projection of the magnetized portions of the surface of the magnetizable object 6803.

As can be seen in FIG. 68B, a chessboard-like pattern can be generated on the surface. Adjacent portions may differ concerning polarity and/or intensity of the magnetic field or magnetization generated in the assigned portion.

The configuration shown in FIG. 68A, FIG. 68B results in a surface magnetization pattern which, when sampled or scanned by a magnetic field detector arranged in a vicinity of the circumferential surface of the magnetizable object 6803 has contributions of a plurality of sine functions.

In other words, FIG. 68A, FIG. 68B show an "analog/digital signal, multi-cycle pattern".

The "analog/digital, multi-cycle pattern" rotational angle sensor provides two or more complete cycles of a near sinus shape or a pseudo sinus shape output signal when the magnetically encoded sensor host rotates 360°.

To get a multi-cycle and magnetic pattern, the PCME encoding signal has to be passed through the sensor host in two or more alternating patterns. The solution shown in FIG. 68A, FIG. 68B can be realized with a magnetic processing of a ferromagnetic shaft. If the rotating device 6803 (like a transmission shaft of the power steering shaft) has ferromagnetic properties, then the magnetic processing can be applied to this shaft.

According to the magnetizing scheme shown in FIG. 68A, FIG. 68B, the different currents I1, I2 can be applied one after the other, or simultaneously.

Particularly, although not shown in FIG. 68A, it may be advantageous to use an individual electric signal supply unit 6802 for each pair of the electrical connection elements 6801.

For instance, the current sources I2 and I1 may be separate from each other. Meaning that one needs to use two independent current supply sources to ensure that there is no current cross talk between I1 and I2.

Referring to FIG. 68B, the chess board as shown is generated by using the method as shown in 68A. Meaning that the 4 by 4 field structure forms automatically even so when only 4 current paths are used for magnetic encoding. It is believed that the reason is that only the inner two chess board structures (columns) are generated directly through the current flowing from one connector to the other electrical contact. The outer two chess board columns may be generated by themselves without a electrical current flowing through that regions. This may have something to do with the inductivity between the shaft ends (the sections outside the direct magnetic encoded region) and the cabling.

Figure 69:
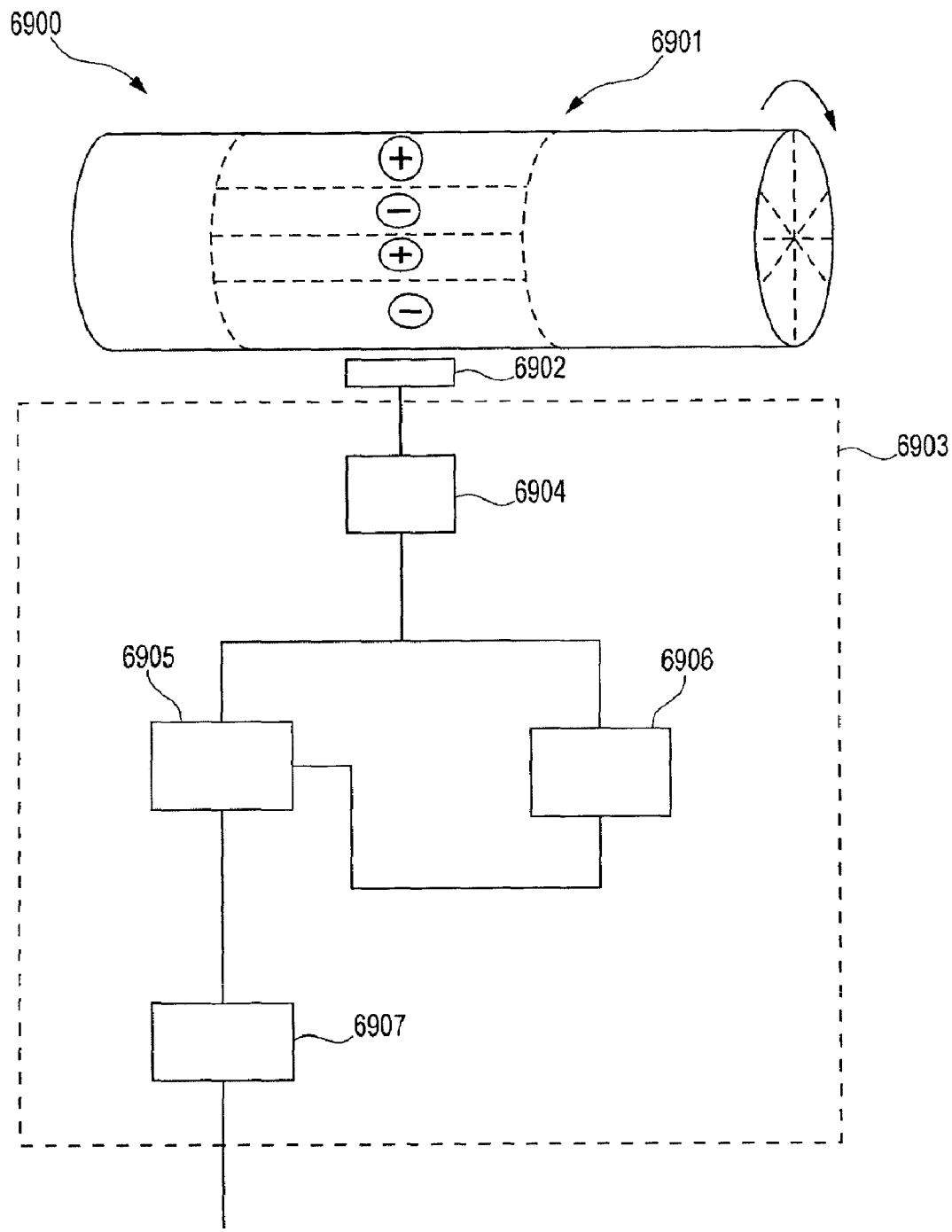
FIG. 69 schematically illustrate a sensor device according to an exemplary embodiment of the invention.
Figure 70:
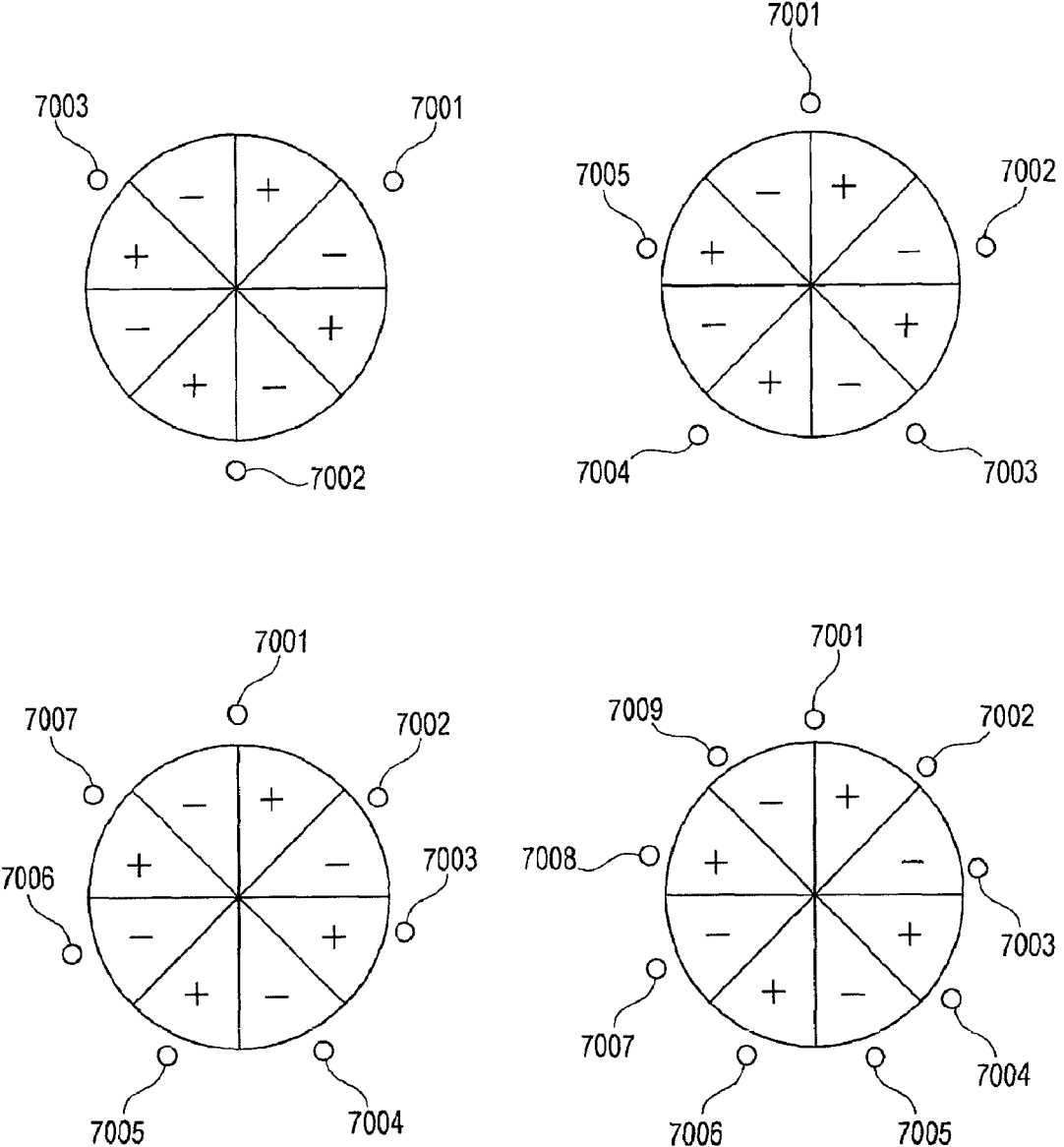
FIG. 70 schematically shows a cross sectional view of a moveable object.

Referring to FIG. 69, a sensor device 6900 according to an exemplary embodiment of the invention is schematically shown. The sensor device 6900 is particularly adapted to determine a dynamic force, e.g. torque, and comprises a moveable object 6901 having a plurality of magnetically encoded region. In particular, the number of the magnetically encoded regions is even and the regions are preferably arranged in the chessboard-like pattern which is schematically shown by different regions indicated by the dotted lines and labelled "+" and "−" in FIG. 69. The magnetically encoded regions are placed circumferential in respect to the moveable object. The sensor device 6900 further comprises a plurality of magnetic field detectors 6902 only one of which is schematically shown in FIG. 69. The number of magnetic field detectors is β with β={n∈N|γ>0}, wherein $$\gamma = \left(\frac{\alpha}{n}\right) - \text{int}\left(\frac{\alpha}{n}\right),$$

n∈N, i.e. n is a whole positive number, and α is the number of magnetically encoded regions. As the magnetically encoded regions the magnetic field detectors are placed circumferential to the moveable object. Which is schematically shown in FIG. 70, described later. According to the present invention also more than one set of magnetically encoded regions can be placed on the moveable object, i.e. a second, third, etc. row of circumferential magnetically regions can be placed adjacent to the depicted magnetically encoded regions, to form a real chessboard-like structure as schematically shown in FIG. 68B. In this case for each set of magnetically encoded regions a plurality of magnetic field detectors are provided which plurality of magnetic field detectors is subjected to the above described constraints.

The magnetic field detector 6900 is coupled to a physical parameter information determining unit 6903. The physical parameter information determining unit 6903 comprises several elements. One of these elements is a signal conditioning signal processing unit 6904 coupled with the plurality of magnetic field detectors and adapted to process the detected signal and to generate a processed detected signal.

The processed signal is supplied to a speed detection unit 6906 as well as to a programmable filter 6905. The speed detection unit 6906 is connected also to the programmable filter 6905 and is adapted to determine the speed of the moveable object 6901 and to supply a speed signal corresponding to the determined speed to the programmable filter 6905. This speed signal may be used as a filter signal for the programmable filter 6905.

The programmable filter 6905 is adapted to generate a signal out of the processed signal of the SCSP unit 6904 and the speed signal of the speed detection unit 6906. This signal of the filter unit 6905 is then supplied to a rectifier 6907 which is also a part of the physical parameter information determining unit 6903. The output signal of the rectifier 6907 represents a signal corresponding to the torque applied to the moveable object 6901.

Referring to FIG. 70, a cross section of the moveable object 7000 is schematically shown. The moveable object depicted in FIG. 70 comprises eight magnetically encoded regions which are schematically shown and labelled with either "+" or "−". Furthermore, in the four parts of FIG. 70 different numbers of magnetic field detectors 7001 to 7009 are shown. In the upper left three magnetic field detectors 7001 to 7003 are shown. In the upper right five magnetic field detectors 7001 to 7005 are shown. In the lower left seven magnetic field detectors 7001 to 7007 are shown. In the lower right nine magnetic field detectors 7001 to 7009 are shown. The magnetic field detectors may be equally spaced or may be unevenly spaced along the circumference of the moveable object.

Figures 71A, 71B:
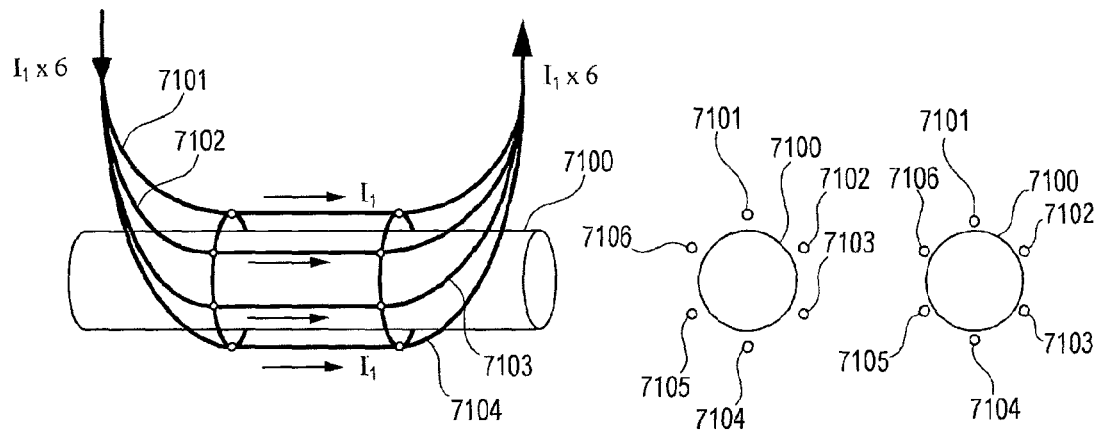
FIG. 71 schematically shows an exemplary embodiment of an encoding technique.

In the following, referring to FIG. 71 an exemplary embodiment of an encoding technique is described. This technology requires that the magnetizable object, e.g. a shaft, that will be magnetically processed have to be manufactured from ferromagnetic material. In FIG. 71A a shaft 7100 is schematically shown around which a plurality of wires 7101, 7102, 7103 and 7104 are arranged. According to this embodiment a total number of six wires are placed around the shaft 7100 without contacting the shaft 7100. While the encoding of the magnetically encoded regions is performed a current $I_1$ is send through the wires. In FIG. 71B cross sections through the shaft 7100 and the wires are shown.

The above magnetic encoding technique will create a permanent magnetic, 6-cycle-sine wave pattern that can be detected when the magnetic encoded shaft is rotating 360 degrees around, i.e. when the shaft circles around one revolution. The sine wave pattern amplitude and sinus-shape symmetry increases when the electric wires that are running parallel to the shaft are placed as close as possible to the shaft during the encoding process. However, the wires are not to a built an electrical connection to the shaft surface.

Best results are achieved when using the PCME pulse signal for the magnetic encoding. After the completion of the magnetic encoding, the electrical wires are no longer needed and can be removed. To get identical signal amplitudes for each sine-wave, it is important that the electric current, flowing parallel to the axis of the shaft, in each wire has the same value, i.e. having identical current values.

The exact wire path to and from the encoding "wire-cage" is critical. FIG. 71 may not show the best possible wire path and has more a symbolical character.

Figure 72:
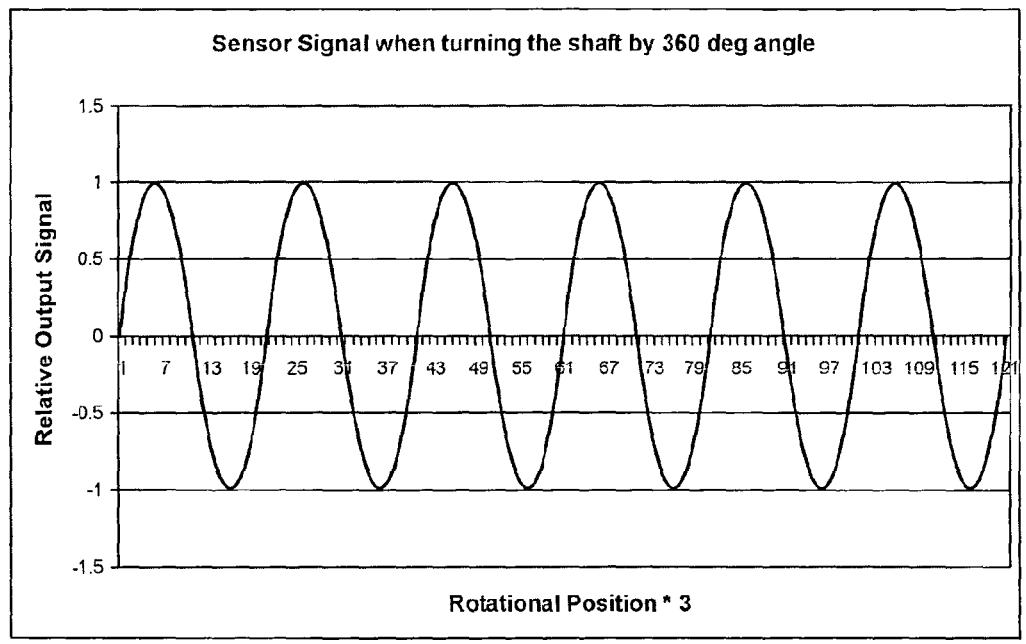
FIG. 72 schematically shows a graph of a signal picked up by an MFS device.

FIG. 72 schematically shows a graph of a signal picked up by an MFS device which MFS device senses a shaft schematically depicted in FIG. 71. The graph show the six sine-wave cycles when turning the shaft 360 degrees around and picking up the signal with a tangentially placed MFS device. On the X-axis of FIG. 72 the rotational position divided by three is shown, that is, the value of 55 relates to 165°, for example. On the Y-axis a relative output signal is shown in arbitrary units.

While the magnetic encoding principle described in connection with FIG. 71 may be ideal to create a speed or angular position sensor, it may allow to measure mechanical forces as well. However, the way how the signal will be picked-up and processed is relatively complex to overcome the RSU (Rotational Signal Uniformity) and the change of signal polarity issue. Preferably, a signal rectifier is used to measure mechanical forces, as it is schematically depicted in FIG. 69. For example, when using only one MFS device, and the shaft is not moving at all, i.e. in case of static torque measurement, statistically it is possible that the MFS device is locking at the wrong location, i.e. at the "zero" signal value point, and therefore will not be able to detect any mechanical forces. Alternatively, when the shaft is rotating at a specific speed and no signal rectifier is used, the alternating positive torque and negative torque signals may cancel-out each other.

In the following, referring to FIG. 73, another exemplary embodiment of an encoding technique is described. This technology is similar to that which is depicted in FIG. 71 but comprises two groups of wires. The shaft that will be magnetically processed have to be manufactured from ferromagnetic material as well. In FIG. 73A a shaft 7300 is schematically shown around which a plurality of wires 7301, 7302, 7303 and 7304 are arranged. According to this embodiment a total number of six wires are placed around the shaft 7300 without contacting the shaft 7100 of which six wires only four are depicted. These wires form a first group of wires, or first wire-cage, through which a current of $I_1$ flow while the encoding of the magnetically encoded regions is performed. Contrary to the embodiment shown in FIG. 71A a second group of wires, or second wire-cage, is placed around the shaft 7300. Through these wires 7305, 7306 and 7307 a current $I_2$ flows while encoding which current have the same strength than $I_1$ but an opposite direction. The wires of the first group and the wires of the second group are placed in an alternating manner, i.e. between each two wires belonging to the first group one wire belonging to the second group is arranged. By placing wires geometrically between the wires of the first wire-cage, and passing the same encoding current through these wires, but in opposite direction, the achievable sensor signal gain, after the magnetic encoding has taken place, may be at least twice as large than when using only one wire-cage for the magnetic encoding of the shaft. The two opposite electrical current paths are not allowed to shorten out each other anywhere at or near the two wire-cages.

The number of wires used in each wire-cage determines how many signal cycles (sin-waves) are placed around the sensing shaft surface. Basically there are no restrictions about how many or how few electrical current paths are placed parallel to the shaft. However, if the number is getting too large, then the resulting signal amplitude is becoming smaller, which consequently means that the MFS devices, used to detect and measure that angular position signal, has to be placed nearer to the shaft surface. Eventually the magnetic polarity-change-cycles are so close to each other, when the number of electric wire paths has become very large, that the resulting signal gain is very small and the physical geometry of the used MFS device is to large to differentiate between the signal-polarity-changes, i.e. everything becomes "gray" and electrically undistinguishable.

FIG. 74 schematically depicts a magnetization achieved using one wire while encoding the magnetically encodable region. In FIG. 74A a cross section of a shaft 7400 is shown having arranged a wire 7401 which wire 7401 is not in direct contact to the shaft 7400. Furthermore, equipotential lines 7402 and 7403 of a magnetic field induced by a current flowing through the wire 7401 are schematically depicted in FIG. 74A. After magnetically encoding, the wire 7401 is removed and the induced magnetic field lines will close in the shaft, i.e. will recombine under the surface of the shaft 7400. This situation is depicted in FIG. 74B. That is, the PCME encoding pulse will magnetize the upper layer of the shaft surface. The right picture, FIG. 74C, shows the to expected magnetic flux effects 7405 that can be detected at the shaft surface and their directions. The depth of this initial magnetization is dependent on how close the electric wire has been placed to the shaft surface and what the max current value of the optimally balanced PCME pulse was, thereby optimally balanced means that a fast pulse raising time and slow pulse falling time is used. After the PCME pulse execution, the magnetized shaft surface forms its own magnetic loop instantaneously which is schematically depicted in FIG. 74C and in the enlarged view below FIG. 74C. Failing to do so would mean that there will be no permanent magnetic field stored inside of the shaft surface. The effects of this shaft-internal magnetic loop, placed right below the shaft surface, can be detected and measured by radial sensitive MFS devices and tangential sensitive MFS devices.

Figures 75A, 75B, 75C:
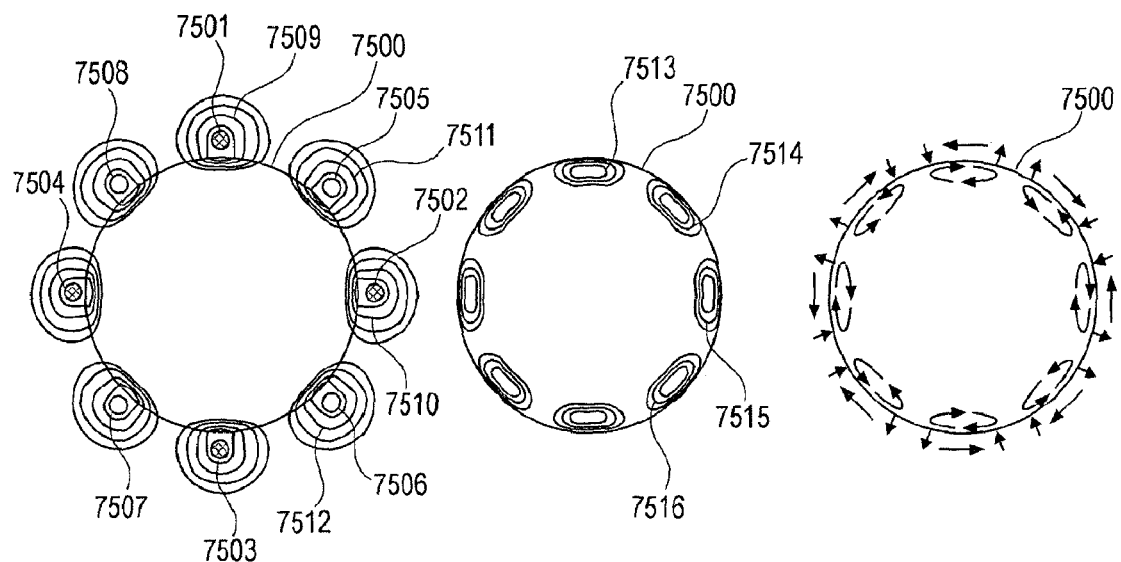
FIG. 75 schematically shows a magnetization achieved using four wires for encoding.

FIG. 75 schematically depicts a magnetization achieved using two wire-cages comprising four wire each while encoding the magnetically encoded region which corresponds to the arrangement shown in FIG. 73. The situation is similar to the situation depicted and explained in connection with FIG. 74. In FIG. 75A a cross section of a shaft 7500 is shown having arranged a First group of wires 7501, 7502, 7503 and 7504 around. A second group of wires 7505, 7506, 7507 and 7508 are also arranged around shaft 7500, wherein none of the wires is in direct contact to the shaft 7500. Furthermore, equipotential lines 7509 and 7510 of a magnetic field induced by a current $I_1$ flowing through the wire 7501 and 7502, respectively, are schematically depicted in FIG. 75A. Through the wires of the second group a current $I_2$ of opposite direction and same amplitude is directed while encoding the shaft 7500. This is also schematically depicted by the equipotential lines 7511 and 7512.

That is, FIG. 75 shows the effect above and below the shaft surface when using: four wires that are placed parallel to the shaft, at every 90 deg angle around the shaft, where the electric encoding current in these four wires is equal and flows in the same direction, and when placing between each of these wires, wires where the identical value of electric current flows in the opposite direction.

Figure 75D:
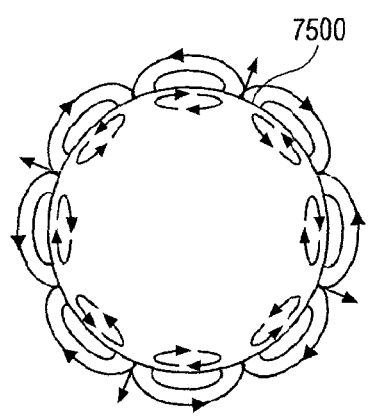

Further, FIG. 75A is the shaft cross section at the center of the angle and mechanical force sensing region, during the main PCME encoding moment. FIG. 75B has been taken after the PCME encoding has taken place and after the stable and permanent magnetic loop-flux-structures 7513, 7514, 7516, and 7517 have been formed beneath the shaft surface. While FIG. 75C as well as FIG. 75D show the to expected magnetic flux effects that can be detected at the shaft surface and their directions.

Figure 76A:
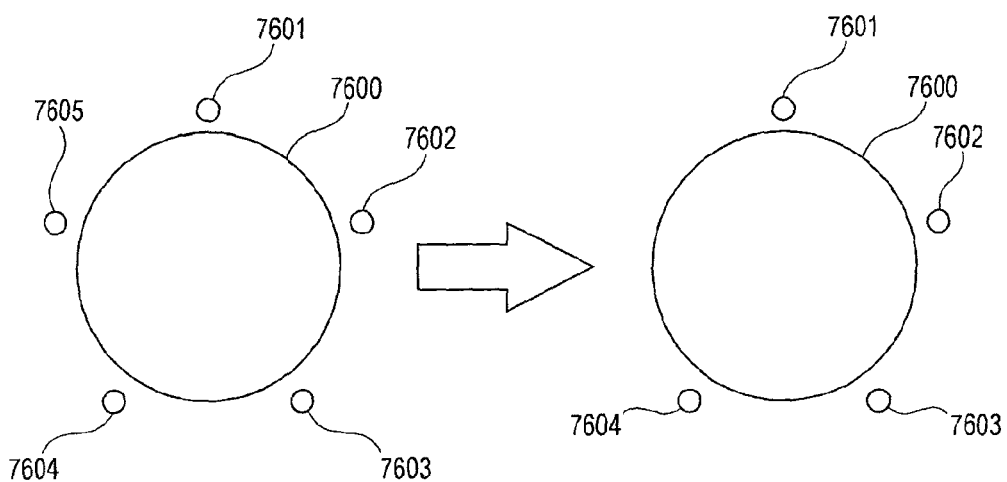
FIG. 76 schematically shows another exemplary arrangement of wires.
Figure 76B:

FIG. 76 schematically shows another exemplary arrangement of wires which can be used to magnetically encode the magnetically encodeable regions of a shaft 7600. In FIG. 76A the encoding wires 7601, 7602, 7603, 7604 and 7605 are evenly spaced around the shaft surface. Before encoding one wire, e.g. 7605 is taken out, thereby the missing wire will leave a wider spacing between the remaining wires. This wider spacing will lead to the fact that a digitized analog sensing signal, detected by MFS devices, highlights the missing pulse more clearly. The digitized analog signal is also depicted in FIG. 76. This is one possible encoding technique that will help to identify the "absolute" angle position.

When using only one MFS device, the shaft has to rotate almost 360 degrees to ensure that the missing "pulse" has been located. From then on the angle sensor is locked to the absolute position of the rotating shaft. When using two or more MFS devices, the required rotational movement of the shaft can be reduced accordingly. That is, when using two MFS devices the shaft has to rotate 360°/2=180°. When three or more MFS devices are used then the absolute rotational shaft position can be identified immediately. That is, there may be no need for rotating shaft around to identify the missing pulse.

Instead of one missing tooth, any other considerable signal pattern can be replicated by placing the encoding wires at the right spacing. For example logarithmic spacing, i.e. a spacing in which the distance between two consecutive wires increases in a logarithmic manner.

Figure 77A:
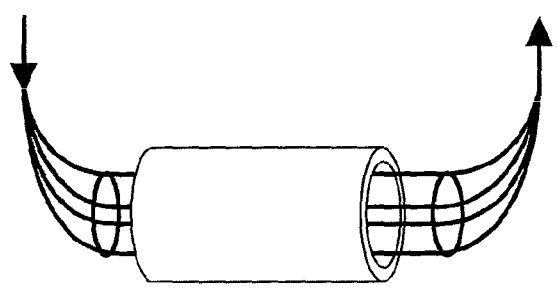
FIG. 77 schematically shows an exemplary embodiment of a magnetic field sensor.
Figure 77B:
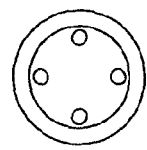

FIG. 77 schematically shows an exemplary embodiment in which the sensing shaft is a tube 7700. FIG. 77A schematically shows the sensing shaft 7700 while four wires 7701, 7702, 7703 and 7704 are used to induce magnetically encoded regions. In case of a tubular shaft the wires are preferably placed inside the shaft while the shaft is encoded. When the wires are placed inside the tubular shaft during the encoding the magnetic field sensors 7705, 7706, 7707, and 7708 are preferably placed also inside the tubular while the measurement is performed. This is schematically depicted in FIG. 77B.

That is, when the sensing shaft is a tube, the magnetic encoding can take place at the inside of the tube or at the outside. In case that the magnetic encoding can take place at the inside of the tube, best signal detection results are achieved when placing the MFS devices at the inside of the tube. The magnetic flux pattern has the most accurate spacing definition at the same side the encoding process has taken place. Thus, it may be preferred to place the electric coupling elements, e.g. wires, at the one side of the tubular shaft while encoding the tubular shaft and place the magnetic field sensors at the same side, as the electric coupling elements were, while measuring.

Figures 78A, 78B:
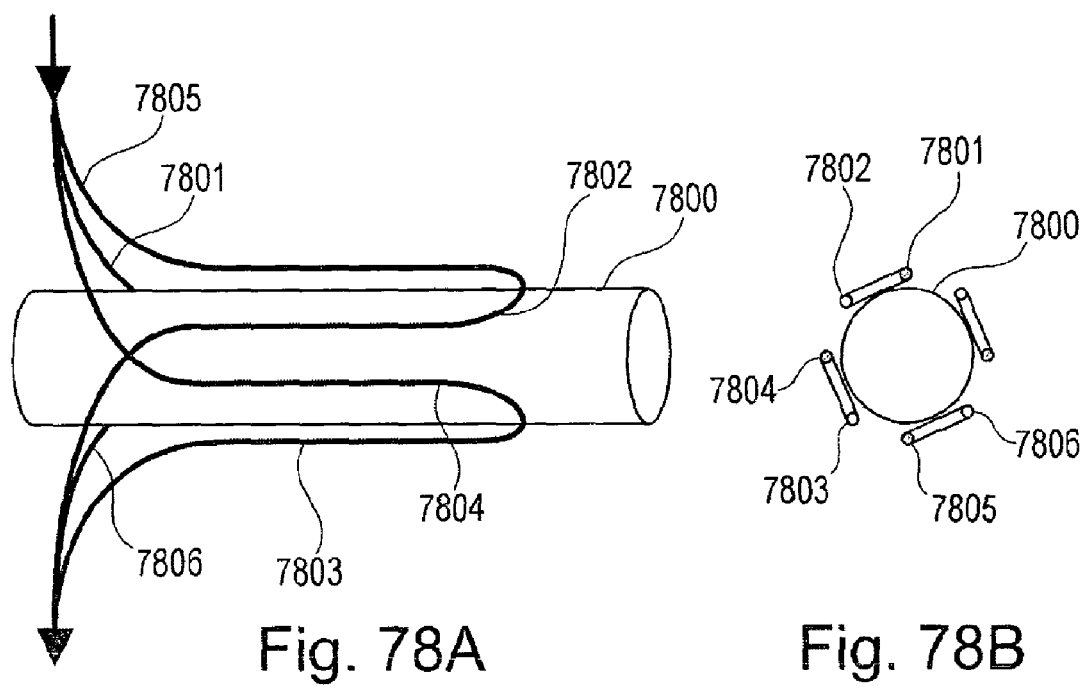
FIG. 78 schematically shows an exemplary embodiment of an encoding technique.

FIG. 78 schematically shows another exemplary embodiment of an encoding technique for a shaft 7800 in which the wires 7801, 7802, 7803, 7804, 7805 and 7806 are bent around one end of a shaft 7800. This technique may be applied as long as the electrical impedance of the wire-cage is not limiting the efficiency of the PCME encoding pulse, the electrical wire that has to be tracked parallel to the shaft. That is, the electrical wire that has to be tracked parallel to the shaft can be bent around at one end and tracked back parallel to the shaft, but shifted by the desired amount of angular degrees. However, as the wire impedance may be higher than in the other outlined wire-cage design, the achievable angle sensor signal amplitude may be lower.

Figure 79:
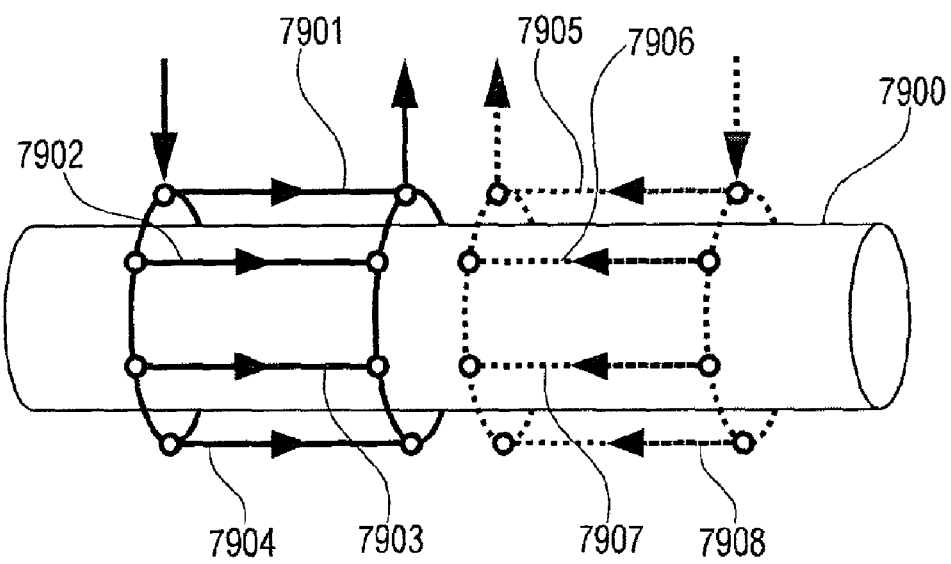
FIG. 79 schematically shows another exemplary embodiment of an encoding technique.

FIG. 79 shows another exemplary embodiment of arranging two wire-cages while encoding a shaft 7900. A first wire-cage comprising several wires 7901, 7902, 7903, and 7904 is placed adjacent to a second wire-cage comprising wires 7905, 7906, 7907, and 7907, wherein the current direction is opposite in the wires of the First wire-cage to the current direction in the wires of the second wire-cage which is schematically shown by the arrows arranged on the wires.

Figures 80A, 80B, 80C:
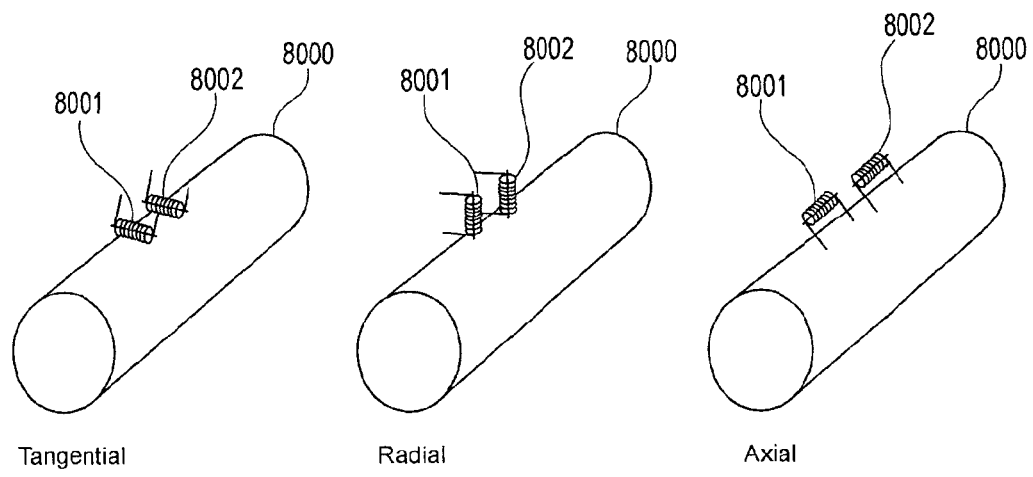
FIG. 80 schematically shows exemplary placements of magnetic field sensors.

That is, to implement "differential mode" signal processing, several options can be used. The one shown in FIG. 79 is placing two encoding regions side-by-side but with opposite output signal polarity. Using two MFS devices that sense in the same direction and are placed above the two encoded sensor region, allows to eliminate any unwanted interfering magnetic signal when subtracting the output signals from each other. That is, an output signal as: Output Signal=$MFS_1-MFS_2$ FIG. 80 schematically shows exemplary placements of magnetic field sensors in reference to a shaft 8000. In FIG. 80A the so-called tangential placement is depicted, in which a longitudinal axis of the magnetic field detectors 8001 and 8002 is perpendicular to an longitudinal axis of the shaft 8000 and tangential to a circumference of the shaft 8000. In FIG. 80B the so-called radial placement is shown in which the longitudinal axis of the MFS 8001 and 8002 is perpendicular to the longitudinal axis of the shaft and in the direction of a radius of the shaft. The tangential and radial placement of the two MFS devices may allow detecting the angular shaft information. In FIG. 80C the so-called axial placement is shown in which the longitudinal axis of the shaft and the longitudinal axis of the MFS 8001 and 8002 are parallel. The axial differential MFS device placement may be most ideal to measure mechanical stresses that are applied to the magnetically encoded shaft.

Figure 81:
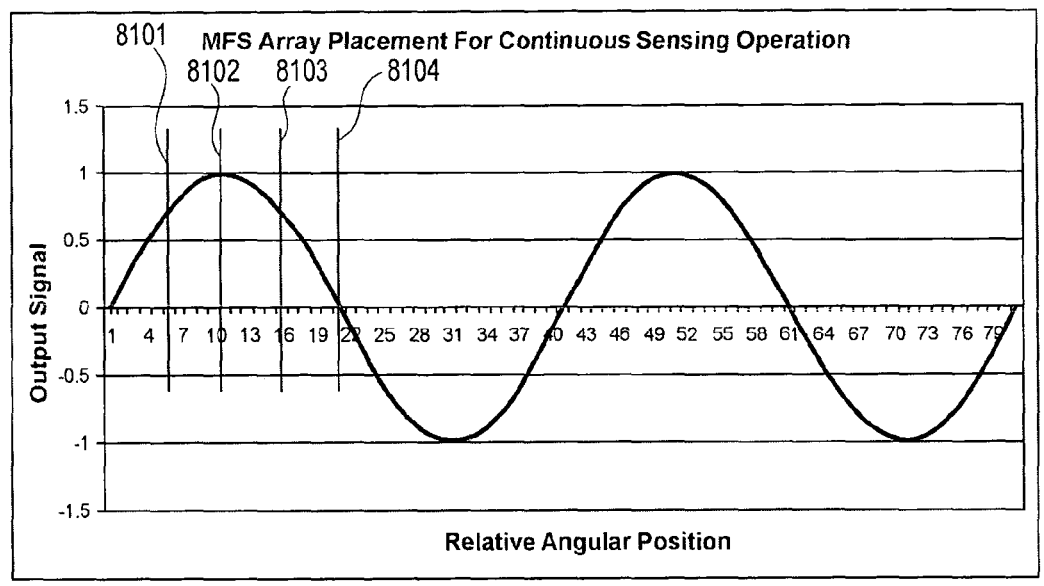
FIG. 81 schematically shows a graph of an output signal for an exemplary placement of magnetic field detectors.

In FIG. 81 a schematically graph of an output signal is shown. When placing several MFS devices around the magnetic encoded shaft surface at an optimal pattern and building the average value of the absolute signal outputs of the used MFS devices, an almost constant output signal may be guaranteed, independent from the relative shaft rotation. The optimal pattern may depend on the number of magnetic signal cycles placed around the 360 degrees of the shaft surface, and further depends on the number of MFS devices that will be used.

In this example four MFS devices are placed every 22.5 degrees rotational angle around the shaft while two complete magnetic signal cycles are encoded in the shaft surface. The angular positions of the MFS devices are schematically shown as the vertical lines 8100, 8101, 8102 and 8103 in FIG. 81. Please note that the X-axis is compressed by a factor of 4.5 so that the value 40-corresponds to a position of 180°, for example. On the Y-axis the output signal measured by the individual MFS is shown using arbitrary units. If the physical dimension of the used MFS devices do not allow that they are placed so close to each other, they can be placed at another magnetic signal cycle instead at the same relative position. For example, the MFS represented by the line 8102 may be placed at the value of 50 instead at the position corresponding to the value of 10.

Figure 82:
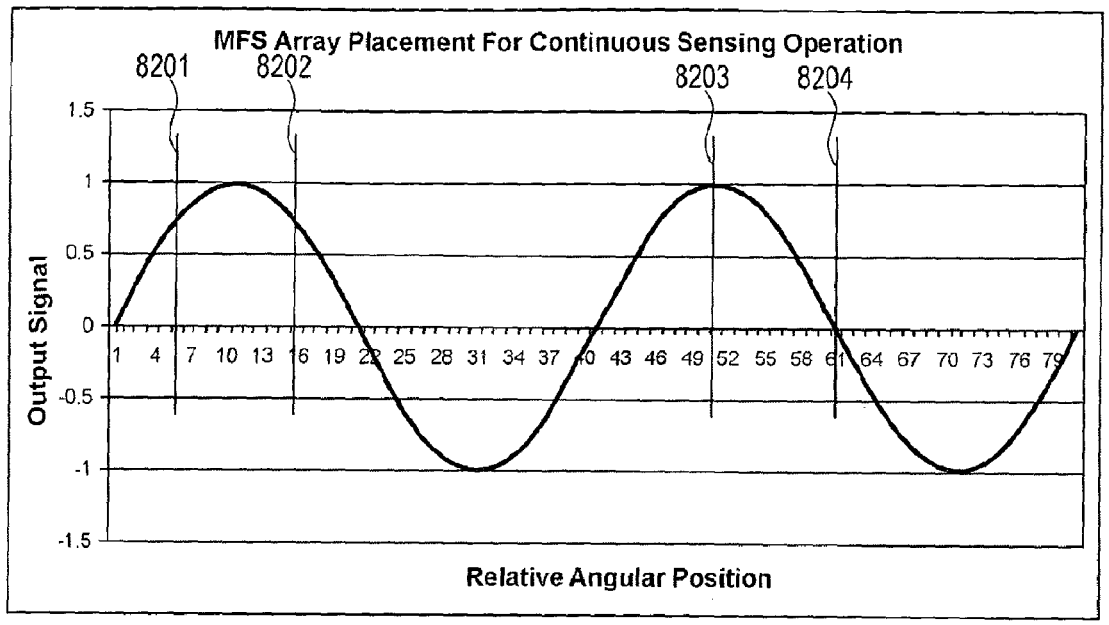
FIG. 82 schematically shows graphs of output signals for other exemplary placements of magnetic field detectors.
Figure 82:
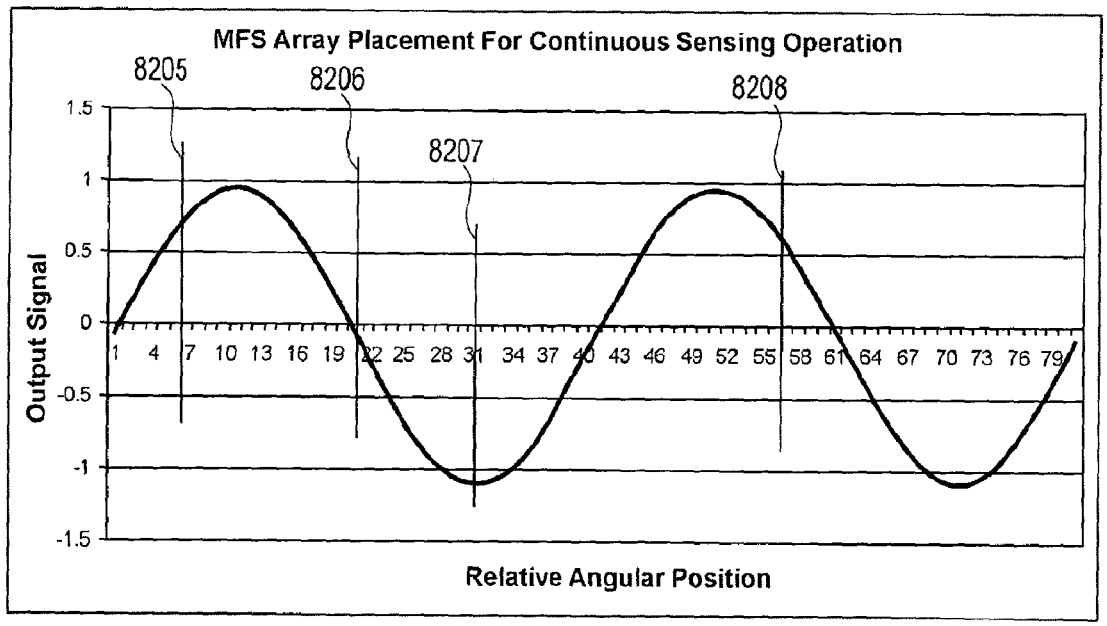

In FIG. 82 other schematically graphs of an output signal are shown. As already mentioned an almost constant output signal may be guaranteed, independent from the relative shaft rotation when building the average value of the absolute signal outputs of the used MFS devices. In the upper figure of FIG. 82 four MFS are placed at the positions labeled 8201, 8202, 8203 and 8204, while in the lower figure four MFS are placed at the positions labeled 8205, 8206, 8207 and 8208. In FIG. 82 the X-axis is compressed by a factor of 4.5 and the Y-axis shows the output signal in arbitrary units. Although, the positions of the MFS are different in FIG. 81 and FIG. 82 the computed output signals, resulting from placing the four MFS devices at the angular positions as shown in the three graphs of FIG. 81 and FIG. 82 is identical. That is, a torque which is applied can be determined by:

$$\text{Torque} = \frac{|MFS1| + |MFS2| + |MFS3| + |MFS4|}{4},$$

wherein MFS1, MFS2, MFS3, and MFS4 are the signals measured by the corresponding magnetic field sensor devices, i.e. the torque can be determined by calculating the arithmetic mean of the signals of the magnetic field sensor devices.

Figures 83A, 83B:
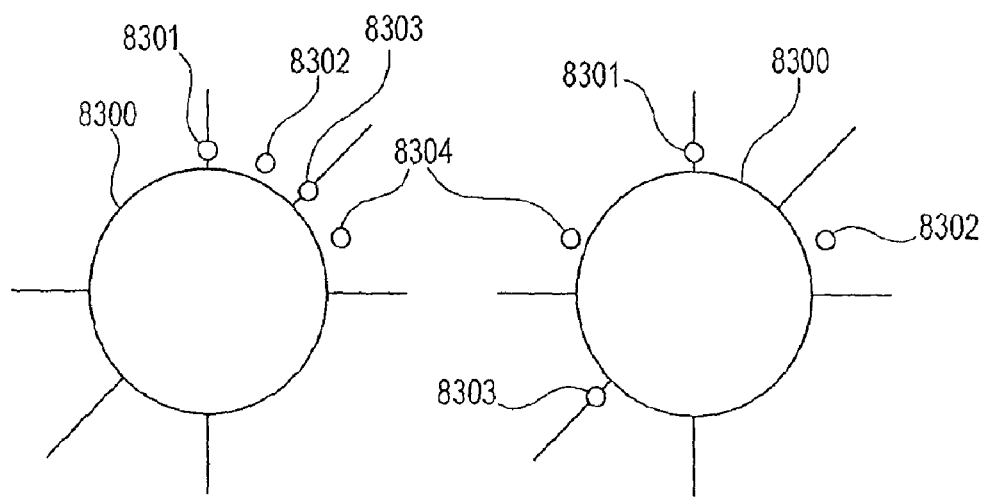
FIG. 83 schematically shows two options of a placement of four magnetic field detectors.

In FIG. 83 two different options of a placement of four magnetic field sensor devices are schematically shown in respect to a shaft 8300. In principle, the four magnetic field sensors 8301, 8302, 8303 and 8304 can be placed in any desired arrangement.

That is, FIG. 83 shows two options about how the four MFS devices can be placed around the shaft surface (at the same shaft cross section) to achieve the same output signal result, when the above-mentioned formula is used to determine the torque. The MFS devices are sensitive in axial direction and measure torque stresses. The shaft may now freely rotate and the torque signal amplitude may change only slightly. To achieve a more stable output signal, the number of MFS devices preferably is increased.

Figures 84A, 84B:
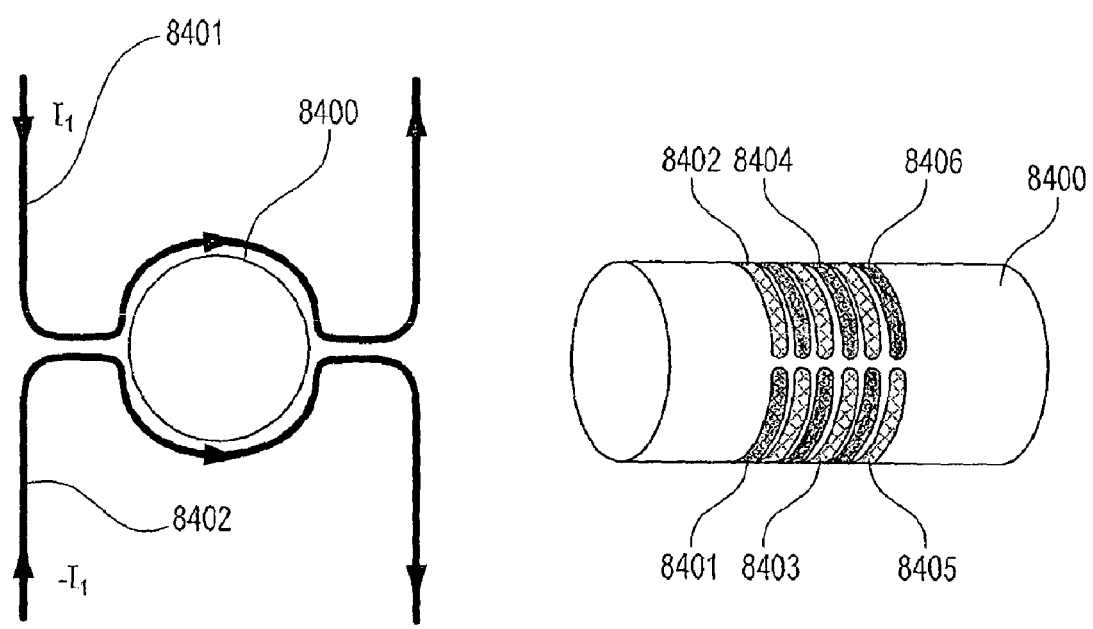
FIG. 84 schematically shows an exemplary embodiment of an encoding technique.

FIG. 84 schematically shows another exemplary embodiment of an encoding technique. While the magnetic encoding shown so far have been generated by placing the electric wire "parallel" to the sensing shaft 8400, the encoding wire can also be fully or partially wrapped around the shaft in tangential direction. In the example shown in FIG. 84A two wires 8401 and 8402 are wrapped around the shaft surface almost an angle of 180 degrees each, without being in direct contact to the shaft 8400. The current in the two wires that are wrapped around the shaft, are running in opposite direction, in relation to the shaft surface.

Whereas FIG. 84A shows a cross sectional view FIG. 84B shows a perspective view of the shaft 8400. In FIG. 84B every few mm another wire is wrapped around the shaft 8400 whereby the current direction in the wires will flip into the opposite direction from one wire to the next wire, i.e. the directions of the currents will change from one to the next adjacent wire. In FIG. 84B six pairs of wires are schematically shown from which only some wires are labeled 8401, 8402, 8403, 8404, 8405, 8406. The number of pairs can be of course higher. The magnetic pattern created at the shaft surface corresponds to a chess-board like pattern.

An magnetic encoding according to the embodiment of FIG. 84 is optimized to measure very precise the axial movement of the shaft (in relation to the stationary MFS devices), as well as angular rotation (as the encoding wire was not wrapped around 360 deg, but only 180 deg), and mechanical forces applied to the shaft.

However, the more complex the encoding pattern becomes, the more complex the signal detection and signal processing will be.

One characteristic feature of the present invention may be that the structure defined by the magnetically encoded regions can exhibit substantially every desired form. In particular, the structures of the magnetic field generated in the magnetizable element can be uneven, i.e. the structures are not necessary uniformly in respect to the magnetizable element. Furthermore, the structures can be radial, axial or tangential arranged in respect to the magnetizable element. In particular, the PCME technology enables to generate substantially every desired pattern in a magnetizable element.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An apparatus for magnetizing a magnetizable element to generate magnetically encoded regions, the apparatus comprising:
    electric coupling elements electrically coupling to at least two different portions of the magnetizable element; and
    an electric signal supply unit connected to the electric coupling elements and adapted for coupling at least two different electric signals into the at least two different portions so as to generate at least two different magnetically encoded regions in the at least two different portions of the magnetizable element.

2. The apparatus according to claim 1, wherein the electric coupling elements are electric connection elements contacting the at least two different portions, and wherein the coupling of the at least two different electric signals is an applying of the at least two different electric signals into the at least two different portions.

3. The apparatus according to claim 1, wherein the electric coupling elements are electric non-ohmic elements adapted to be coupled non-ohmic to the at least two different portions, and
    wherein the electric signal supply unit is adapted to induce non-ohmic the at least two different signals into the at least two different portions.

4. The apparatus according claim 3, wherein the electric coupling elements are wires placed parallel to an axis of the magnetizable element.

5. The apparatus according to claim 3, wherein the electric coupling elements are wires placed tangential to an axis of the magnetizable element.

6. The apparatus according to claim 5, wherein a strength of the at least two different electrical signals is substantially equal.

7. The apparatus according claim 3, wherein the electric coupling elements are arranged in a first group of electric coupling elements and a second group of electric coupling elements, wherein an electric signal of a predetermined strength is applied to the first group and an electric signal of the predetermined strength is applied to the second group, and wherein the signal applied to the first group have an opposite direction than the signal applied to the second group.

8. The apparatus according to claim 7, wherein a single electric coupling element of the second group is arranged between each two electric coupling elements of the first group.

9. The apparatus according to claim 1, wherein the coupling elements are arranged one of (a) evenly spaced, unevenly spaced, and logarithmically spaced around the magnetizable element.

10. The apparatus according to claim 1, wherein the electric coupling elements are connected to form groups of electric coupling elements, wherein each group of electric coupling elements is assigned to a respective one of the at least two different portions, and wherein at least one of the electric connection elements of a group of electric coupling elements is adapted to guide a respective electric signal from the electric signal supply unit to the respective portion, and at least one other of the electric coupling elements of a group of electric coupling elements is adapted to guide a respective electric signal from the respective portion back to the electric signal supply unit.

11. The apparatus according to claim 1, wherein the unit generates the magnetically encoded regions with a varying magnetic strength in the at least two portions of the magnetizable element.

12. The apparatus according to claim 1, wherein the unit generates the magnetically encoded regions with a varying magnetic polarity in the at least two portions of the magnetizable element.

13. The apparatus according to claim 1, wherein the unit magnetizes magnetizable element in such a manner that, in a planar projection of a surface of the magnetizable element, at least one of the magnetic strength and the polarity of the magnetically encoded regions form a chessboard-like structure.

14. The apparatus according to claim 1, wherein the unit generates the at least two magnetically encoded regions by applying a first current pulse to a respective portion; wherein the unit applies the first current pulse such that there is a first current flow in a first direction along a longitudinal axis of the respective portion; and wherein the first current pulse is such that the application of the current pulse generates a magnetically encoded region in the respective portion.

15. The apparatus according to claim 14, wherein the unit applies a second current pulse to the respective portion; the unit applies the second current pulse such that there is a second current flow in a second direction along the longitudinal axis of the respective portion.

16. The apparatus according to claim 15, wherein each of the first and second current pulses has a raising edge and a falling edge and wherein the raising edge is steeper than the falling edge.

17. The apparatus according to claim 15, wherein the first direction is opposite to the second direction.

18. The apparatus according to claim 1, further comprising:
    a plurality of electric signal supply units,
    wherein each of the electric signal supply units apply electric signals to an assigned one of the portions.

19. A method for magnetizing a magnetizable element to generate magnetically encoded regions, comprising:

electrically connecting at least two different portions of the magnetizable element with an electric signal supply unit; and coupling, using the electric signal supply unit, at least two different electric signals into the at least two different portions so as to generate at least two different magnetically encoded regions in the at least two different portions of the magnetizable element.

* * * * *